US012760507B2

(12) United States Patent
Say et al.

(10) Patent No.: US 12,760,507 B2
(45) Date of Patent: Oct. 13, 2026

(54) FLUID COUPLER

(71) Applicant: Zurn Water, LLC, Milwaukee, WI (US)

(72) Inventors: Christopher J. Say, Erie, PA (US); Matthew Curtis Henderson, Girard, PA (US); Frank Schaetzke, Milwaukee, WI (US); Seth R. Wenzel, Mckean, PA (US); Michael T. Benesh, Erie, PA (US); David M. Gomo, Lake City, PA (US)

(73) Assignee: Zurn Water, LLC, Milwaukee, WI (US)

( * ) Notice: Subject to any disclaimer, the term of this patent is extended or adjusted under 35 U.S.C. 154(b) by 98 days.

(21) Appl. No.: 18/605,542

(22) Filed: Mar. 14, 2024

(65) Prior Publication Data

US 2024/0309973 A1 Sep. 19, 2024

Related U.S. Application Data

(60) Provisional application No. 63/490,232, filed on Mar. 14, 2023.

(51) Int. Cl.
*F16L 5/02* (2006.01)
*E03D 11/14* (2006.01)
*F16L 23/032* (2006.01)

(52) U.S. Cl.
CPC ............ *E03D 11/14* (2013.01); *F16L 23/032* (2013.01); *E03D 11/143* (2013.01); *F16L 5/02* (2013.01)

(58) Field of Classification Search
CPC ..... E03D 11/14; E03D 11/143; E03D 11/146; F16L 9/006; F16L 23/032
See application file for complete search history.

(56) References Cited

U.S. PATENT DOCUMENTS

| | | | |
|---|---|---|---|
| D29,983 | S | 1/1899 | Bymes |
| D31,639 | S | 10/1899 | Eldridge |
| 990,646 | A | 4/1911 | Fisher |
| D52,954 | S | 2/1919 | Hubbard et al. |
| D56,439 | S | 10/1920 | Klemme |
| 1,457,183 | A | 5/1923 | Harbour |
| 1,629,208 | A | 5/1927 | Lot |
| 1,709,132 | A | 4/1929 | Hindsale |
| 2,406,235 | A | 8/1946 | Mccoy |
| 2,522,127 | A | 9/1950 | Krapp |

(Continued)

FOREIGN PATENT DOCUMENTS

| | | | |
|---|---|---|---|
| CA | 2849461 | A1 | 10/2014 |
| CA | 2944072 | A1 | 4/2015 |

(Continued)

*Primary Examiner* — Erin Deery
(74) *Attorney, Agent, or Firm* — Husch Blackwell LLP

(57) ABSTRACT

A fluid coupler for providing fluid communication between a faceplate and a pipe includes a primary segment for coupling to a downstream pipe, a secondary segment including a flanged end for coupling to the faceplate, and an inlet in the flanged end for providing fluid communication with an outlet of the faceplate. The flanged end includes mounting slots that correspond to mounting apertures of the faceplate for securing the fluid coupler to the faceplate. The fluid coupler is adjustably secured to the faceplate such that it forms a water-tight seal therewith.

12 Claims, 70 Drawing Sheets

(56) References Cited

U.S. PATENT DOCUMENTS

| | | | | | |
|---|---|---|---|---|---|
| 2,739,779 | A | | 3/1956 | Krone et al. | |
| 2,901,754 | A | | 9/1959 | Manas | |
| 2,966,372 | A | | 12/1960 | Phillips | |
| 3,188,121 | A | | 6/1965 | Cude et al. | |
| 3,235,887 | A | | 2/1966 | Clifford | |
| 3,273,173 | A | | 9/1966 | Morris et al. | |
| 3,435,467 | A | | 4/1969 | Flegel et al. | |
| 3,686,695 | A | | 8/1972 | Mielback et al. | |
| 3,891,248 | A | | 6/1975 | Kannapell et al. | |
| 4,058,859 | A | | 11/1977 | Arrowood | |
| 4,091,473 | A | | 5/1978 | Matthews et al. | |
| 5,107,638 | A | | 4/1992 | Unertl | |
| 5,199,113 | A | | 4/1993 | Glasow et al. | |
| 5,301,984 | A | | 4/1994 | Farris | |
| D355,958 | S | | 2/1995 | Teskey | |
| 5,452,922 | A | | 9/1995 | Ziu | |
| 6,079,753 | A | * | 6/2000 | Erwin | F01N 13/1805 285/414 |
| 6,928,669 | B2 | | 8/2005 | Akin | |
| 6,979,027 | B2 | | 12/2005 | Hetzler et al. | |
| 7,421,745 | B2 | | 9/2008 | Levy | |
| 7,571,497 | B2 | | 8/2009 | Hetzler et al. | |
| 8,141,177 | B1 | | 3/2012 | Majocka et al. | |
| 8,321,967 | B2 | | 12/2012 | Mesun et al. | |
| D676,533 | S | | 2/2013 | Clarke | |
| 8,505,124 | B2 | | 8/2013 | Eichler et al. | |
| 8,544,121 | B1 | | 10/2013 | Majocka et al. | |
| D705,402 | S | | 5/2014 | Yu | |
| 8,881,318 | B2 | | 11/2014 | Stammel et al. | |
| 8,887,319 | B2 | | 11/2014 | Whiteside | |
| D722,140 | S | | 2/2015 | Sisk | |
| 9,021,620 | B1 | | 5/2015 | Walker | |
| 9,068,333 | B2 | | 6/2015 | Sneve et al. | |
| D744,617 | S | | 12/2015 | Schoolcraft et al. | |
| D759,210 | S | | 6/2016 | Schoolcraft et al. | |
| 9,464,426 | B1 | | 10/2016 | Schaetzke et al. | |
| D770,600 | S | | 11/2016 | Daughters | |
| D783,781 | S | | 4/2017 | Bates-Hurtado | |
| 9,631,353 | B1 | | 4/2017 | Walker | |
| 9,732,507 | B2 | | 8/2017 | Bucher et al. | |
| D796,652 | S | | 9/2017 | Vish et al. | |
| D814,612 | S | | 4/2018 | Vishwakarma et al. | |
| 9,938,707 | B2 | | 4/2018 | Frei et al. | |
| 10,358,805 | B2 | | 7/2019 | Tanimoto et al. | |
| D857,856 | S | | 8/2019 | Lee et al. | |
| D861,836 | S | | 10/2019 | Lee et al. | |
| 10,526,775 | B2 | | 1/2020 | Nakamura et al. | |
| D875,224 | S | | 2/2020 | Bucher et al. | |
| 10,563,385 | B1 | | 2/2020 | Ball et al. | |
| 10,697,167 | B2 | | 6/2020 | Bucher et al. | |
| 10,738,454 | B2 | | 8/2020 | Spankowski et al. | |
| D900,286 | S | | 10/2020 | Daughters | |
| D905,545 | S | | 12/2020 | Whitefield et al. | |
| 10,851,534 | B2 | | 12/2020 | Hetzler et al. | |
| 10,858,815 | B2 | | 12/2020 | Fratantonio et al. | |
| D908,849 | S | | 1/2021 | Decaria et al. | |
| 10,895,070 | B2 | | 1/2021 | Hodge | |
| 11,060,268 | B1 | | 7/2021 | Snyder, Jr. et al. | |
| 11,326,733 | B2 | | 5/2022 | Hull et al. | |
| 11,549,629 | B2 | | 1/2023 | Eckols et al. | |
| 11,746,946 | B2 | | 9/2023 | Lorkowski et al. | |
| D1,009,228 | S | | 12/2023 | Panwar et al. | |
| D1,013,860 | S | | 2/2024 | Luo | |
| D1,033,608 | S | | 7/2024 | Huntley | |
| D1,048,306 | S | | 10/2024 | Meyers et al. | |
| D1,070,031 | S | | 4/2025 | Pechonis | |
| 2006/0108444 | A1 | | 5/2006 | Yeh et al. | |
| 2008/0000018 | A1 | | 1/2008 | Laher | |
| 2012/0132310 | A1 | | 5/2012 | Cavaliere et al. | |
| 2014/0310860 | A1 | | 10/2014 | Wroblewski et al. | |
| 2015/0191903 | A1 | | 7/2015 | Doerscher, Sr. | |
| 2016/0090726 | A1 | | 3/2016 | Verdecchia et al. | |
| 2016/0097191 | A1 | | 4/2016 | Morris et al. | |
| 2016/0161043 | A1 | | 6/2016 | Bhatta et al. | |
| 2016/0312454 | A1 | | 10/2016 | Mantel et al. | |
| 2017/0314724 | A1 | | 11/2017 | Zhou | |
| 2017/0336007 | A1 | | 11/2017 | Rappitsch et al. | |
| 2018/0087676 | A1 | | 3/2018 | Funari et al. | |
| 2022/0243445 | A1 | | 8/2022 | Lawrence et al. | |
| 2023/0175244 | A1 | | 6/2023 | Rose et al. | |

FOREIGN PATENT DOCUMENTS

| | | | | | |
|---|---|---|---|---|---|
| EP | 0814208 | A2 | * | 12/1997 | F16L 43/00 |
| FR | 2908141 | B1 | | 5/2011 | |
| GB | 2223042 | B | | 5/1992 | |
| WO | WO-2009001115 | A1 | * | 12/2008 | E03D 11/14 |
| WO | 2009071178 | A1 | | 6/2009 | |
| WO | 2013062493 | A1 | | 5/2013 | |
| WO | 2015061615 | A1 | | 4/2015 | |
| WO | 2016162352 | A1 | | 10/2016 | |
| WO | 2017203335 | A1 | | 11/2017 | |
| WO | 2019190442 | A2 | | 10/2019 | |
| WO | 2019194770 | A2 | | 10/2019 | |

* cited by examiner

FLUID COUPLER

CROSS-REFERENCE TO RELATED APPLICATIONS

This application claims the benefit of U.S. Provisional Patent Application No. 63/490,232 filed Mar. 14, 2023, the entire contents of which is incorporated by reference herein.

TECHNICAL FIELD

The present application relates to fluid couplers that provide a fluid connection between a structure or plumbing fixture and a pipe or building's plumbing system.

BACKGROUND

Plumbing fixtures are typically connected to a pipe or building's plumbing system using a fluid coupler.

SUMMARY

In one independent aspect, a gasket is provided for providing a seal between a faceplate and an outlet connector. The gasket includes a planar body configured to correspond to a mounting flange of the outlet connector and that provides a sealing surface between the outlet connector and the faceplate, a first mounting element extending radially outwardly from the planar body and configured to accommodate a first fastener for coupling the outlet connector to the faceplate, a second mounting element extending radially outwardly from the planar body and configured to accommodate a second fastener for coupling the outlet connector to the faceplate, and a pocket extending from the planar body between the first mounting element and the second mounting element, the pocket configured to at least partially receive a portion of the mounting flange of the outlet connector.

In some aspects, the pocket can be bent or deformed to receive a portion of the mounting flange.

In some aspects, the pocket can be manipulated to receive a portion of the mounting flange without stretching the planar body.

In some aspects, the pocket holds the gasket to the mounting flange when the pocket receives a portion of the gasket, and the pocket must be manually bent or deformed to remove the gasket from the mounting flange.

In some aspects, the pocket holds the gasket to the mounting flange when the pocket receives a portion of the gasket, and the pocket is manually bent or deformed to remove the gasket from the mounting flange.

In some aspects, the first mounting element includes closed slots to accommodate the first fastener.

In some aspects, the first mounting element includes a cutout portion that accommodates the first fastener; and the cutout portion is part of an outer perimeter of the gasket.

In some aspects, the planar body includes grooves or ridges.

In some aspects, the pocket is a first pocket. The gasket further includes a third mounting element extending radially outwardly from the planar body and configured to accommodate a third fastener for coupling the outlet connector to the faceplate, a fourth mounting element extending radially outwardly from the planar body and configured to accommodate a fourth fastener for coupling the outlet connector to the faceplate, and a second pocket extending from the planar body between the third mounting element and the fourth mounting element, the second pocket configured to at least partially receive a portion of the mounting flange of the outlet connector.

In some aspects, the first pocket and the second pocket are located on opposite ends of the planar body of the gasket.

In some aspects, the first pocket and the second pocket can each be manipulated to receive a portion of the mounting flange without stretching the planar body of the gasket.

In some aspects, the first pocket and the second pocket holds the gasket to the mounting flange when the first pocket and the second pocket receive portions of the gasket, and the first pocket and the second pocket must be manually bent or deformed to remove the gasket from the mounting flange.

In another independent aspect, an outlet connector is configured to provide fluid communication between a carrier assembly including a faceplate and a downstream pipe. The outlet connector includes a flange at a first end of the outlet connector, the flange configured to be coupled to a mounting hub of the faceplate, the flange including an inlet opening, the inlet opening being larger than a fluid passageway in the faceplate, and a pipe portion extending from the flange to a second end, the second end including an outlet opening, the second end configured to be coupled to the downstream pipe. When the outlet connector is coupled to the faceplate, the pipe portion is large enough to accommodate a fluid coupler of the carrier assembly within the pipe portion while the fluid coupler is installed to a maximum insertion depth on the faceplate.

In some aspects, the pipe portion is a straight stub.

In some aspects, the pipe portion includes a transition such that the outlet opening of the second end is smaller than the inlet opening of the first end.

In some aspects, a first central axis of the inlet opening is offset from a second central axis of the outlet opening.

In some aspects, the first end includes a slot configured to correspond to an aperture of the mounting hub, a fastener can be inserted into the slot and the aperture, and the slot is larger than the aperture such that a position of the outlet connector can be adjusted with the fastener inserted into the slot and the aperture.

In yet another independent aspect, a method for mounting an outlet connector to a carrier assembly includes attaching a gasket to a flanged end of the outlet connector by manipulating a pocket of the gasket to receive a portion of the flanged end of the outlet connector such that the pocket resists removal from the flanged end without further manipulation, aligning the flanged end of the outlet connector with a mounting hub of the carrier assembly, inserting a fastener through a slot in the flanged end and an aperture of the mounting hub, adjusting a position of the outlet connector such that a second end of the outlet connector configured to couple to a downstream pipe is in its desired position, and tightening the fastener to fix the position of the outlet connector relative to the carrier assembly.

In some aspects, manipulating the pocket of the gasket does not require stretching a main body or sealing surface of the gasket.

In some aspects, the slot is first slot, the flanged end includes a second slot for receiving a fastener, and the pocket receives a portion of the flanged end that is located between the first slot and the second slot.

In yet another independent aspect, a fluid coupler configured to provide fluid communication between a carrier assembly including a faceplate and a downstream pipe. The fluid coupler includes a flange having a plurality of mounting apertures configured to receive fasteners for coupling the fluid coupler to the faceplate, the flange defining a central opening configured to align with a fluid passageway opening of the faceplate, a main pipe portion extending generally parallel to a planar face of the flange, the main pipe portion including a first downstream end configured to connect to downstream piping and a second upstream end configured to connect to vent piping, and a curved transition pipe portion connects to the main pipe portion to provide fluid communication from the central opening of the flange to the main pipe portion, the curved transition portion curved in a direction towards the first downstream end.

In some aspects, the first downstream end includes a downstream opening, and the downstream opening and the central opening are approximately equal in size.

In some aspects, the first downstream end includes a downstream opening and the second upstream end includes an upstream opening, and the downstream opening is larger than the upstream opening.

In some aspects, the central opening has a first cross sectional area and the curved transition pipe portion defines an intermediate cross section having an intermediate cross sectional area, and the first cross sectional area is larger than the intermediate cross sectional area.

In some aspects, the intermediate cross sectional area is within 80% of the first cross sectional area.

In some aspects, the first downstream end defines a second cross sectional area that is approximately the same as the first cross sectional area.

In some aspects, the main pipe portion includes a transition portion from the larger downstream end to the smaller upstream end, and the transition portion is located upstream of where the curved transition pipe portion connects to the main pipe portion.

In some aspects, a first central axis of the downstream opening and a second central axis of the upstream opening are laterally offset from each other.

In some aspects, the first central axis is offset from the second central axis by approximately 50% of a diameter of the downstream opening.

In some aspects, the curved transition pipe portion is offset from the flange by a straight pipe portion that extends perpendicular from the planar face of the flange.

In some aspects, a depth of the straight pipe portion is configured to accommodate receiving an opposing internal fluid coupler of the carrier assembly such that the curved transition portion does not interfere with the opposing internal fluid coupler.

In yet another independent aspect, a support is providing for installing a wall-mounted carrier assembly. The support includes a first vertical slot configured to align with a first mounting aperture of the carrier assembly a second vertical slot configured to align with a second mounting aperture of the carrier assembly, and a base or foot configured to rest on a floor or a horizontal wall member of a wall structure that the carrier assembly. The support can be mounted to the carrier assembly by inserting fasteners through the first vertical slot and mounting aperture and the second vertical slot and mounting aperture. The support can hold the carrier assembly in an upright position before the carrier assembly is installed to a wall.

In some aspects, the position of the support relative to the carrier assembly can be adjusted along a length of the first and second vertical slots before the fasteners are tightened.

In some aspects, the position of the support relative to the carrier assembly can be adjusted to set a pre-determined height of carrier assembly on the wall.

In some aspects, the support includes indicators of various pre-determined heights, such that a user can align a given indicator with a portion of the carrier assembly to set an install height of the carrier assembly.

In some aspects, the support includes an enlarged central opening that can accommodate an outlet connector mounted to and extending away from the carrier assembly without the support interfering with the outlet connector.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Described below are various embodiments of a fluid coupler configured to provide a fluid connection between a faceplate and a pipe or building plumbing system. The fluid coupler is adjustably coupled to the faceplate to form a watertight seal between the faceplate and the fluid coupler. The faceplate defines an opening through which fluid flows through. The fluid coupler is sized and shaped to provide an improved fluid flow from the faceplate, through the fluid coupler, and to the pipe or building plumbing system. The fluid coupler is described in reference to providing a fluid connection point between a water closet and a corresponding wastewater pipe, but it should be appreciated that the fluid coupler is not limited to this application. The fluid coupler can provide a fluid connection point between any desirable faceplate and any desirable pipe or building plumbing system. The disclosure is capable of other applications, and of being practiced or of being carried out in various ways.

Figure 1:
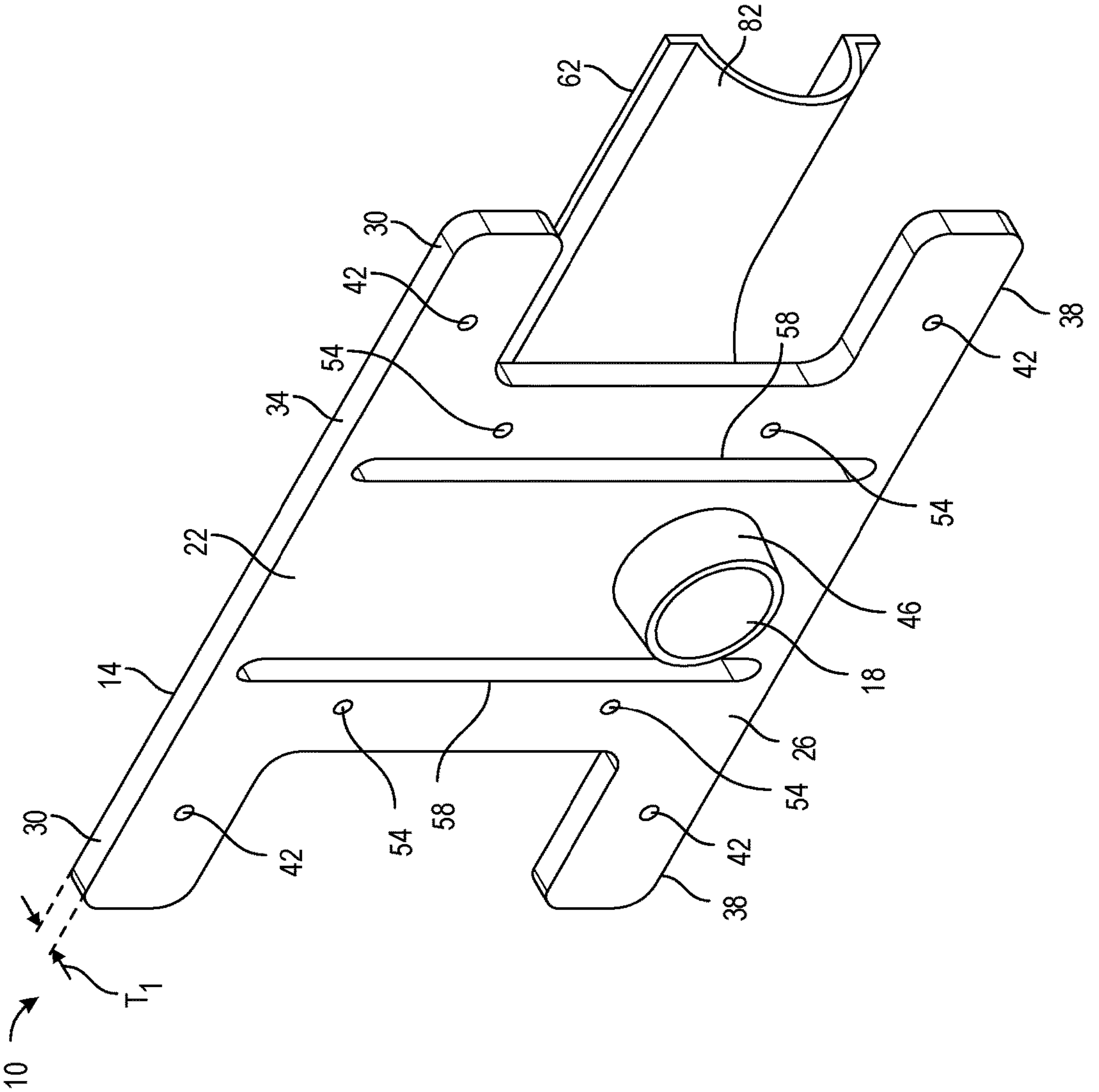
FIG. 1 is a front perspective view of a carrier assembly including a fluid coupler.
Figure 2:
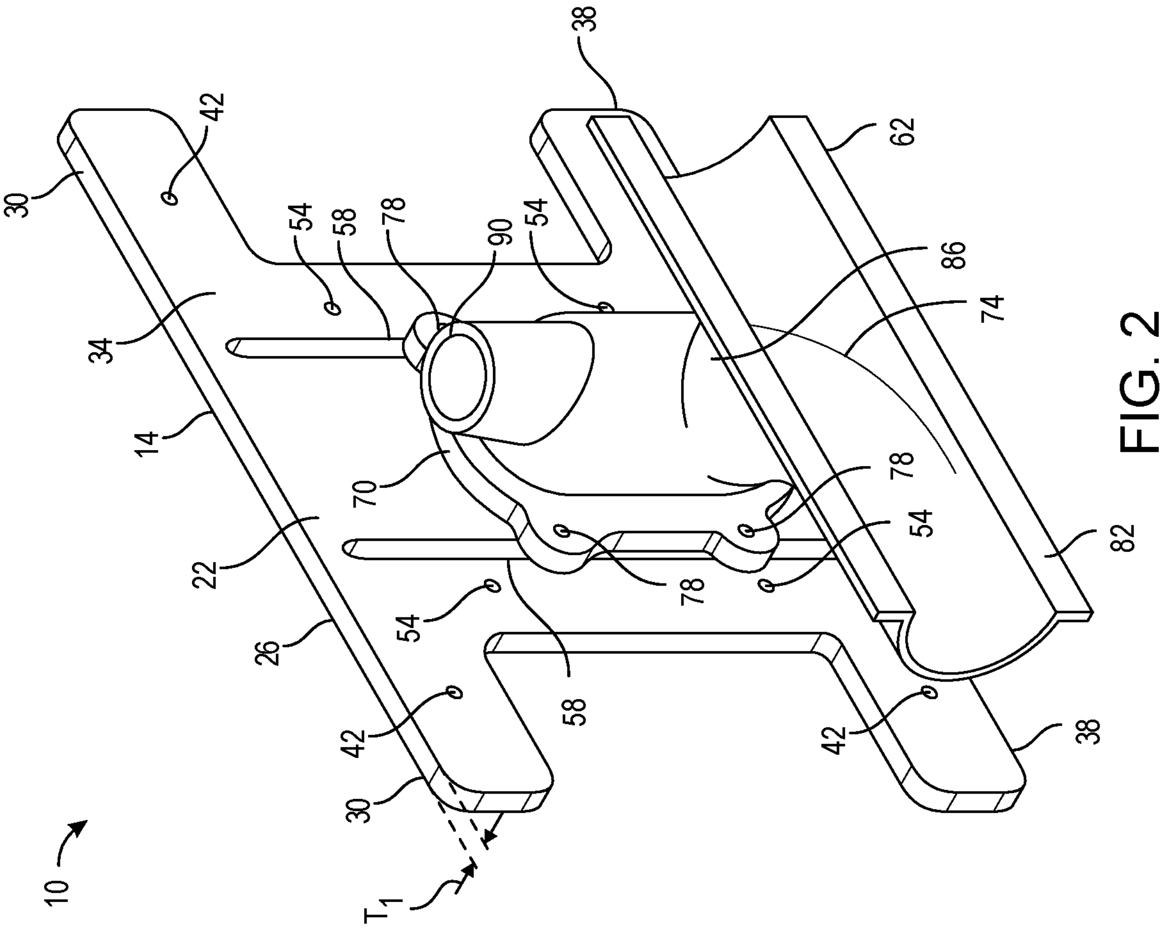
FIG. 2 is a rear perspective view of the carrier assembly of FIG. 1.
Figure 6:
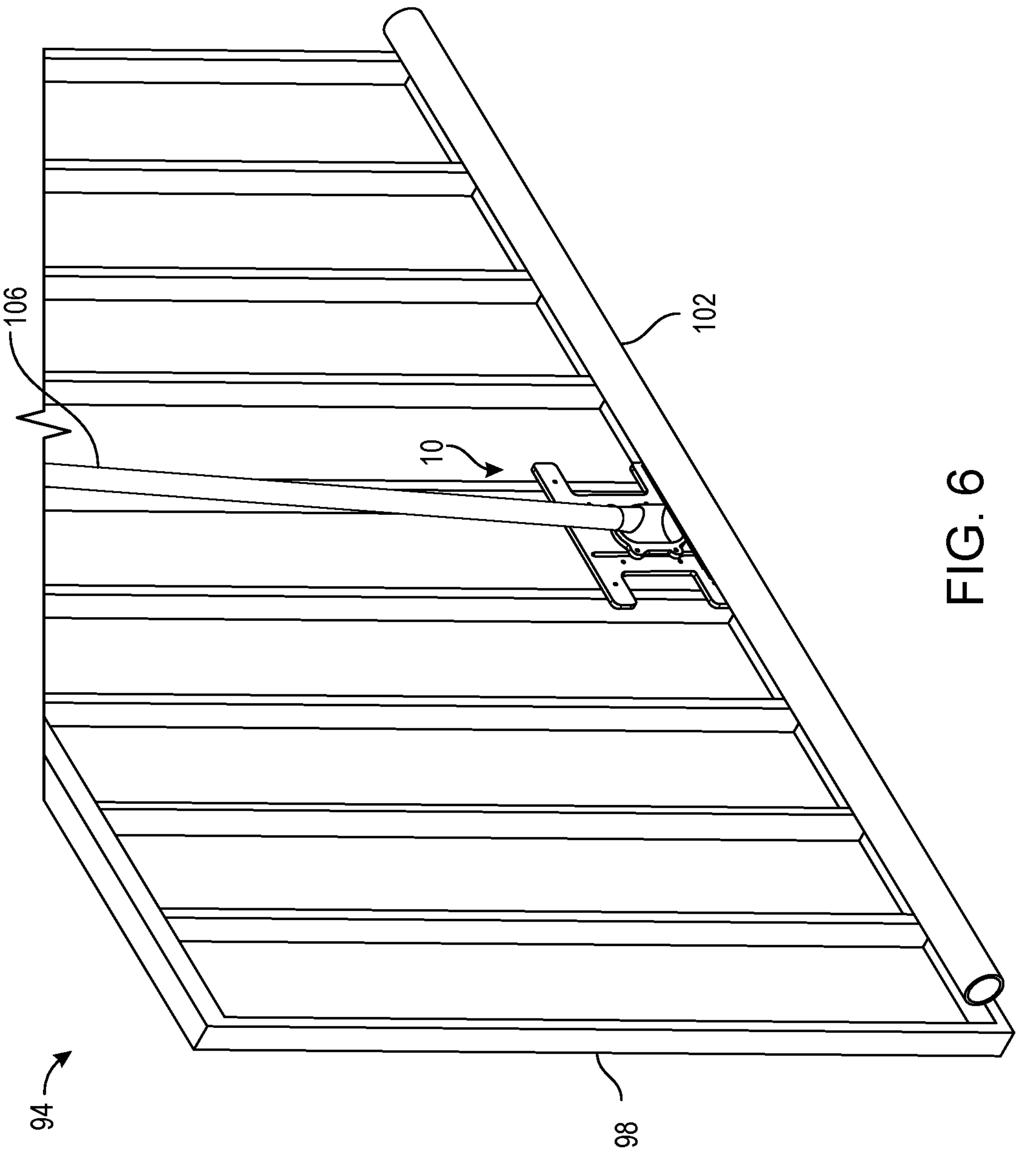
FIG. 6 is a rear perspective view of the carrier assembly positioned relative to a wall assembly in another embodiment.

FIG. 1 illustrates a carrier assembly 10 for supporting a wall-mounted water closet (e.g., a toilet, latrine, or lavatory) in an elevated cantilevered position. More specifically, the carrier assembly 10 is configured to be mounted to a modular wall assembly 94, described below (FIG. 6), whereby the carrier assembly 10 provides a mounting location to which a water closet may be attached. Once attached, the carrier assembly 10 is configured to transmit any loads applied to the water closet (e.g., a person sitting thereon, and the like) into the wall assembly 94 for support. In the illustrated embodiment, the carrier assembly 10 not only provides physical support for the water closet but also serves as a fluid connection point by placing the outlet of the water closet in fluid communication with a corresponding wastewater pipe 102. However, it should be appreciated that the disclosure is not limited to the carrier assembly 10 for supporting the wall-mounted water closet. The disclosure is capable of other applications, and of being practiced or of being carried out in various ways.

The carrier assembly 10 as shown in FIGS. 1-4 includes a faceplate 14, and a fluid coupler 62 adjustably coupled to the faceplate 14. The faceplate 14, in turn, has an I-shaped profile including a front side 26, and a rear side 34 opposite the front side 26. In the illustrated embodiments, the two sides 26, 34, are spaced apart from one another a first distance defining a faceplate thickness T1 therebetween (see FIG. 1).

As shown in FIG. 1, the faceplate 14 includes a central portion 22 flanked by opposing upper arms 30 and lower arms 38. The upper arms 30 extend outward from the central portion 22 adjacent a top side of the central portion 22 and the lower arms 38 extend outward from the central portion 22 adjacent a bottom side of the central portion 22. Mounting openings 42 herein shown as through-holes extend through each of the upper and lower arms 30, 38 and function as mounting holes for coupling the carrier assembly 10 to a wall stud 98 of the wall assembly 94 (described below). During use, threaded fasteners are driven through the mounting holes 42 into the wall assembly 94 to fixedly couple the carrier assembly 10 to the wall assembly 94.

The through-holes 42 in the opposing upper arms 30 and opposing lower arms 38 are spaced apart from one another (e.g., by sixteen inches) on center to align with spaced studs of the wall assembly 94, though other widths may be used dependent upon stud spacing standards. In some embodiments, the through-holes 42 are elongated slots such that the faceplate 14 can be mounted to the wall assembly 94 at positions offset from a central placement between adjacent studs of the wall assembly 94.

The faceplate 14 also defines an opening or fluid passageway 18 extending through a thickness T1 of the faceplate 14 and open to both the front side 26 and the rear side 34. More specifically, the cylindrical opening 18 is sized and shaped on the front side 26 of the faceplate 14 to align and form a water-tight seal with an outlet of the water closet. As shown, though the faceplate is generally flat (having a substantially uniform thickness T1), the passageway 18 includes a cylindrical boss or protrusion 46 that extends outward from the front side 26. While the illustrated embodiment is shown without a seal, the fluid passageway 18 may include a sealing element (e.g., a wax ring) to help provide a water-tight seal between the carrier assembly 10 and the outlet of the water closet.

As shown in FIG. 1, the faceplate 14 also includes a plurality of threaded openings 54 located within the central portion 22 of the faceplate 14 for mounting the water closet to the faceplate 14. In the illustrated embodiment, the faceplate 14 includes four threaded openings 54 spaced apart from one another in a rectangular pattern to align and correspond with a similar pattern at the rear of the water closet. Threaded fasteners (not shown) extend through the rear of the water closet and into engagement with each of the openings 54 to mount the water closet to the carrier assembly 10.

The faceplate 14 additionally includes two elongated slots 58 extending substantially vertically along the height of the faceplate 14. During use, the slots 58 are configured to interface with the flange 70 of the fluid coupler 62 (described below) for coupling the two elements together. In the illustrated embodiment, the slots 58 are configured to allow the fluid coupler 62 to be vertically adjusted relative to the face plate 14. While the illustrated slots 58 are oriented substantially vertically to allow for vertical adjustment between the faceplate 14 and the fluid coupler 62, it is understood that in alternative embodiments the slots 58 may be oriented differently to permit adjustability in another orientation (e.g., horizontally and the like). In still other embodiments, the elongated slots 58 may be replaced with discrete circular openings at various locations to provide multiple, discrete mounting locations.

Figure 3:
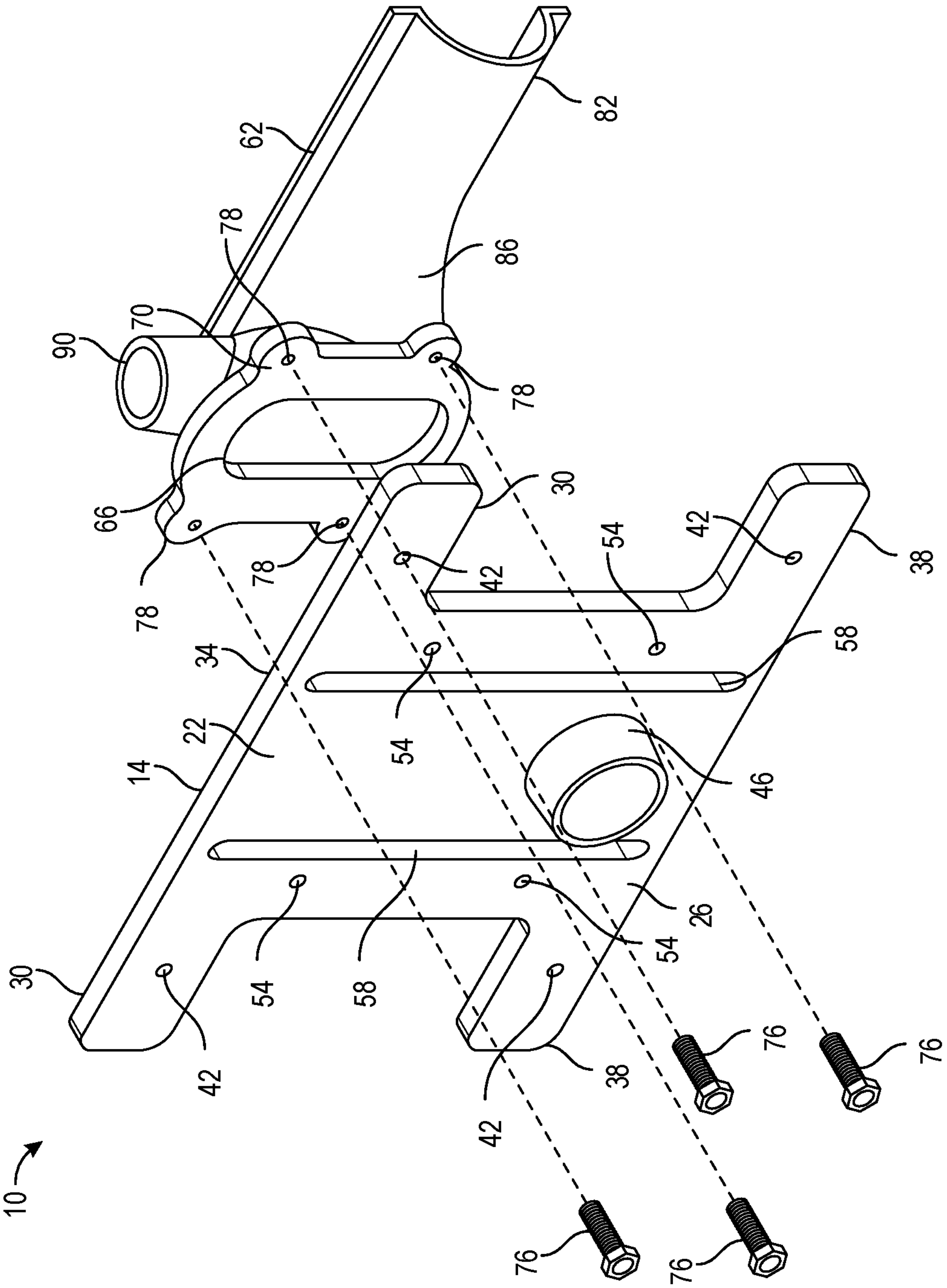
FIG. 3 is an exploded front view illustrating a faceplate and fluid coupler for the carrier assembly of FIG. 1.

As shown in FIGS. 2-5, the fluid coupler 62 extends between and is configured to establish fluid communication between the fluid passageway 18 of the faceplate 14 and the wastewater pipe 102. More specifically, as shown in FIG. 3, the fluid coupler 62 includes an inlet 66 configured to be coupled to and form a water-tight seal with the rear side 34 of the face plate 14, and an outlet 74 (FIG. 4) configured to be coupled to and form a water-tight seal with the wastewater pipe 102.

During use, the fluid coupler 62 is configured to establish at least one degree of adjustability at the inlet 66 (e.g., with respect to the faceplate 14), and at least one degree of adjustability at the outlet 74 (e.g., with respect to the wastewater pipe 102) while still forming a water-tight connection at both locations. More specifically, the fluid coupler 62 is configured to allow the inlet 66 to be adjusted vertically relative to the faceplate 14 and configured to allow the outlet 74 to be adjusted axially along the length of the wastewater pipe 102.

The inlet 66 of the fluid coupler 62 is at least partially enclosed by a flange 70. The flange 70, in turn, forms a substantially obround shape that is elongated in the vertical direction (e.g., the direction of adjustability, bottom to top direction as shown in FIG. 3). The inlet 66 also defines a plurality (e.g., four) of openings 78 sized to allow a fastener to pass therethrough.

When assembled, fasteners extend through the slots 58 of the faceplate 14 and into engagement with openings 78 (e.g., threaded openings) to couple the faceplate 14 to the fluid coupler 62. By doing so, the fasteners place the flange 70 into contact with the rear side 34 of the faceplate 14 forming a water-tight seal therebetween. The combined use of the elongated slots 58 with the circular openings 78 permits an installer to vary the relative vertical location of the faceplate 14 relative to the fluid coupler 62 while maintaining the water-tight seal therebetween.

To further facilitate the vertical adjustability between the faceplate 14 and the fluid coupler 62, the obround shape of the inlet 66 permits full alignment of the inlet 66 with the opening 18 in the faceplate 14 at various heights within the mounting range permitted by the elongated slots 58. Stated differently, the inlet 66 and flange 70 enclose a volume that completely encompasses the fluid passageway 18 of the faceplate 14 over a range of relative mounting positions therebetween. The resulting alignment between the fluid passageway 18 and the inlet 66 does not substantially decrease the cross-sectional area of the fluid flow path through the carrier assembly 10 as fluid travels through the faceplate 14, into the fluid coupler 62, and to the wastewater pipe 102.

Figure 4:
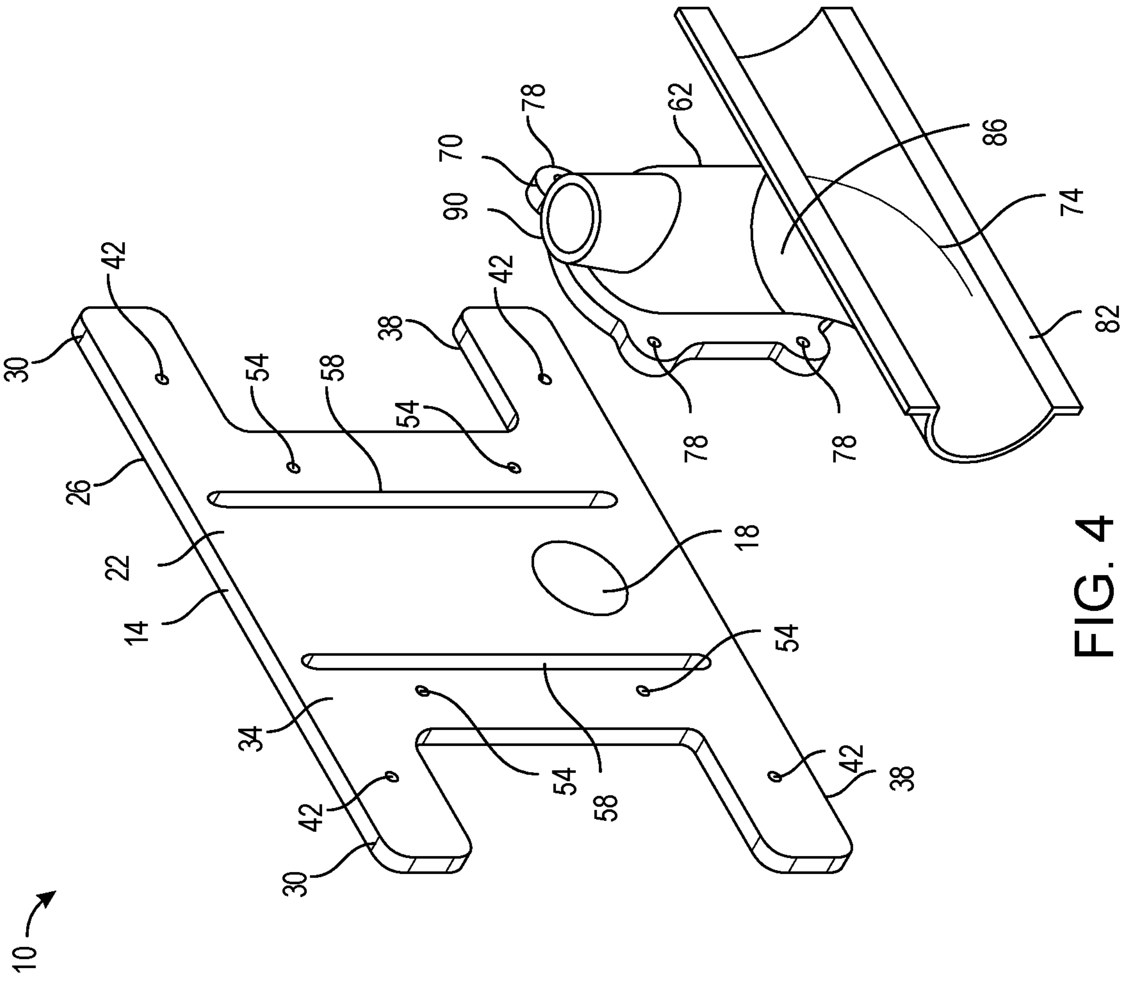
FIG. 4 is an exploded rear view illustrating the faceplate and fluid coupler of the carrier assembly of FIG. 1.
Figure 5:
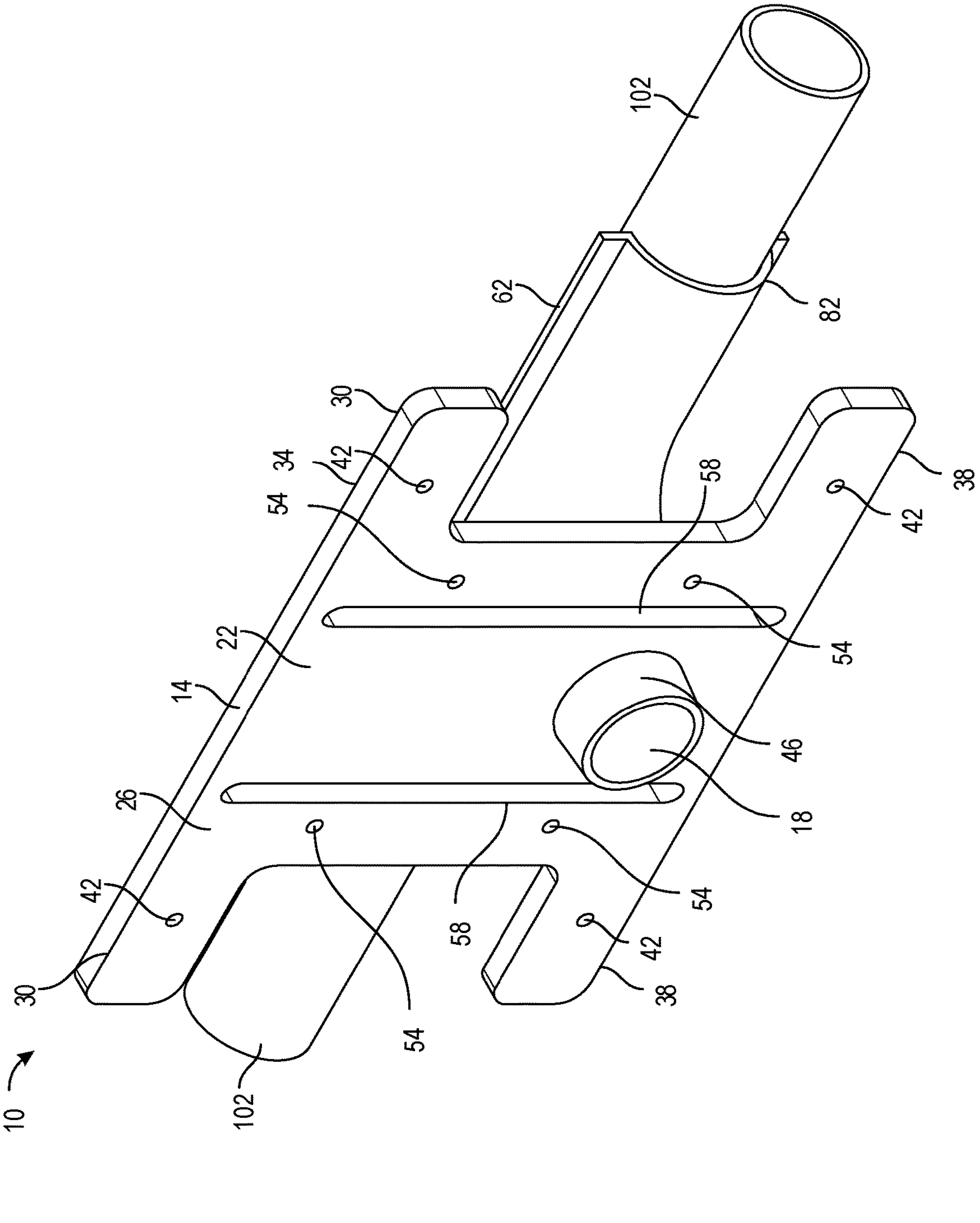
FIG. 5 is a perspective view of the carrier assembly of FIG. 1 positioned relative to a wastewater pipe.

As shown in FIG. 4, in one embodiment, the outlet 74 of the fluid coupler 62 is a saddle tee and includes a first pipe portion 82 extending substantially perpendicular to the inlet 66 and flange 70, with the first pipe portion 82 having a semicircular cross-section. The inner radius of the first pipe portion 82 is similar to the outer radius of the wastewater pipe 102 such that the first pipe portion 82 can rest snugly against the wastewater pipe 102 and form a water-tight connection therebetween. The first pipe portion 82 is coupled to the flange 70 via a second pipe portion 86, the second pipe portion 86 extending between the inlet 66 at the flange 70 and the outlet 74 at the first pipe portion 82. The second pipe portion 86 follows an arc along its length such that the fluid flow through the second pipe portion 86 flows into the wastewater pipe 120 in a draining direction.

As a saddle tee, the fluid coupler 62 can be coupled to and integrated into an existent, installed wastewater pipe 102 by fastening the fluid coupler 62 to the wastewater pipe 102 (i.e., adhering the first pipe portion 82 to the outside of the wastewater pipe 102 via a plumbing adhesive) and boring a hole into the wastewater pipe 102 that aligns with the outlet 74. By doing so, the outlet 74 of the fluid coupler 62 can be located anywhere along the length of the pre-existing wastewater pipe 102. In alternative embodiments, the first pipe portion 82 of the fluid coupler 62 may be fully cylindrical and installed inline between adjacent upstream and downstream wastewater pipes 102 such that the first pipe portion 82 forms a portion of the wastewater pipe 102.

The fluid coupler 62 further includes a vent 90 extending vertically upward from the second pipe portion 86. The vent 90 provides a fluid or air path between other plumbing fixtures via a pipe 106 (FIG. 6) separate from the wastewater pipe 102. More specifically, the pipe 106 connects to the vent 90.

Figure 7:
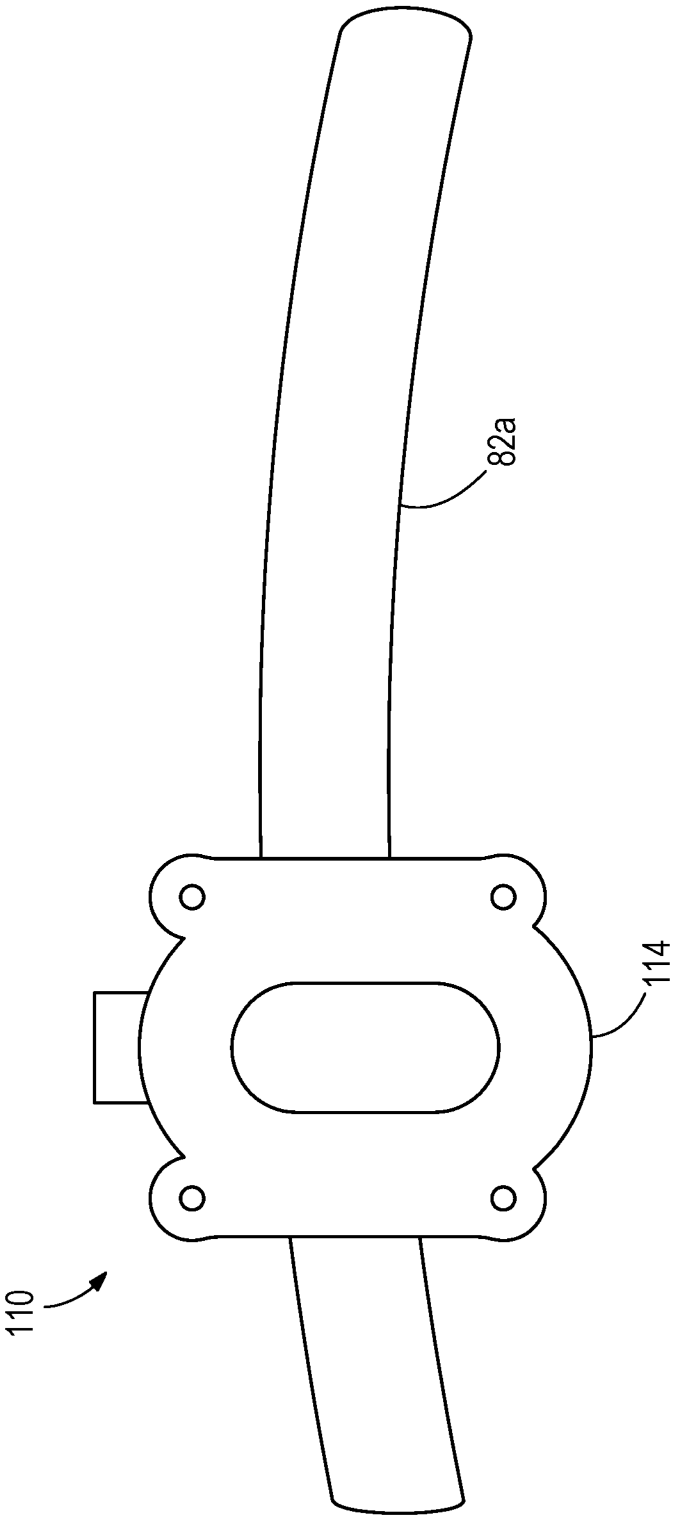
FIG. 7 illustrates another embodiment of a fluid coupler for use in a horizontal orientation.
Figure 8:
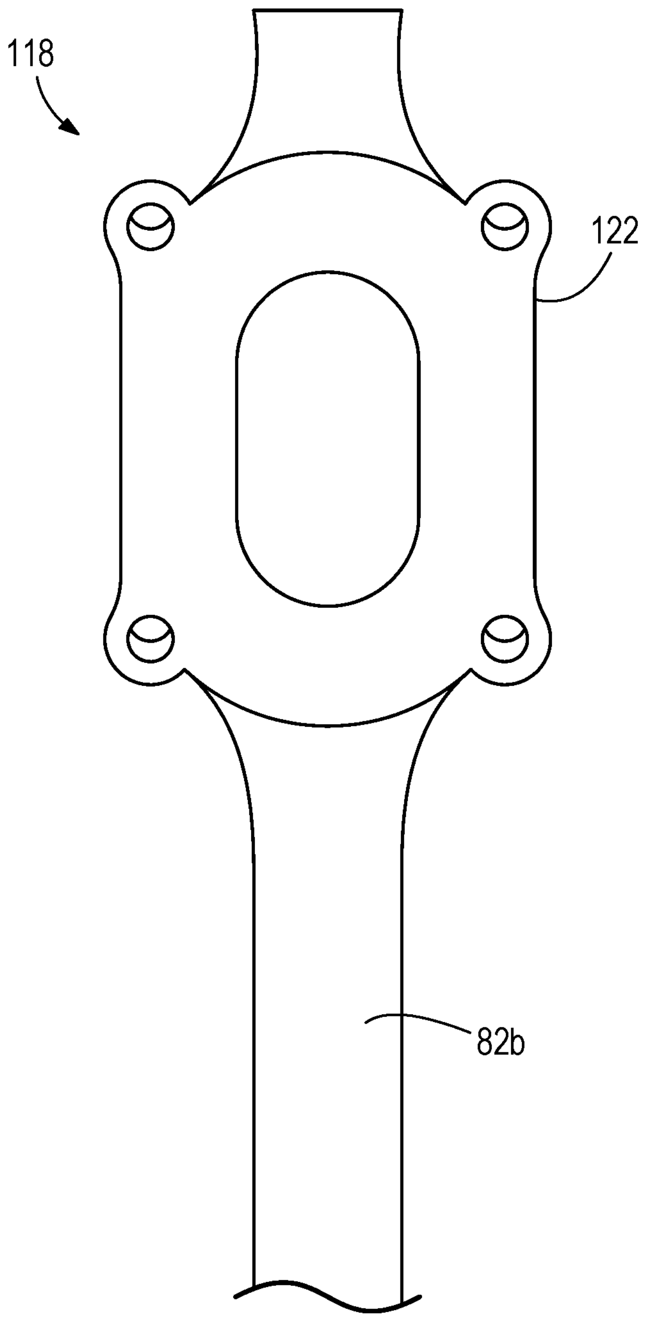
FIG. 8 illustrates another embodiment of a fluid coupler for use in a vertical orientation.

FIG. 7 illustrates another embodiment of a fluid coupler 110 that is intended for use in a horizontal orientation. In general, the horizontal orientation is used to link to an adjacent fluid coupler 110 associated with another water closet or the like (not shown). The fluid coupler 110 includes a flange or flanged end 114 that forms a substantially obround shape that is elongated in a vertical direction relative to a horizontal direction in which a horizontal first pipe portion 82*a* extends. FIG. 8 illustrates a vertical fluid coupler 118 that is implemented at the end of a run. The fluid coupler 118 includes a flange or flanged end 122 that forms a substantially obround shape that is elongated in a vertical direction similar to the vertical direction in which a vertical first pipe portion 82*b* extends.

Figure 9:
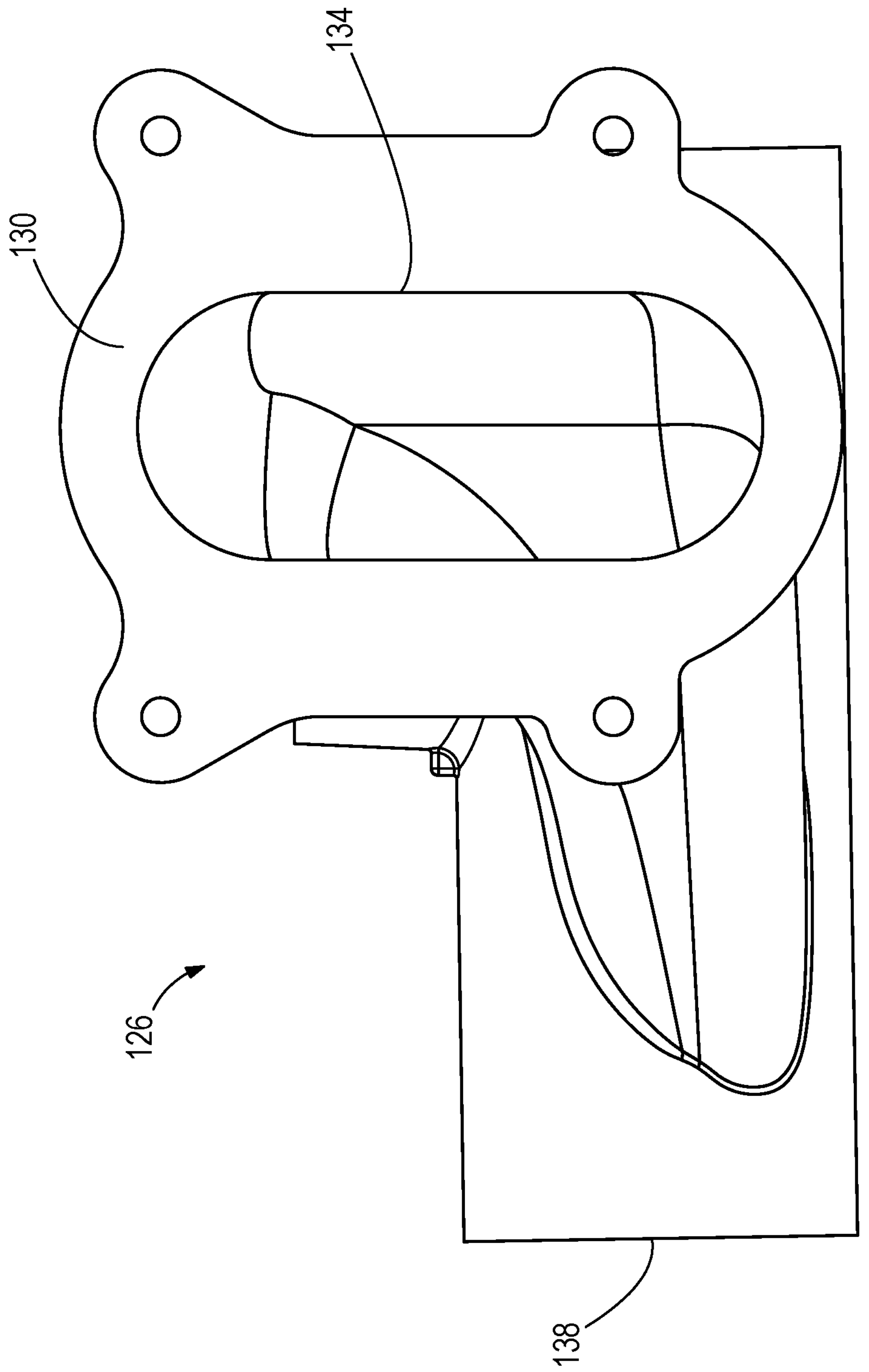
FIG. 9 illustrates another embodiment of a fluid coupler for use in a horizontal orientation coupled to a faceplate.
Figure 10:
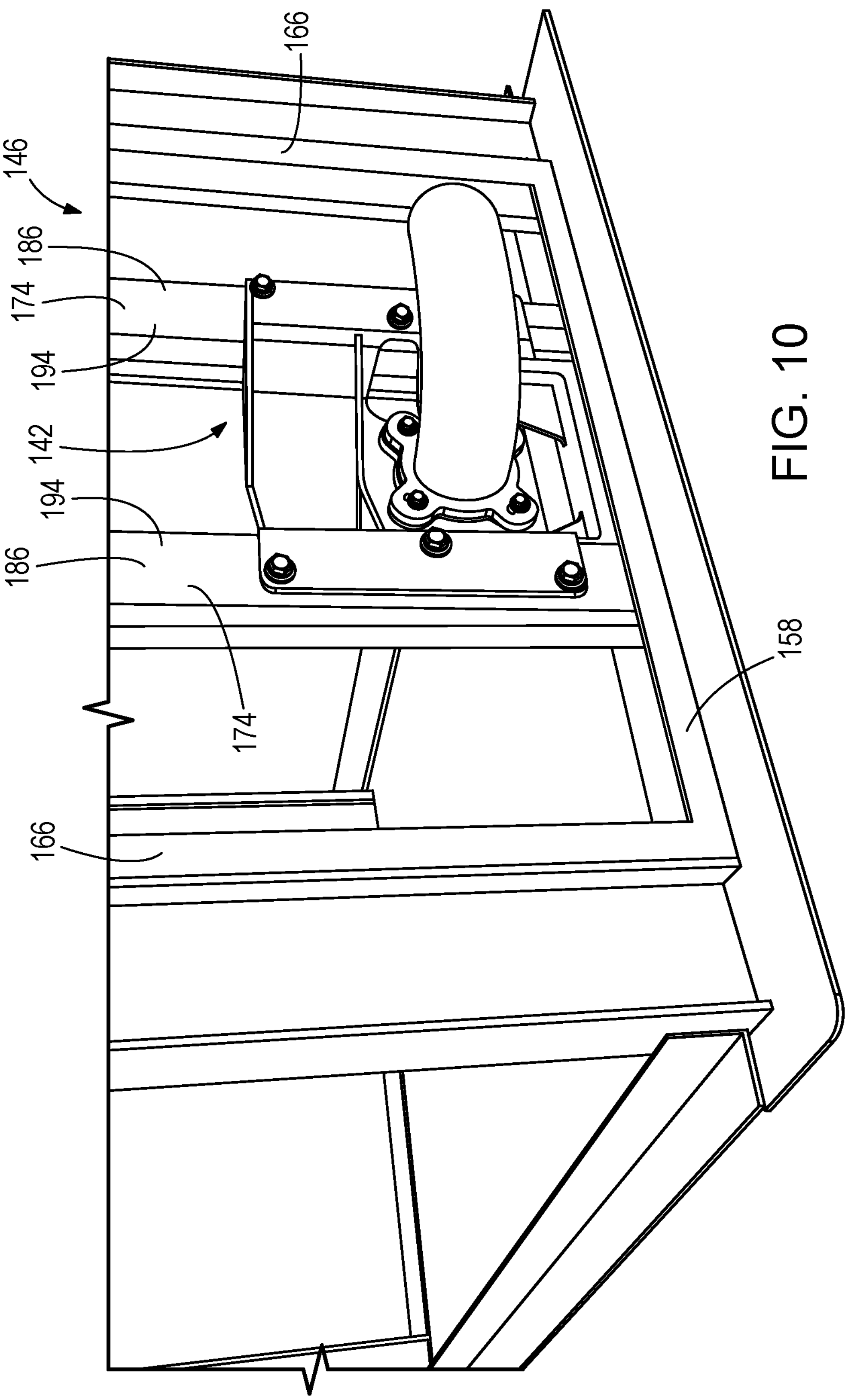
FIG. 10 illustrates another embodiment of a carrier assembly including a fluid coupler coupled to a faceplate.

FIG. 9 illustrates another embodiment of a fluid coupler 126 for providing a fluid connection point between a faceplate and a pipe or building plumbing system. The fluid coupler 126 includes a flange or flanged end 130 that forms a substantially obround shape that is elongated in the vertical direction (e.g., in a direction extending from bottom to top) relative to a horizontal direction (e.g., in a direction extending from left to right). The fluid coupler 126 includes an inlet 134 configured to form a water-tight seal with a structure (not shown), and an outlet 138 configured to form a water-tight seal with another structure or pipe (not shown).

FIGS. 10-13 illustrate another embodiment of a carrier assembly 142. The carrier assembly 142 is substantially similar to the carrier assembly 10 with the following differences described below. The carrier assembly 142 is configured for installation within a modular wall assembly 146, described below, whereby the carrier assembly 142 provides a mounting location to which a water closet may be attached. Once attached, the carrier assembly 142 is configured to transmit any loads applied to the water closet (e.g., a person sitting thereon, and the like) into the wall assembly 146 for support. In the illustrated embodiment, the carrier assembly 142 not only provides physical support for the water closet but also serves as a fluid connection by placing the outlet of the water closet into fluid communication with a corresponding wastewater pipe of the plumbing system of the building (described below).

Figure 11:
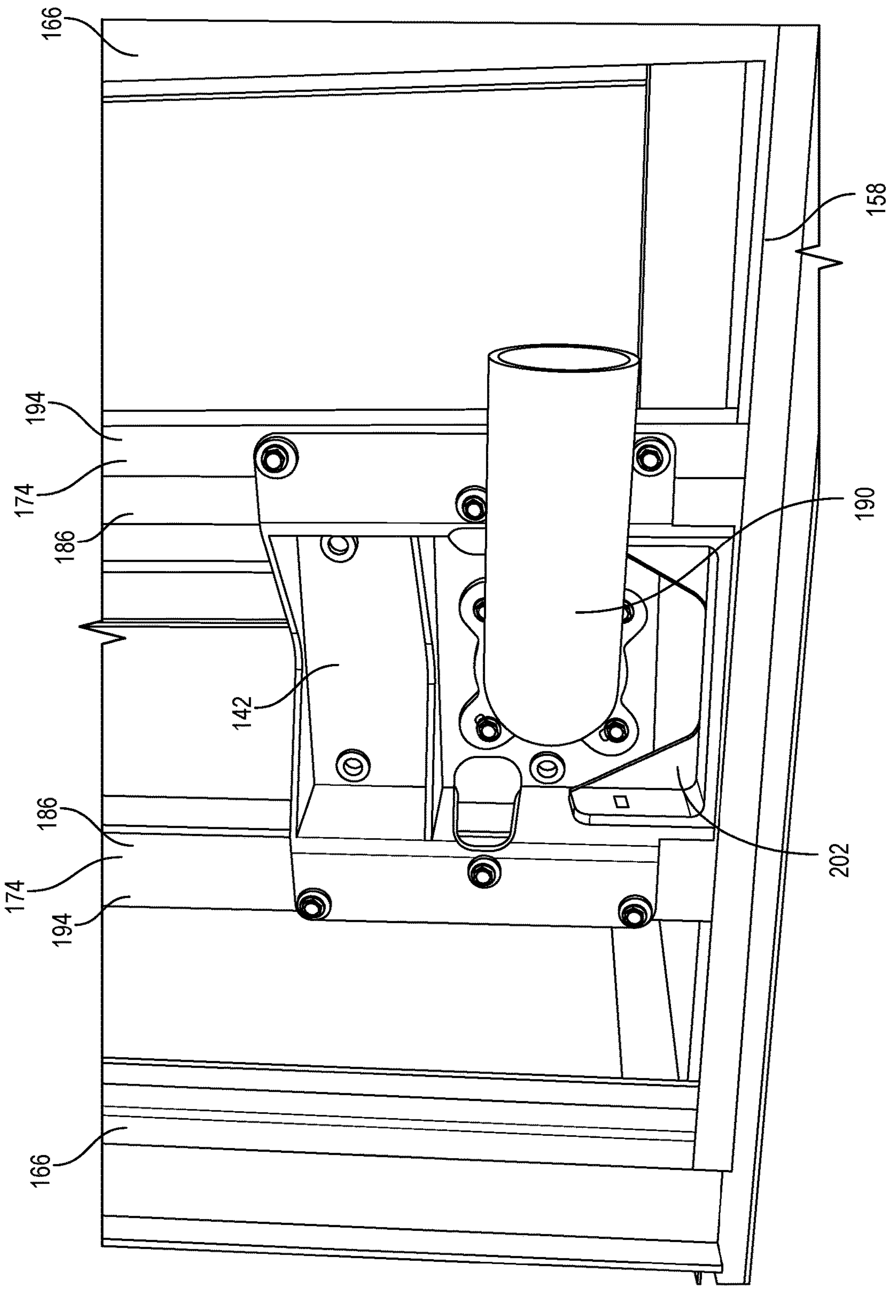
FIG. 11 illustrates the carrier assembly of FIG. 10.
Figure 12:
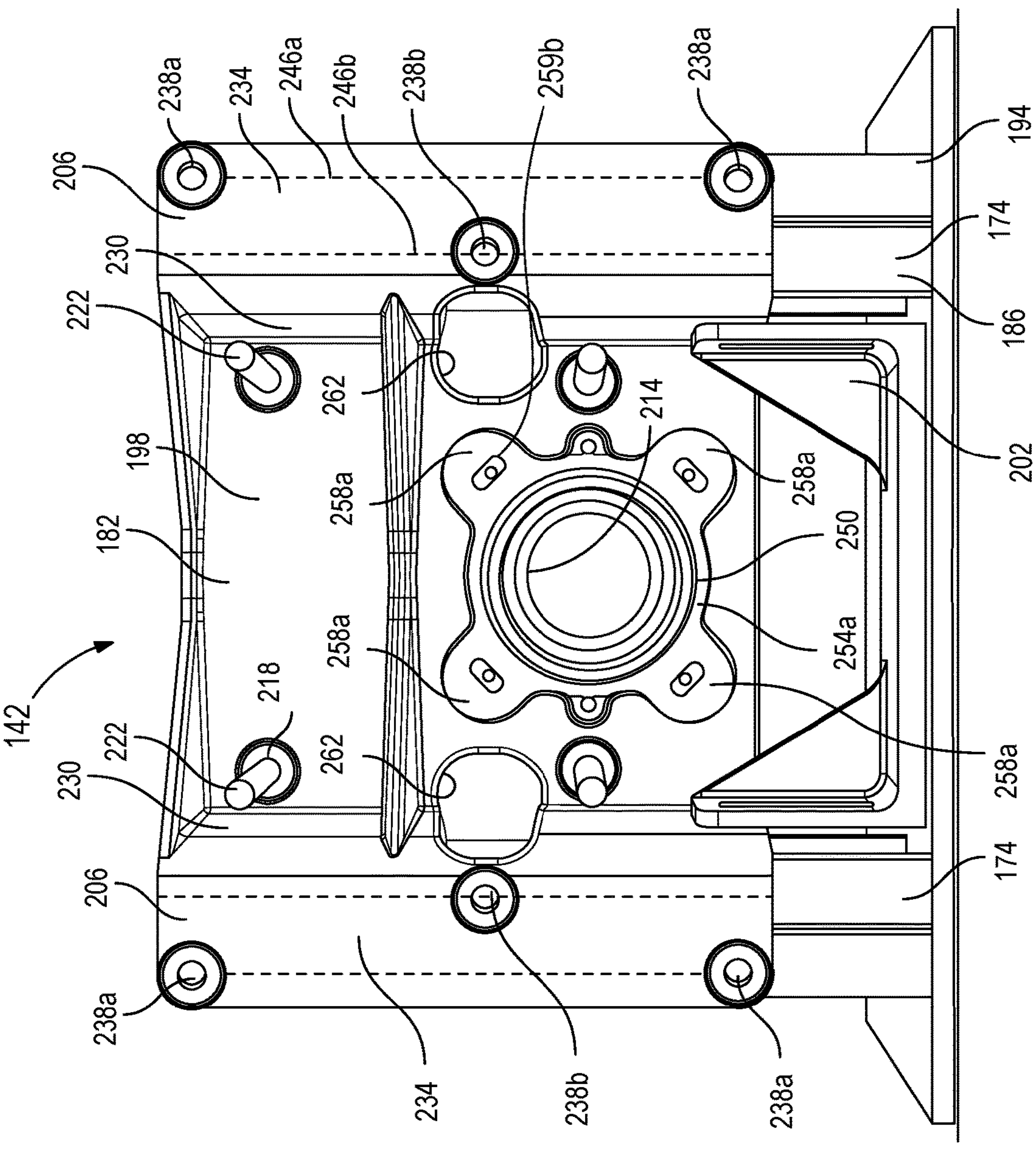
FIG. 12 illustrates the carrier assembly of FIG. 10.

With reference to FIGS. 11 and 12, the carrier assembly 142 includes a faceplate 182, an outlet tube or fluid coupler 190 coupled to the faceplate 182, and a foot support 202 extending between and coupled to the faceplate 182 and the bottom member 158 of the modular wall assembly 146. During use, the faceplate 182 and the foot support 202 are configured to be pre-installed in the modular wall assembly 146 so that the wall assembly 146, together with the faceplate 182 and foot support 202 (when present) may be installed in a building as a single unit. Once the wall assembly 146 and faceplate 182 are in place, the fluid coupler 190 and water closet may be installed to form a fluid connection with the corresponding building's plumbing system.

As shown in FIG. 12, the faceplate 182 of the carrier assembly 142 includes a central portion 198 and a pair of side portions 206 flanking the central portion 198 on opposite sides thereof. When installed, the central portion 198 and the side portions 206 are configured so that the mounting surface of the central portion 198 is aligned with the front wall surface of the modular wall assembly 146 while each side portion 206 is coupled to the rear surface of a corresponding upright 166 (e.g., a double upright 174). For example, the side portions 206 can include a first leg 230 that extends substantially perpendicular from the central portion 198 towards the rear and a second leg 234 that extends from the rearward portion of the first leg 230 in a direction substantially parallel to the central portion 198. By doing so, the illustrated faceplate 182 provides additional strength to the finished water closet assembly by minimizing the cantilevered length between the faceplate 182 and the water closet (see FIG. 13) while allowing all of the mounting points between the carrier assembly 142 and the uprights 166 of the modular wall 146 to be accessed via the rear surface 178. By doing so, the user can install and perform maintenance on the faceplate 182 without having to cut into or otherwise modify the visible wall materials (e.g., the drywall) attached to the front wall surface 170.

Figure 13:
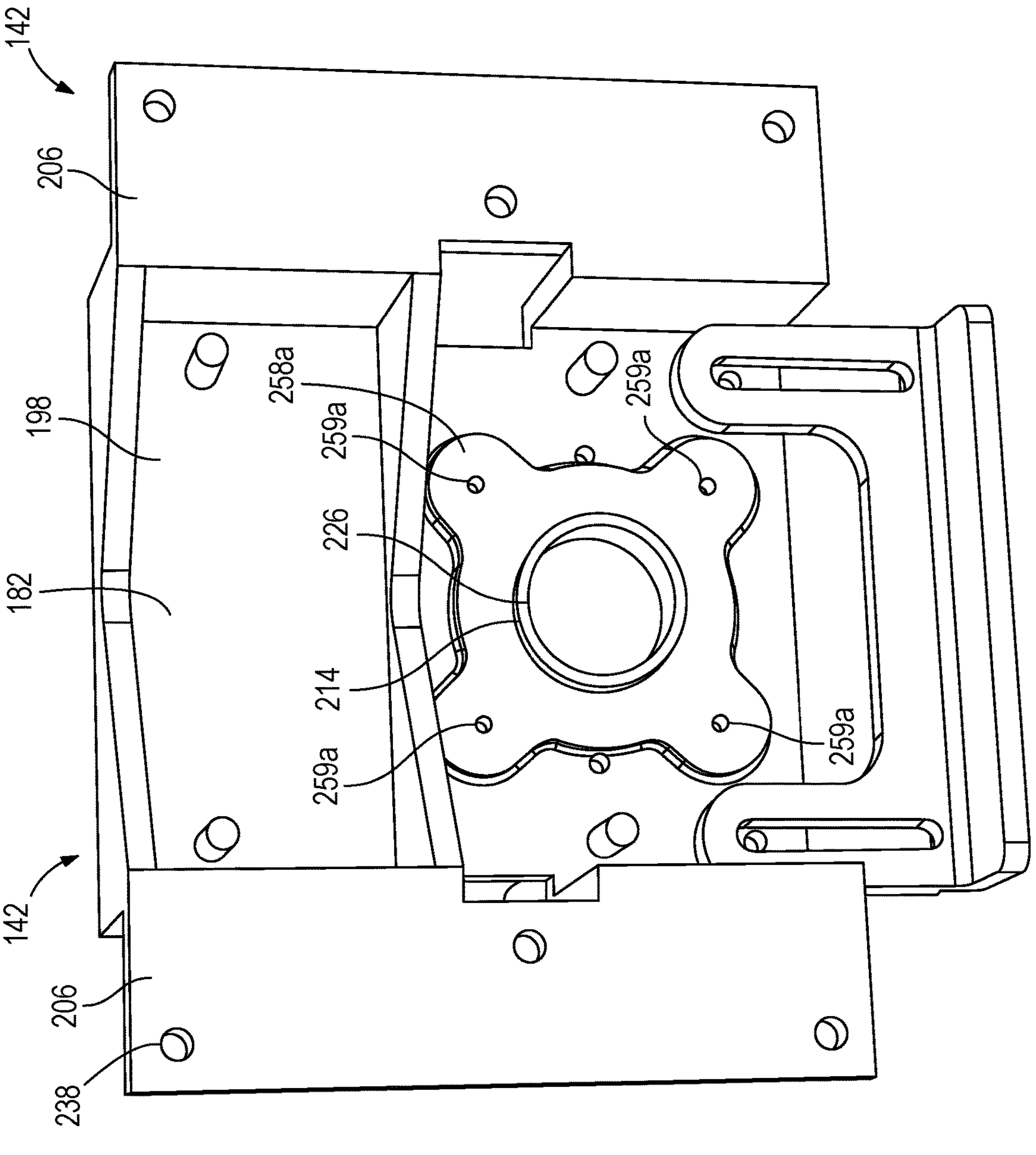
FIG. 13 illustrates the faceplate of the carrier assembly of FIG. 10.

As shown in FIGS. 12 and 13, the central portion 198 of the faceplate 182 defines the mounting surface, a fluid passageway 214, and a plurality of threaded apertures 218 configured to receive a corresponding threaded mounting element 222 therein. When assembled, the water closet is coupled to the faceplate 182 via the threaded mounting elements 222 while the fluid passageway 214 is configured to form a water-tight seal with the outlet of the water closet. In the illustrated embodiment, the fluid passageway 214 includes an aperture formed into the faceplate 182 that holds a fluid coupler 190 therein. The fluid coupler 190, in turn, is axially adjustable relative to the central portion 198 to engage and form a water-tight seal with the outlet of the water closet. In other embodiments, the fluid passageway 214 itself may form a water-tight seal with the water closet.

As shown in FIG. 12, the central portion 198 also includes a mounting hub 250 on the back side thereof and corresponding with the fluid passageway 214. More specifically, the mounting hub 250 of the central portion 198 is configured to provide a location to which a fluid coupler 190 (described below) may be attached (e.g., via the rear surface 226). The mounting hub 250 includes an annular sealing surface 254*a* encircling the fluid passageway 214 and four mounting elements 258*a* encircling the annular sealing surface 254*a* and spaced 90 degrees apart from each other.

As shown in FIG. 12, the second leg 234 of each side portion 206 defines a plurality of mounting apertures 238 sized to receive a fastener therethrough to removably couple the faceplate 182 to a pair of adjacent uprights 166 or double-uprights 174. In the illustrated embodiment, each side portion 206 includes a first set of mounting apertures 238*a*, located so a fastener passing therethrough will couple with the first upright 186 of a double-upright 174, and a second set of apertures 238*b*, located so a fastener passing therethrough will coupled with the second upright 194 of the double-upright 174. As such, once installed, the faceplate 182 is directly connected to both uprights 186, 194 of both adjacent double-uprights 174 for additional strength. In the illustrated embodiment, each aperture of the first set of mounting apertures 238*a* is positioned along a first vertical axis 246*a* that generally corresponds with the location of the first upright 186 while each aperture of the second set of mounting apertures 238*b* is positioned along a second vertical axis 246*b* that is offset from the first vertical axis 246*a* and generally corresponds with the location of the second upright 194. In some embodiments, all of the fasteners include bolts secured with nuts; in other embodiments, different types of fasteners may be used.

As shown in FIG. 12, the faceplate 182 also defines a pair of access apertures 262. Each access aperture 262 is formed into the faceplate 182 and is configured to allow the user to access the backside of the fastener passing through the second set of mounting apertures 238*b* via the rear surface of the modular wall 146. More specifically, the faceplate 182 includes an access aperture 262 formed into the first leg 230 of each side portion 206 adjacent to a corresponding aperture of the second set of mounting apertures 238*b*. The access aperture 262 then extends a sufficient distance to permit the user to place his or her hands behind the fastener to gain access thereto (e.g., the nut applied to the back of the fastener). In other embodiments, the access aperture 262 may be sized to allow a socket or wrench to gain access to the nut applied to the back of the fastener.

Figure 14:
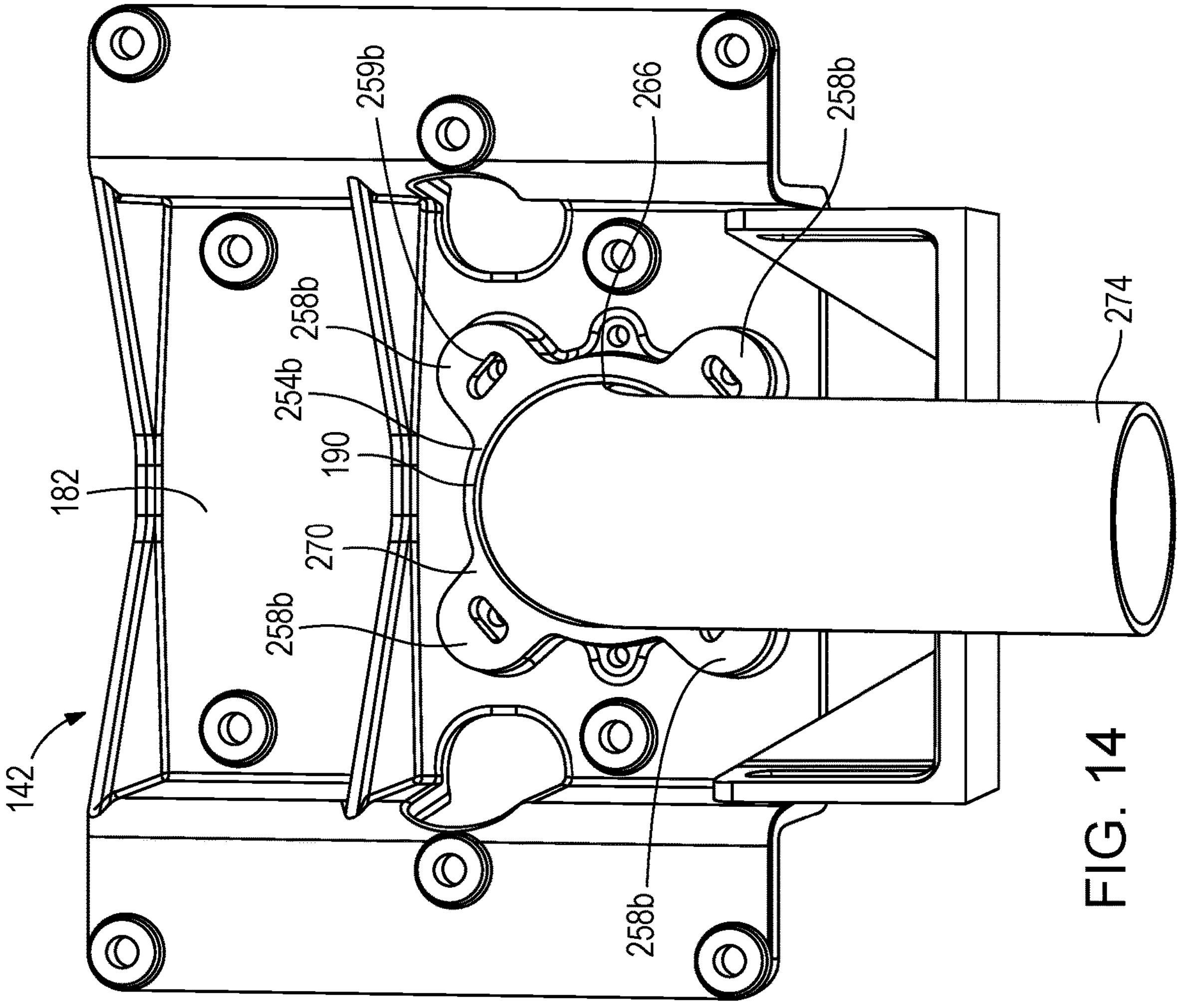
FIG. 14 illustrates a portion of the carrier assembly of FIG. 10 including the fluid coupler coupled to the faceplate.
Figure 15:
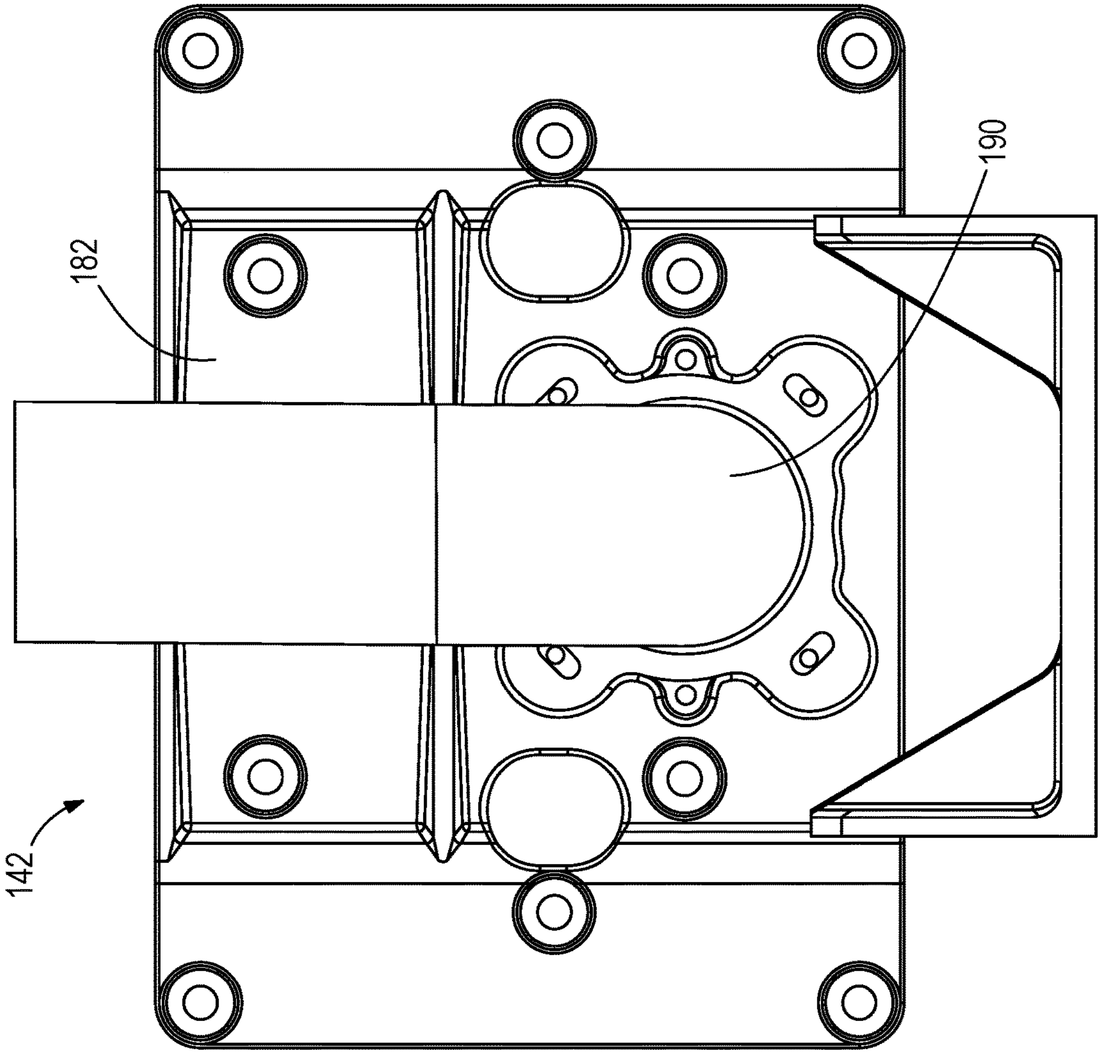
FIGS. 15-17 illustrates the fluid coupler of FIG. 14 in various orientations.
Figure 16:
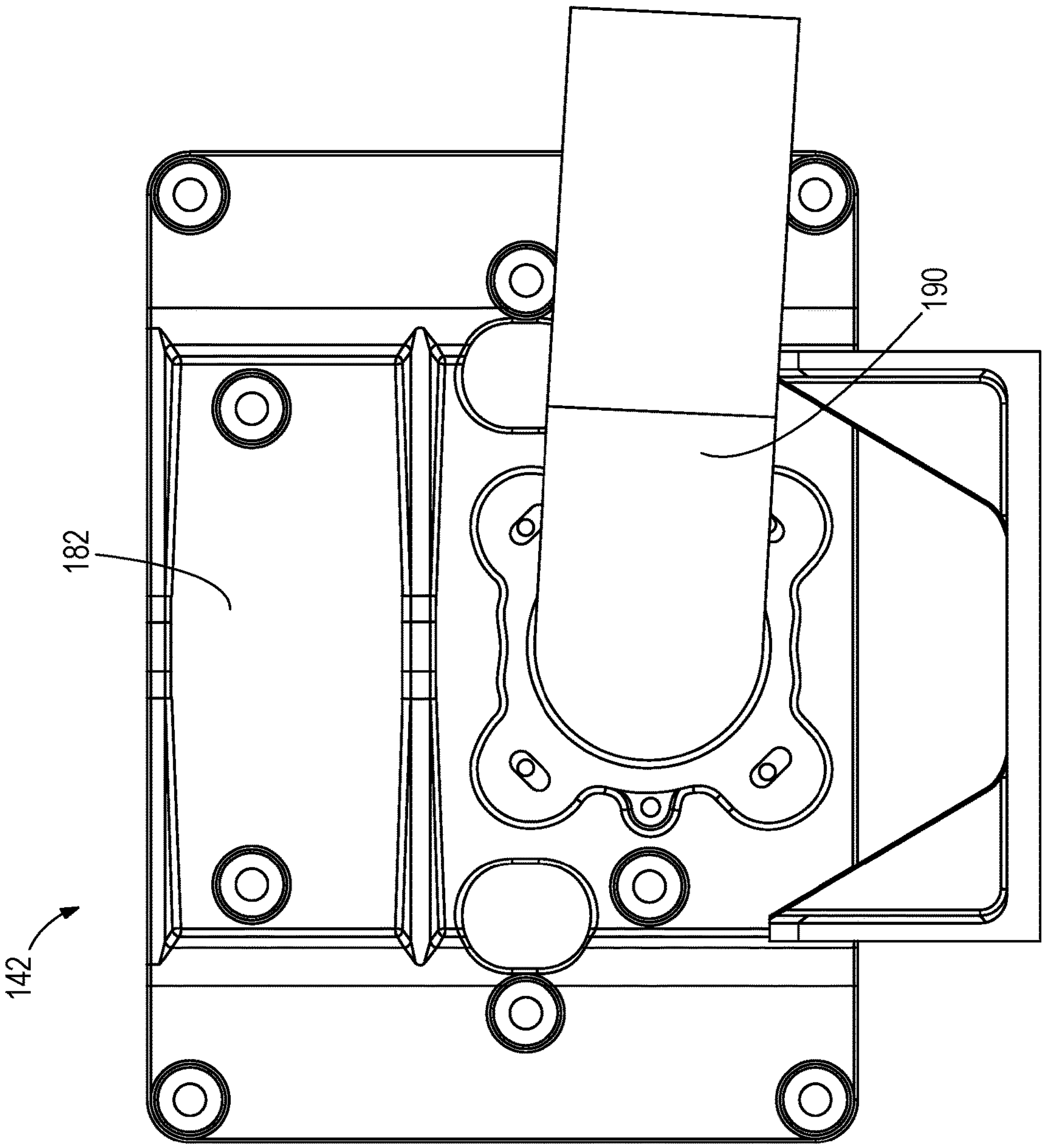
Figure 17:
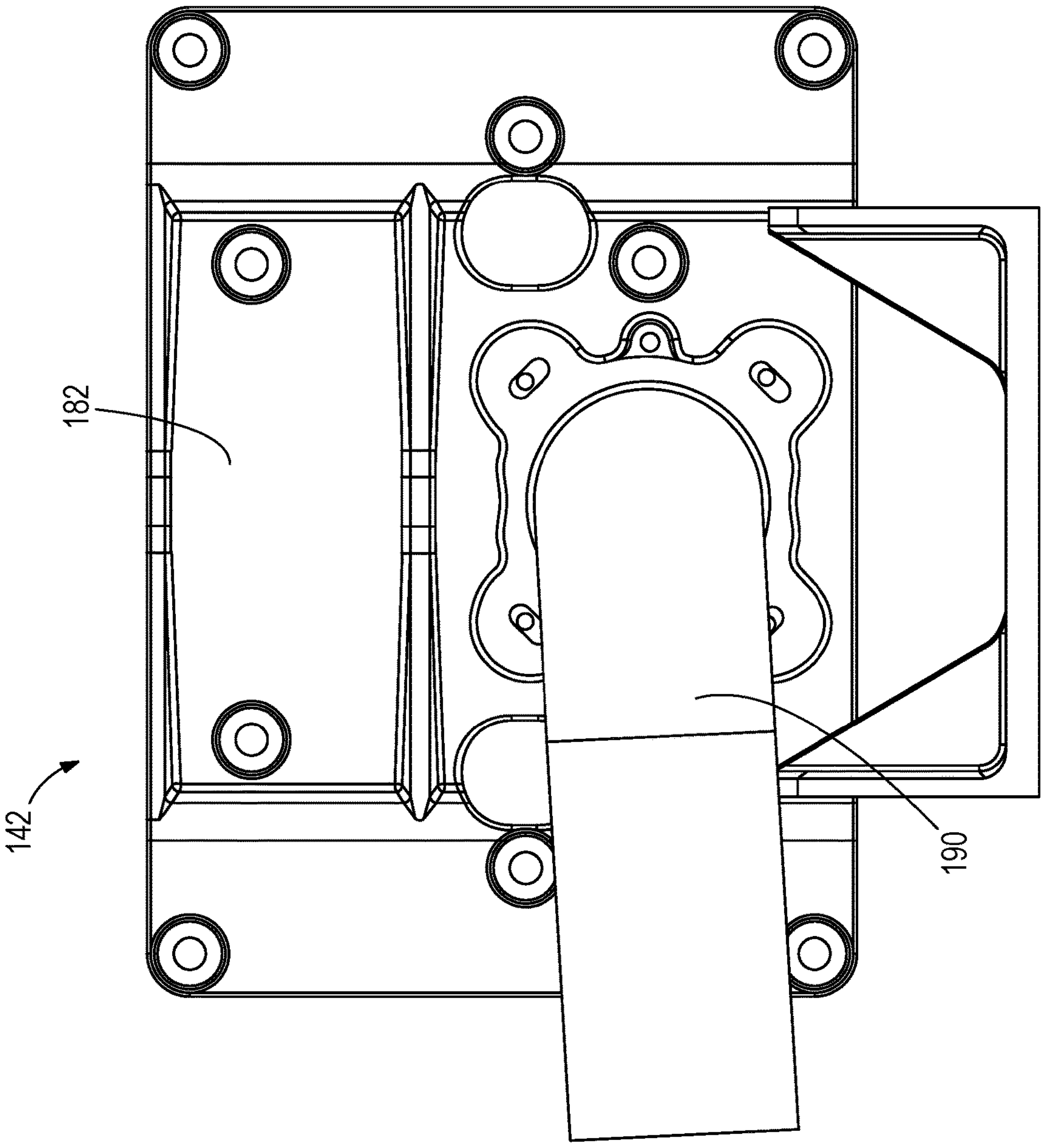

With reference to FIG. 14, the carrier assembly 142 also includes a fluid coupler 190 couplable to the fluid passageway 214 of the faceplate 182 to form a water-tight connection therewith. More specifically, the fluid coupler 190 is configured to be coupled to and establish a fluid connection between the water closet (e.g., via the fluid passageway 214) and the plumbing system of the corresponding building. In the illustrated embodiment, the fluid coupler 190 includes an elongated tube having a first end 266 forming a mounting flange 270 sized and shaped to correspond with the mounting hub 250 of the faceplate 182, and a second end 274 opposite the first end 266. As shown in FIG. 14, the fluid coupler 190 includes a bend therein to form a generally "L" shaped or "J" shaped pipe. When installed, the second end 274 of the fluid coupler 190 is configured to be attached to a wastepipe of the building's plumbing system. While the illustrated fluid coupler 190 is "L" shaped, it is understood that in alternative embodiments the fluid coupler may be straight or have other shapes as needed to produce a fluid connection between the water closet and the building's plumbing system. However, it should be appreciated that the fluid coupler 190 is not limited to providing a fluid connection point between the water closet and a corresponding wastewater pipe. The fluid coupler 190 can provide a fluid connection point between any desirable structures, pipes, or a building's plumbing system. The disclosure is capable of other applications, and of being practiced or of being carried out in various ways.

With reference to FIGS. 14-17, the mounting flange 270 of the fluid coupler 190 is configured so that it can be coupled to the mounting hub 250 of the faceplate 182 in a plurality of different orientations while maintaining fluid communication with the fluid passageway 214 and a fluid tight seal with the faceplate 182 in each position. More specifically, both the mounting flange 270 and the mounting hub 250 include corresponding annular sealing surfaces **254*a*, 254*b* and equally spaced mounting elements 258*a*, 258*b* so that the fluid coupler 190 can be mounted to the faceplate 182 into any position where the mounting elements 258*b* of the fluid coupler 190 align with the mounting elements 258*a* of the faceplate 182. As such, the number of mounting elements 258*a*, 258*b* defines the number of two "mounting positions" that are possible between the two elements. In the illustrated embodiment, four mounting elements 258*a*, 258*b* are present in both components spaced 90 degrees apart. As such, the fluid coupler 190 can be coupled to the faceplate 182 in four orientations spaced 90 degrees apart (e.g., so that the second end 274 of the fluid coupler 190 is facing vertically up, vertically down, horizontally right, and horizontally left) (FIGS. 14-17). However, in alternative embodiments more or fewer mounting elements 258*a*, 258*b* may be present to permit more or fewer mounting positions (e.g., eight mounting elements 258*a*, 258*b* allowing eight mounting locations spaced 45 degrees apart, or two mounting elements 258*a*, 258*b* allowing two mounting locations spaced 180 degrees apart, and the like). In still other embodiments, the number of mounting elements 258*a*, 258*b* may not be equal in both elements. In such embodiments the faceplate 182 may have more than the mounting flange 270 so provide for additional mounting location options (e.g., four mounting elements 258*b* on the flange 270 and eight mounting elements 258*a* on the faceplate 182** to allow 8 total mounting orientations spaced 45 degrees apart).

As shown in FIGS. 12 and 13, in the illustrated embodiment, the mounting elements **258*a* of the faceplate 182 include threaded apertures 259*a* while the mounting elements 258*b* of the fluid coupler 190 include slots 259*b* so that fasteners passing through the slots 259*b* and received within the threaded apertures 259*a* can be used to couple the fluid coupler 190 to the faceplate 182 (e.g., installed from behind). More specifically, the slots 259*b* of the fluid coupler 190 are elongated so that the fluid coupler 190 can be rotated a few degrees in each direction (e.g., counterclockwise or clockwise) at a particular mounting location. For example, if the fluid coupler 190 is mounted to the faceplate 182 so that the second end 274 is located at the 3 o'clock position (e.g., at 90 degrees, see FIG. 16), the fluid coupler 190 may further be rotated a few degrees Clockwise and counterclockwise from that position (e.g., between 86 to 94 degrees). This capability is present at each of the four possible mounting locations (e.g., between 176 and 184 degrees if mounted at the 6 o'clock position, and the like). In some embodiments, the slots are sized to allow the axis of the fluid coupler 190** to be adjusted ±2 degrees, ±3 degrees, ±4 degrees, ±5 degrees, ±6 degrees, ±7 degrees, ±8 degrees, ±9 degrees, ±10 degrees, ±15 degrees, ±20 degrees from the nominal mounted position.

With reference to FIG. 11, the carrier assembly 142 also includes a support 202 coupled to the faceplate 182 and engaging the bottom member 158 of the modular wall assembly 146 to transmit forces therebetween. During use, the support 202 is configured to provide additional strength and support to the faceplate 182 by providing an additional point of contact between the faceplate 182 and the wall 146. While the illustrated support 202 is only mounted to the faceplate 182 (e.g., at the side portion 206), it is understood that in alternative embodiments the support 202 may also be coupled to the bottom member 158 of the modular wall assembly 146. Furthermore, the support 202 is adjustable so that the support 202 can accommodate for the faceplate 182 being mounted at different vertical heights. In still other embodiments the support 202 may be attached to the faceplate 182 at different locations.

Figure 18:
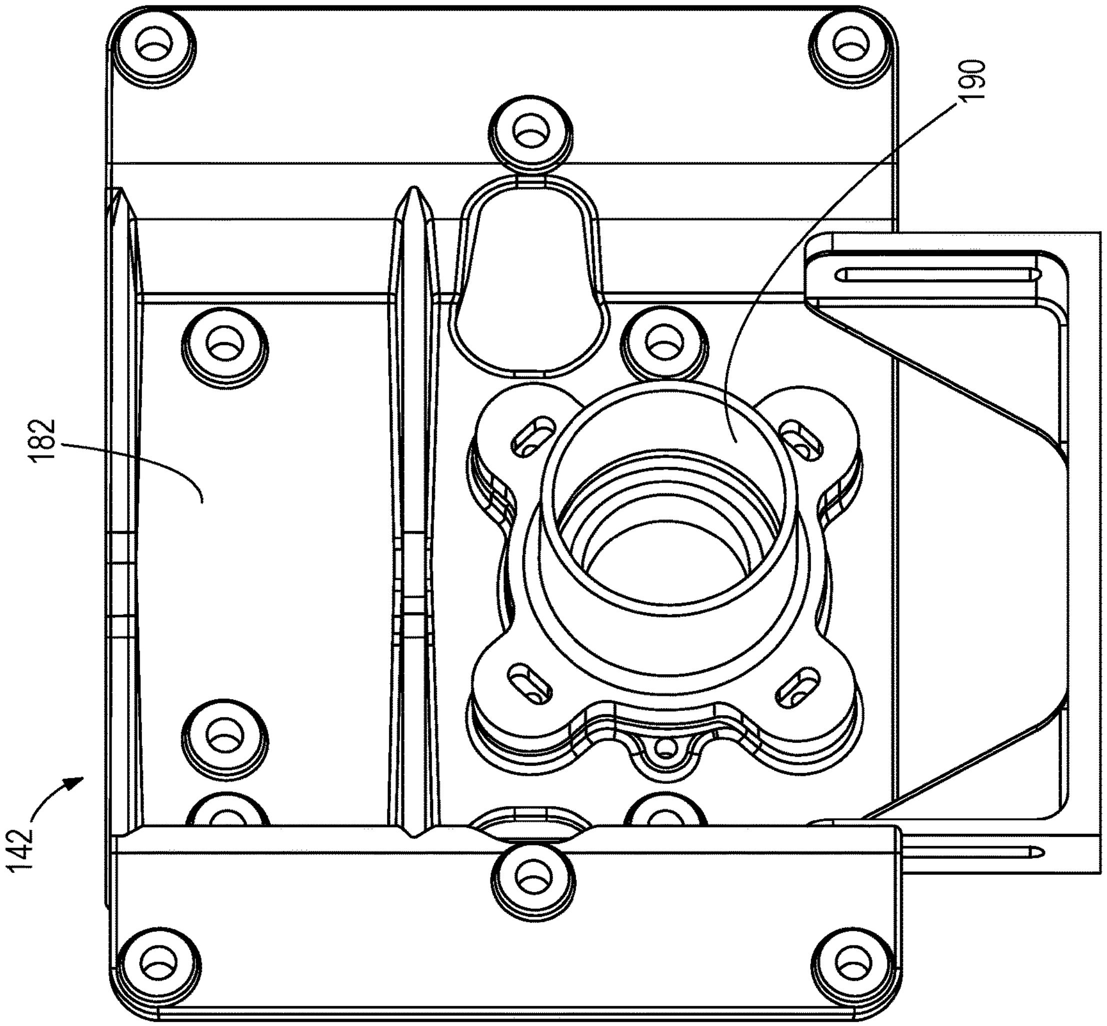
FIGS. 18 and 19 illustrate an outlet connector coupled a faceplate.
Figure 19:
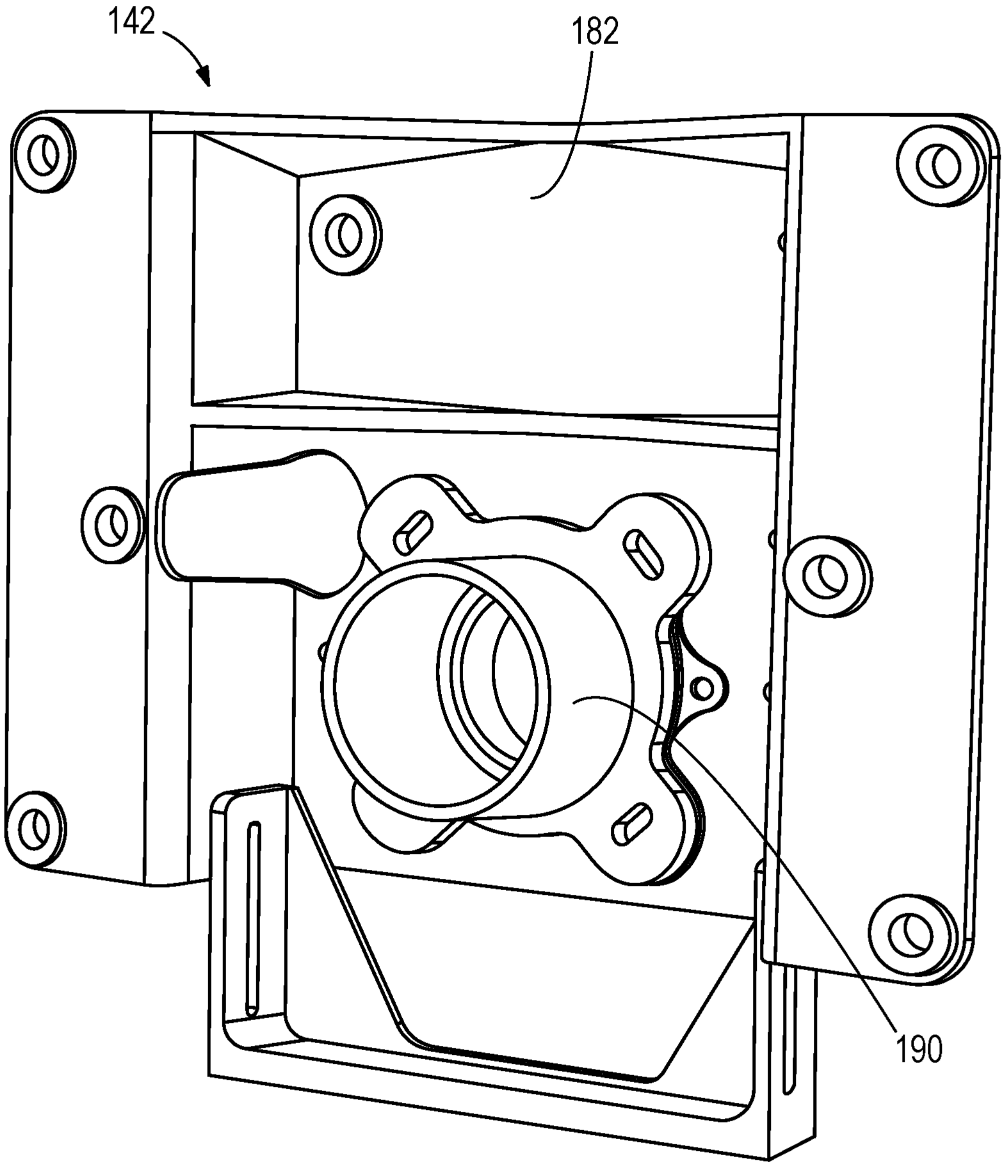
Figure 20:
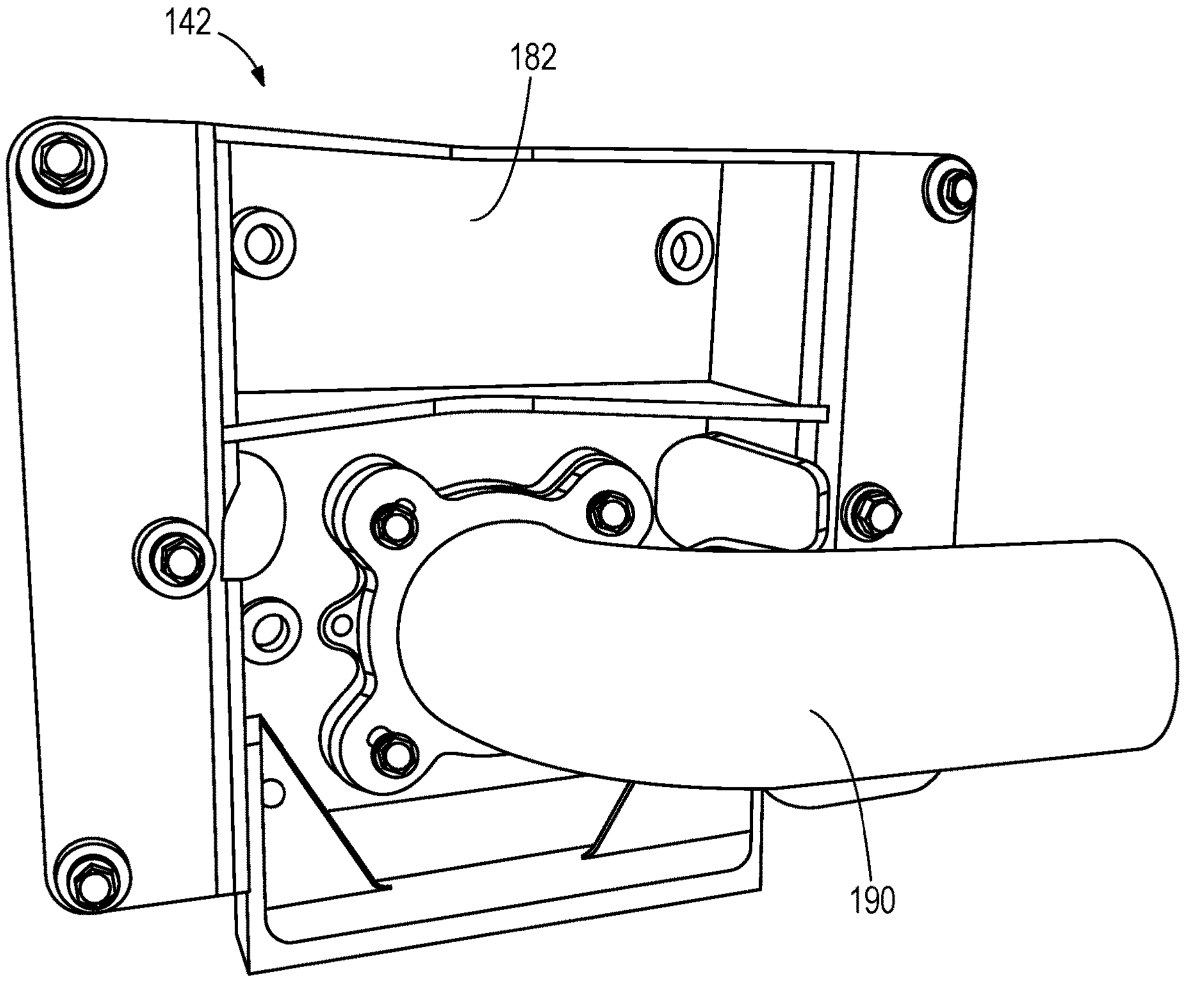
FIG. 20 illustrates the fluid coupler of FIG. 14 for use in a horizontal orientation.

As shown in FIGS. 18-20, a faceplate 182 may be configured to interchangeably be coupled to various styles of fluid couplers 190.

Figure 21:
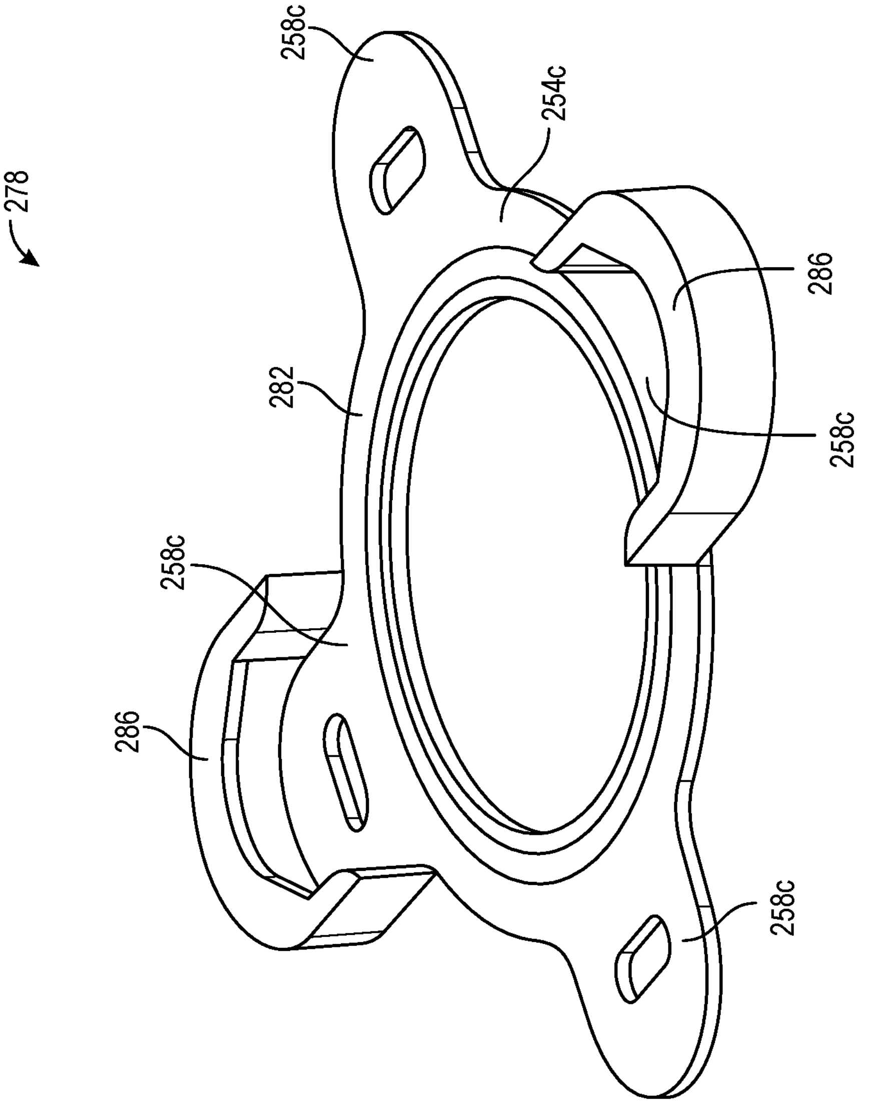
FIGS. 21-23 illustrate a gasket for use on a fluid coupler.
Figure 22:
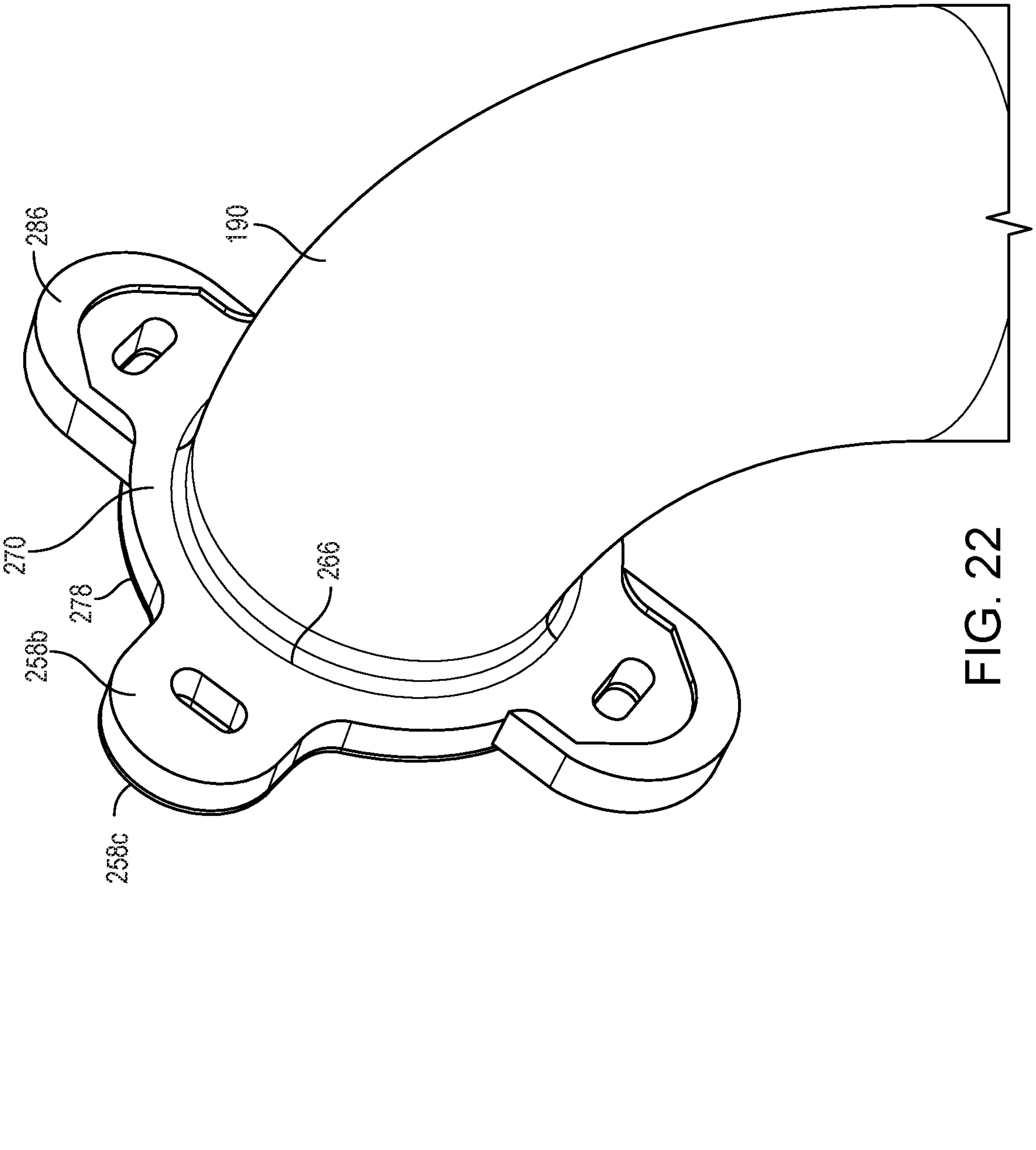
Figure 23:
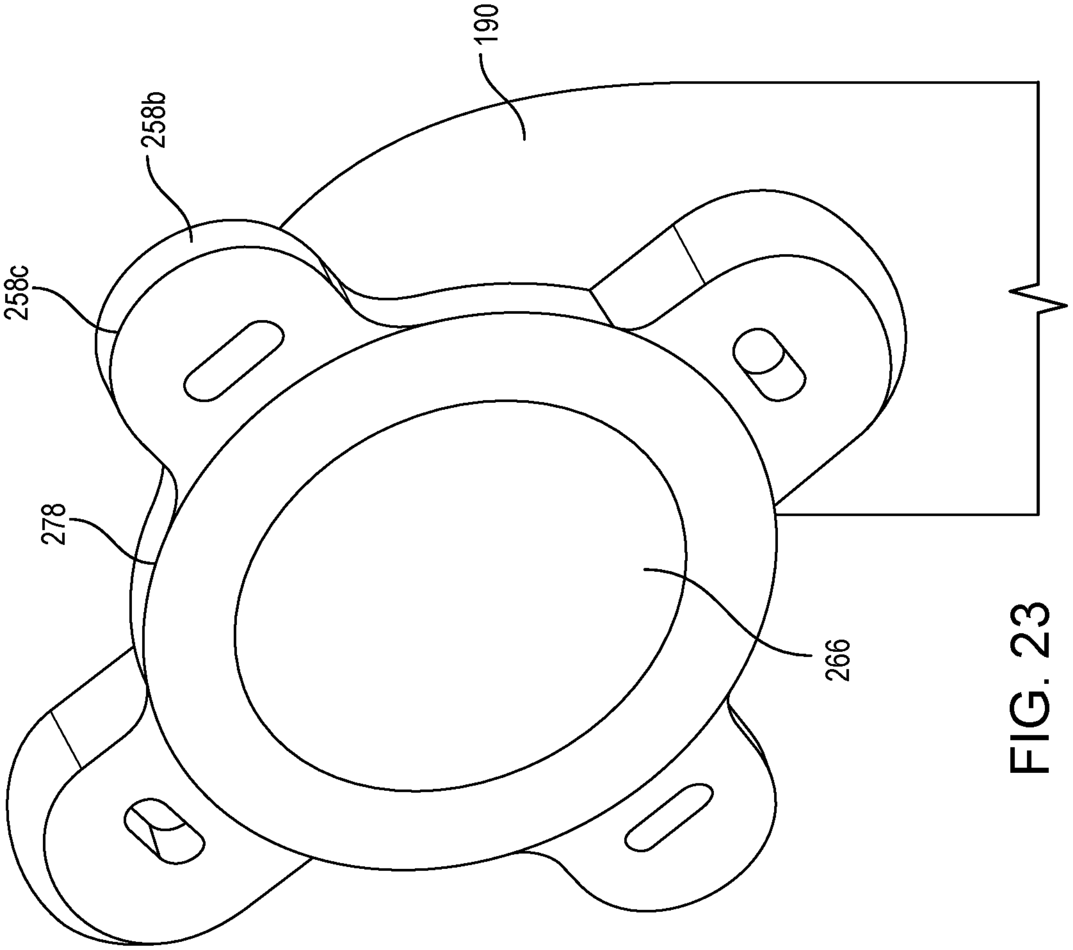

As shown in FIGS. 21-23, the fluid coupler 190 is coupled to the faceplate 182 using a gasket 278. The gasket 278 is formed from a gasket material (e.g., rubber, silicone, fiber, cardboard, and the like) and includes an overall planar body 282 with a size and shape that generally corresponds to the shape of the mounting hub 250 and the mounting flange 270. More specifically, the body 282 includes an annular sealing surface **254*c* and four mounting elements 258*c* extending radially outwardly therefrom. In some embodiments, the body 282 may also include an annular ridge or other structures (e.g., ribs or grooves) formed into the sealing surface 254*c*** to aid with sealing.

As shown in FIG. 21, the gasket 278 also forms one or more pockets 286 configured to at least partially receive a portion of a mounting element **258*b* of the mounting flange 270 of the fluid coupler 190 therein. By doing so, the gasket 278 is removably coupled to the first end 266 of the fluid coupler 190 and properly aligned therewith without using a separate adhesive. In the illustrated embodiment, the gasket 278 includes a pair of pockets 286 spaced 180 degrees apart (e.g., to receive opposite mounting elements 258*b* therein) but in other embodiments more or fewer pockets 286 may be present. During assembly, the pockets 286 allow the user to couple the gasket 278 to the first end 266 of the fluid coupler 190 where it will remain in place even with no fasteners present. With the gasket 278 in position, the fluid coupler 190 may then be maneuvered relative to the faceplate 182 and installed without having to hold the gasket 278 in place. Furthermore, with the pockets 286 being configured to interact with the exterior of the flange 270, the gasket 278 may be held in place without narrowing or otherwise reducing the cross-sectional shape of the inlet of the fluid coupler 190**.

Figure 24:
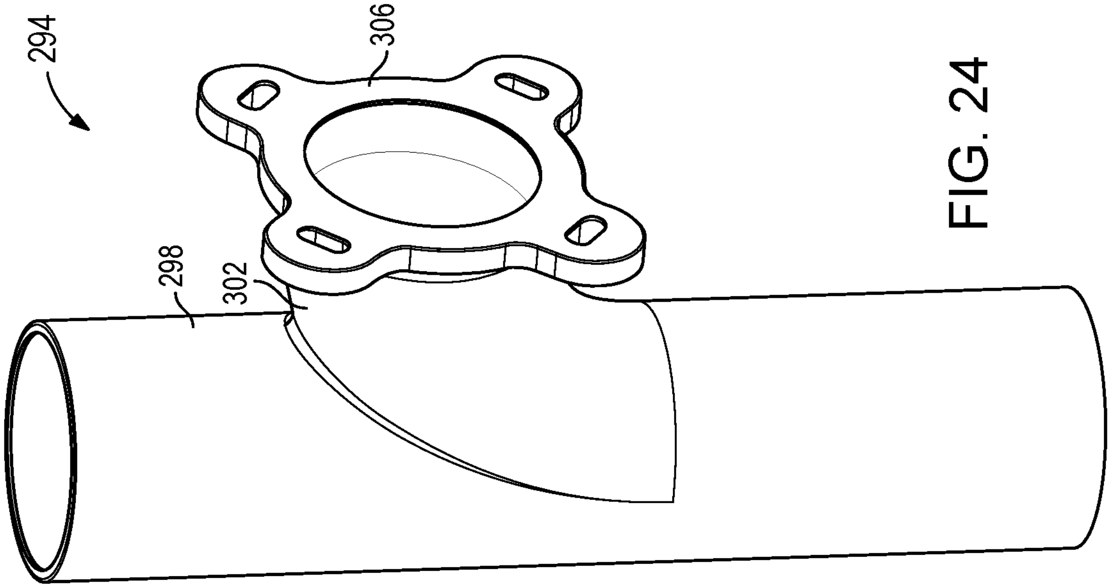
FIG. 24 illustrates another embodiment of a fluid coupler.

FIG. 24 illustrates another embodiment of a fluid coupler 294. The fluid coupler 294 is substantially similar to the fluid coupler 190, with the following differences described below. The fluid coupler 294 includes a primary segment 298 and a secondary segment 302 extending from the primary segment 298. The primary segment 298 is an elongated pipe being substantially linear in shape. The secondary segment 302, in turn, extends from the primary segment 298 along the length thereof to produce a flanged end 306 oriented perpendicular to the primary segment 298.

Figure 27:
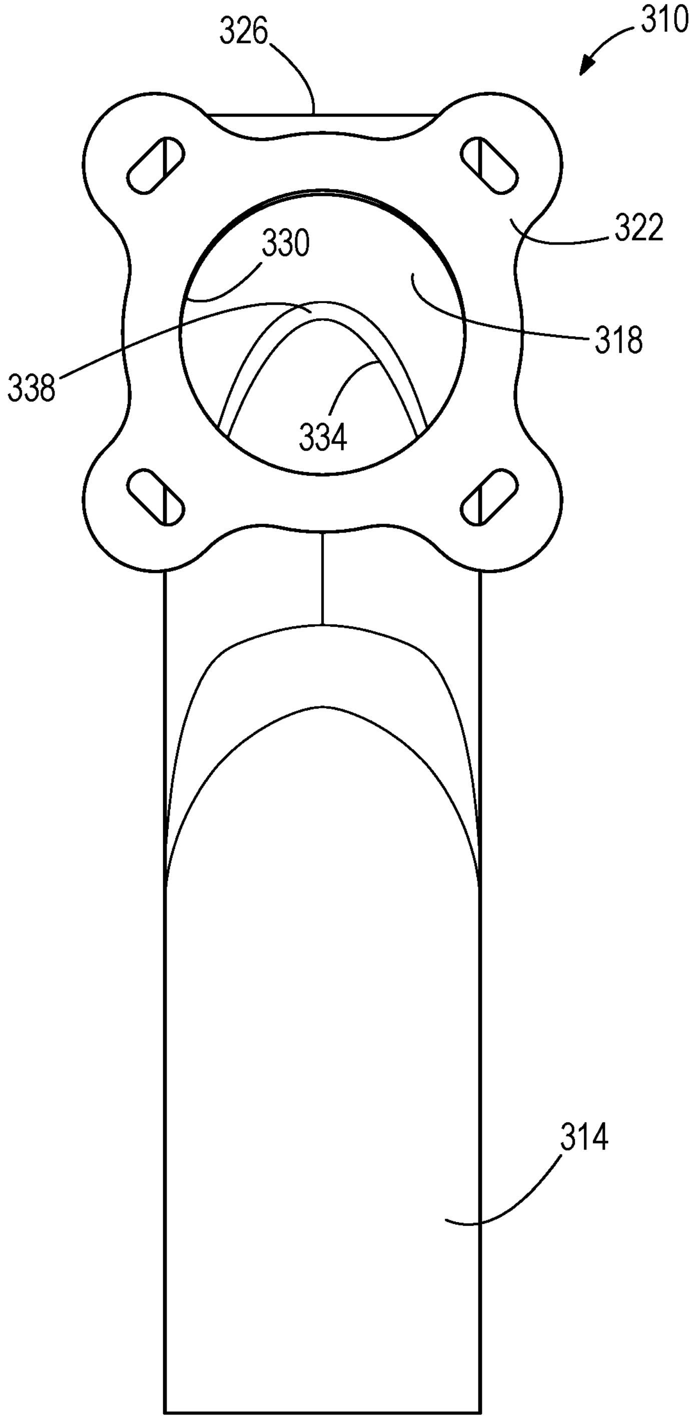
Figure 28:
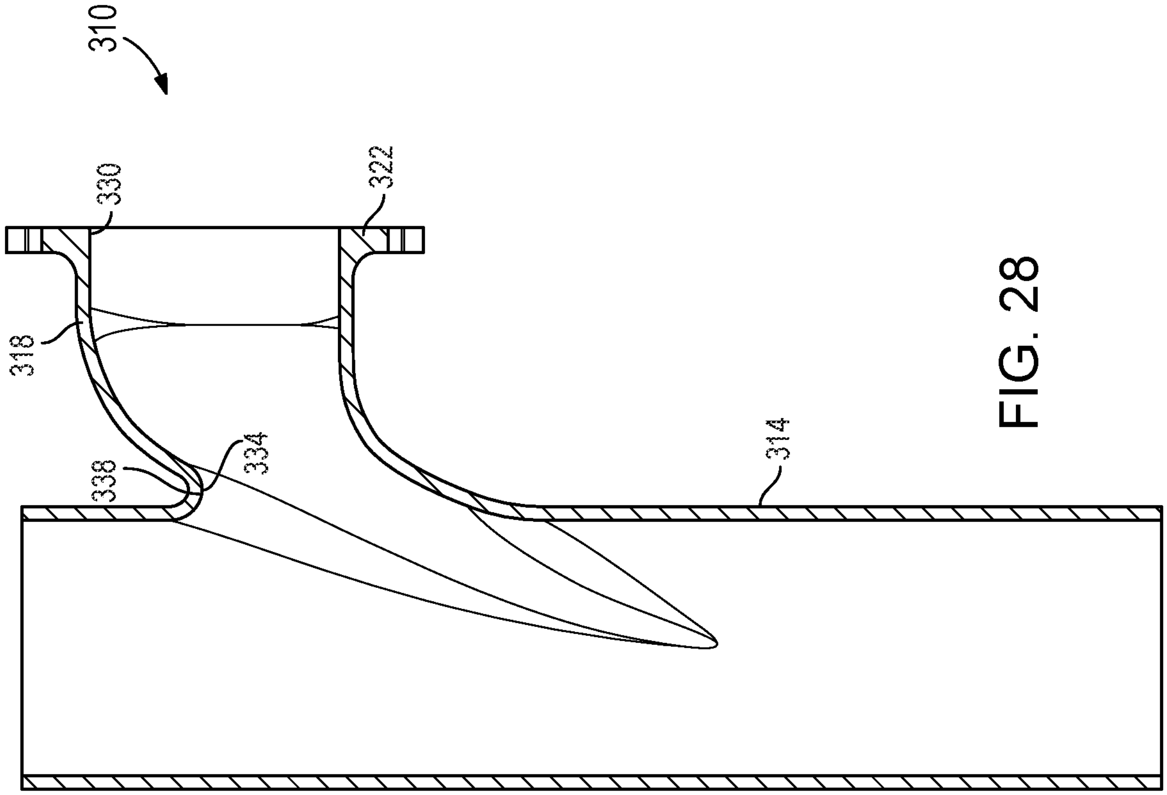

FIGS. 25-28 illustrate another embodiment of a fluid coupler 310. The fluid coupler 310 is substantially similar to the fluid coupler 294. As such, only the differences will be described in detail herein. The secondary segment 318 extends from the primary segment 314 along the length thereof to produce a flanged end 322 oriented perpendicular to the primary segment 314. The secondary segment 318 is sized and shaped to encourage improved fluid flow from the secondary segment 318 into the primary segment 314. More specifically, the secondary segment 318 is sized and shaped to minimize backflow toward a first end 326 of the primary segment 314 and encourage flow toward the second end. As shown in FIG. 27, the secondary segment defines an inlet cross section 330 defined by the flanged end 322 and an outlet cross section 334 defined by the location at which the secondary segment 314 enters into the primary segment 314. In the illustrated embodiment, the outlet cross section 334 is laterally offset relative to the inlet cross section 330 so that the upstream point 338 of the outlet 334 is offset by approximately 50% of the diameter of the inlet cross section 330. In other embodiments, the upstream point 338 is laterally offset between 30% and 60% of the upstream diameter, between 25% and 75% of the upstream diameter, between 50% and 100% of the upstream diameter, between 60% and 100% of the upstream diameter, and between 75% and 100% of the upstream diameter.

Figure 29:
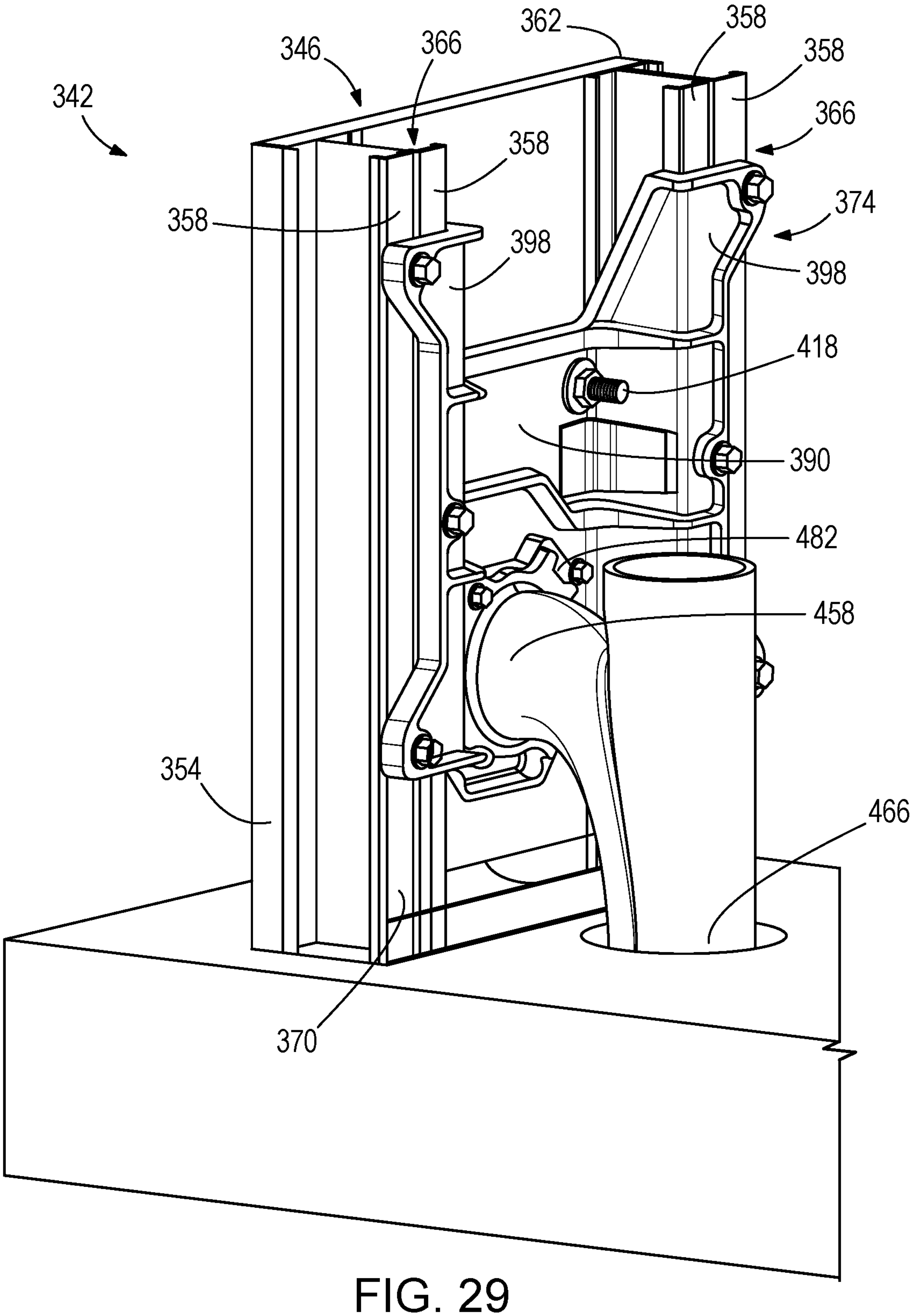
FIGS. 29 and 30 illustrate another embodiment of a carrier assembly including a fluid coupler.
Figure 30:
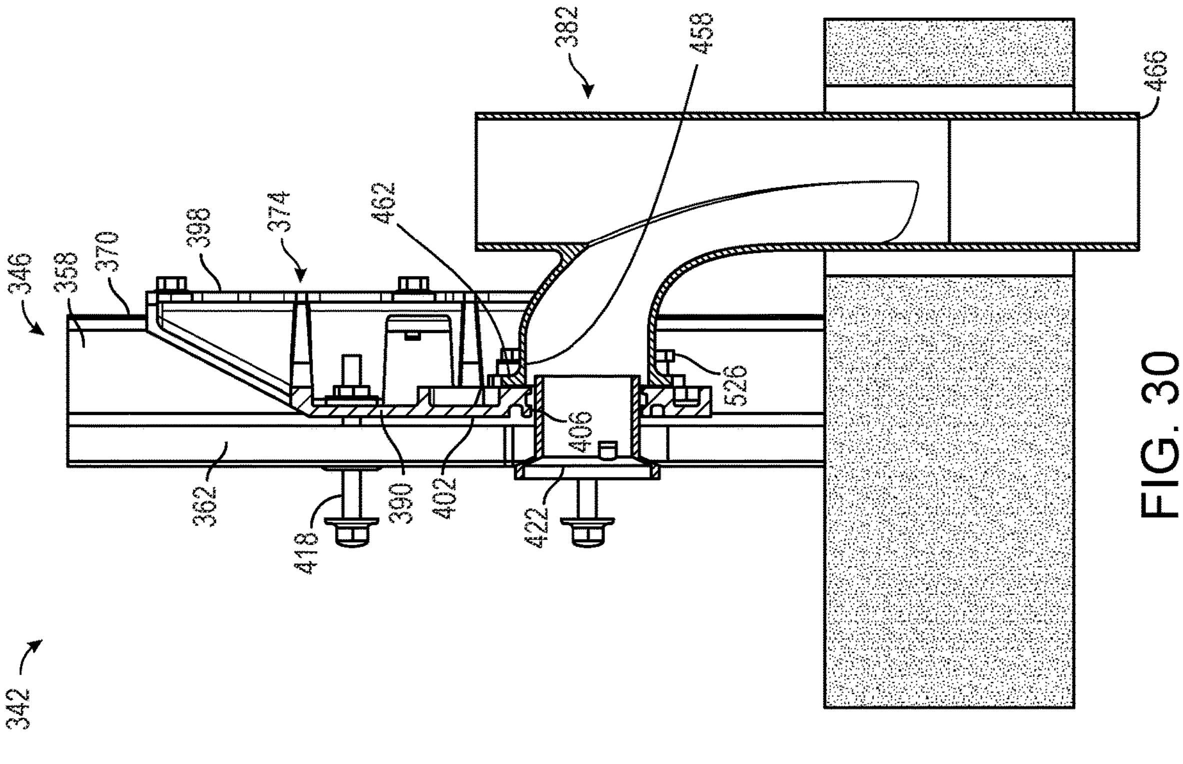
Figure 31:
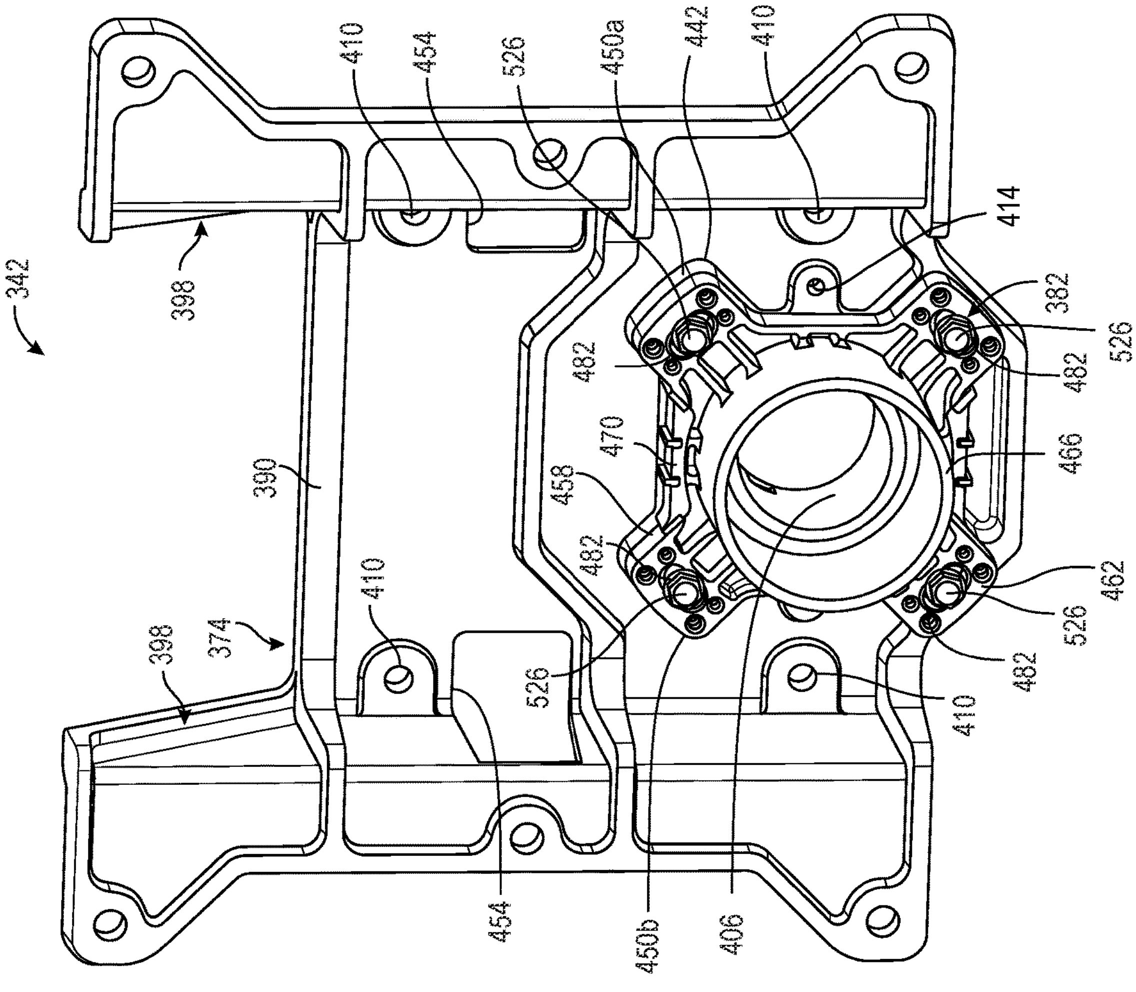
FIG. 31 illustrates a portion of the carrier assembly of FIGS. 29 and 30.

FIGS. 29-31 illustrate another embodiment of a carrier assembly 342 including various embodiments of outlet connectors 382. The carrier assembly 342 is substantially similar to the carrier assembly 142, with the following differences described below. The carrier assembly 342 is configured for installation within a modular wall assembly 346, described below, whereby the carrier assembly 342 provides a mounting location to which a water closet (not shown) may be attached. Once attached, the carrier assembly 342 is configured to transmit any loads applied to the water closet (e.g., a person sitting thereon, and the like) into the wall assembly 346 for support. In the illustrated embodiment, the carrier assembly 342 not only provides physical support for the water closet but also serves as a fluid connection by placing the outlet of the water closet into fluid communication with a corresponding wastewater pipe of the plumbing system of the building (described below).

As shown in FIGS. 29-31, the carrier assembly 342 also includes an outlet connector 382 couplable to the fluid passageway 406 of the faceplate 374 to form a water-tight connection therewith. More specifically, the outlet connector 382 is configured to be coupled to and establish a fluid connection between the water closet (e.g., via the fluid passageway 406 and fluid coupler 422) and the plumbing system of the corresponding building. In the illustrated embodiment, the outlet connector 382 includes an elongated tube having a first end 458 forming a mounting flange 462 sized and shaped to correspond with the mounting hub 442 of the faceplate 374, and a second end 466 forming a portion of an outlet pipe opposite the first end 458. As shown in FIG. 30, the outlet connector 382 includes a bend therein to form a generally "J" shaped pipe such that the first end 458 is set approximately 90 degrees from the second end 466. When installed, the second end 466 of the outlet connector 382 is configured to be attached to a wastepipe of the building's plumbing system. The illustrated outlet connector 382 is "J" shaped and produces a fluid connection between the water closet and the building's plumbing system.

As shown in FIGS. 29-31, the mounting flange 462 of the outlet connector 382 is configured so that it can be coupled to the mounting hub 442 of the faceplate 374 in a plurality of different orientations while maintaining fluid communication with the fluid passageway 406 and a fluid tight seal with the faceplate 374 in each position. More specifically, both the mounting flange 462 and the mounting hub 442 include corresponding annular sealing surfaces 446*a*, 446*b* and mounting elements 450*a*, 450*b* so that the outlet connector 382 can be mounted to the faceplate 374 into any position where the mounting elements 450*b* of the outlet connector 382 align with the mounting elements 450*a* of the faceplate 374. As such, the number and position of mounting elements 450*a*, 450*b* defines the number of "mounting positions" that are possible between the two elements. In the illustrated embodiment, four mounting elements 450*a*, 450*b* are present in both components spaced 90 degrees apart. As such, the outlet connector 382 can be coupled to the faceplate 374 in four orientations spaced 90 degrees apart (e.g., so that the second end 466 of the J-shaped or T-shaped outlet connector 382 is facing vertically up, vertically down, horizontally right, and horizontally left). However, in alternative embodiments more or fewer mounting elements 450*a*, 450*b* may be present to permit more or fewer mounting positions (e.g., eight mounting elements 450*a*, 450*b* allowing eight mounting locations spaced 45 degrees apart, or two mounting elements 450*a*, 450*b* allowing two mounting locations spaced 180 degrees apart, and the like). In still other embodiments, the number of mounting elements 450*b* on the outlet connector 382 may not match the number of mounting elements 450*a* on the mounting hub 442. In such embodiments, the mounting elements 450*a*, 450*b* are multiples of each other so that a plurality of mounting orientations may be present.

Figure 32:
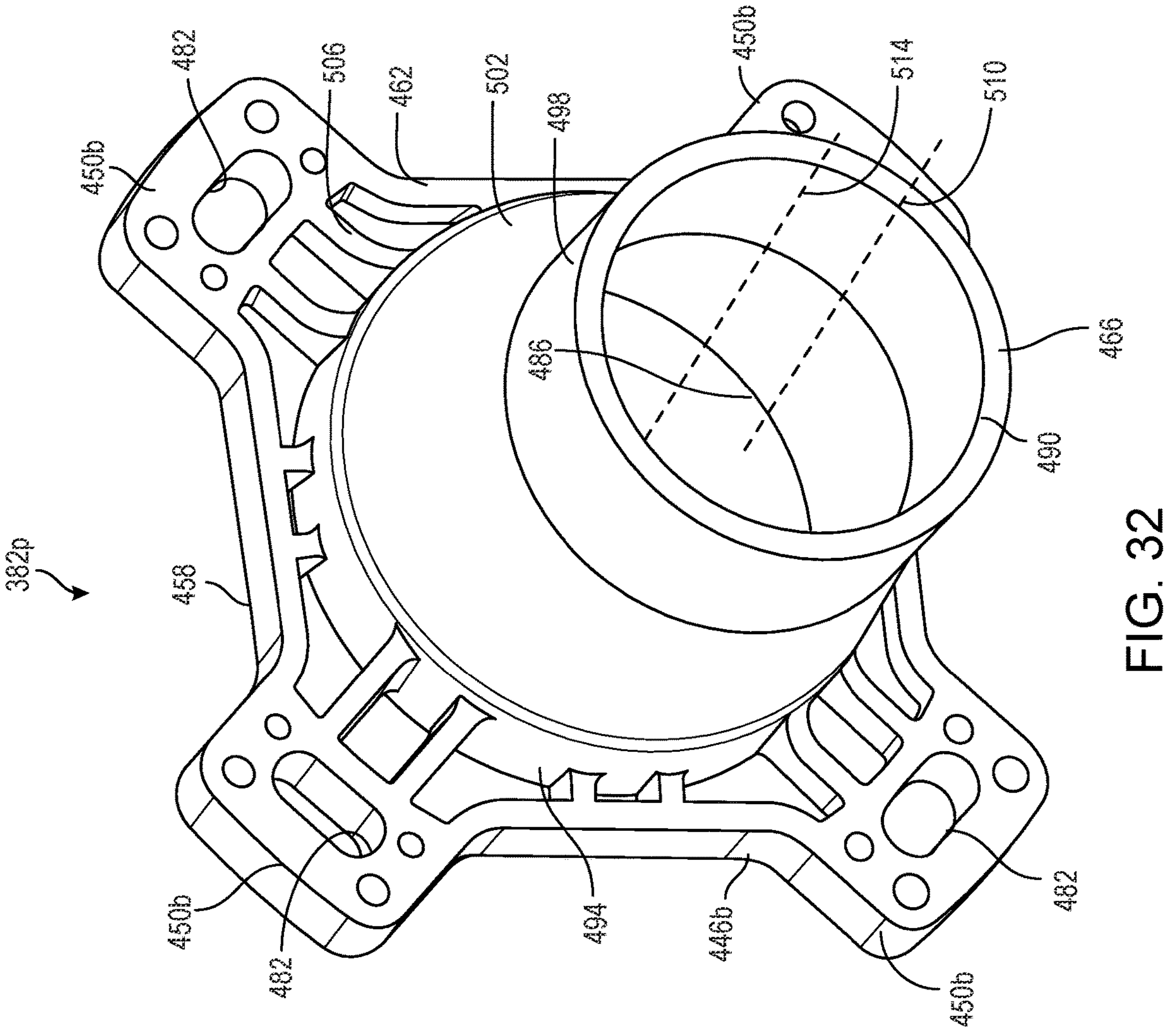
FIG. 32 illustrates an outlet connector according to an embodiment.
Figure 33:
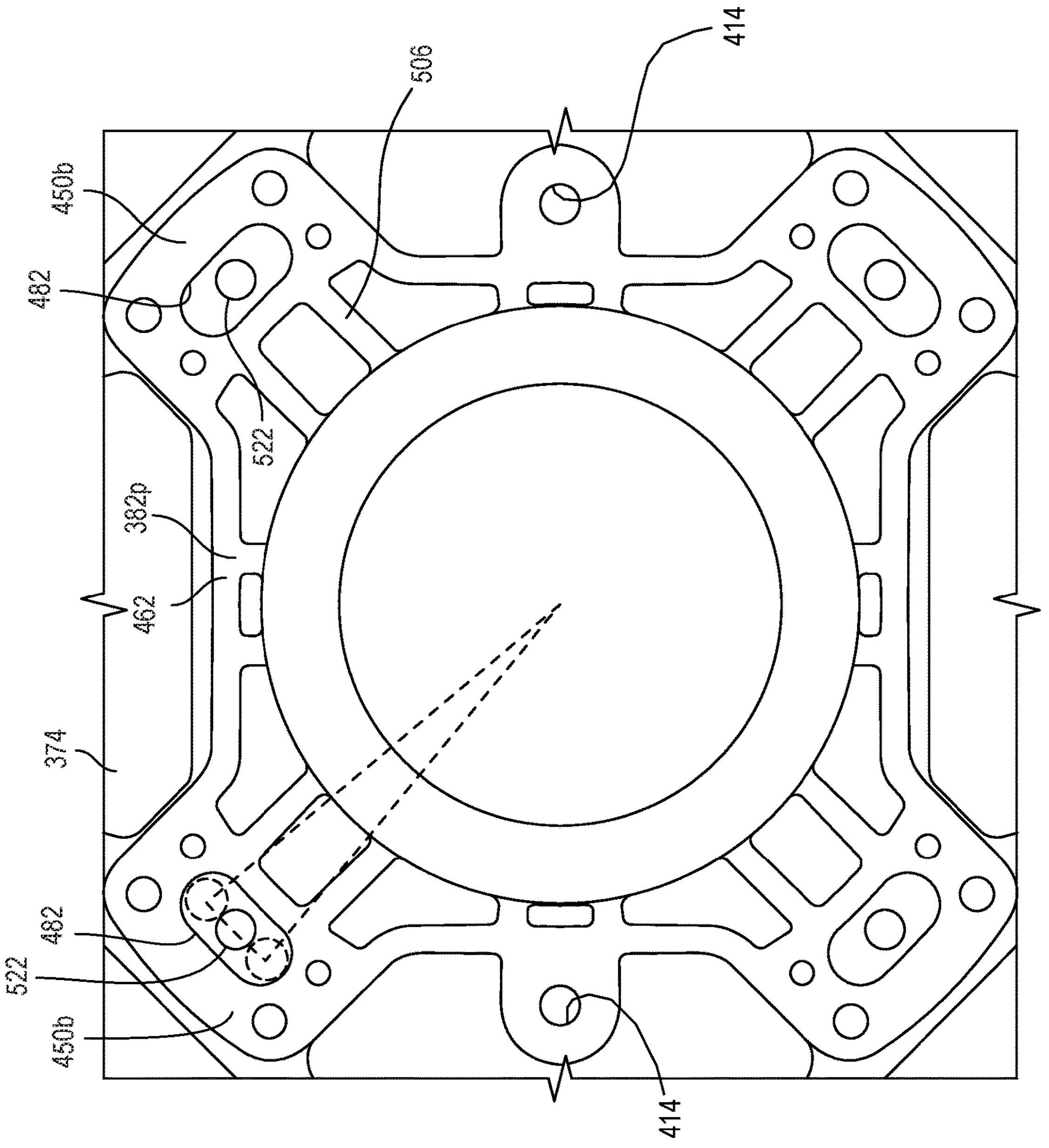
FIG. 33 illustrates another view of the outlet connector of FIG. 32 mounted to a portion of a carrier assembly.

As shown in FIGS. 31-33, in the illustrated embodiment, the mounting elements 450*a* of the faceplate 374 include threaded mounting apertures 522 while the mounting elements 450*b* of the outlet connector 382 include slots 482 so that fasteners passing through the slots 482 and received within the threaded apertures can be used to couple the fluid coupler 382 to the faceplate 374. More specifically, the slots 482 of the outlet connector 382 are elongated so that the outlet connector 382 can be rotated a few degrees in each direction at a particular mounting location. For example, if an asymmetric outlet connector 382 is mounted to the faceplate 374 so that the second end 466 is located at the 3 o'clock position (e.g., at 90 degrees), the outlet connector 382 may further be rotated a few degrees Clockwise and counterclockwise from that position (e.g., between 85 to 95 degrees). In some embodiments, such as shown in FIG. 29, the slots 482 are open and located at the perimeter of the flange 462. In other embodiments, such as shown in FIG. 31, at least some (e.g., two, four) of the slots 482 are closed slots located within and not defined by the periphery of the flange 462.

This capability is present at each of the four possible mounting locations (e.g., between 175 and 185 degrees if mounted at the 6 o'clock position, and the like) and allows the outlet pipe of the outlet connector 382 to slope downwards when in the left or right orientations to encourage fluid flow through the outlet connector 382 away from the water closet. A slope of 1/16 inch per foot corresponds to a rotational angle of 0.3 degrees relative to horizontal. If the desired pitch of the outlet pipe of the outlet connector 382 corresponds to 1/16 inch per foot, the slots 482 of the outlet connector 382 allow for at least 0.6 degrees of total rotation. A slope of 1/8 inch per foot corresponds to a rotational angle of 0.6 degrees relative to horizontal. If the desired pitch of the outlet pipe of the outlet connector 382 corresponds to 1/8 inch per foot, the slots 482 of the outlet connector 382 allow for at least 1.2 degrees of total rotation. A slope of ¼ inch per foot corresponds to a rotational angle of 1.2 degrees relative to horizontal. If the desired pitch of the outlet pipe of the outlet connector 382 corresponds to ¼ inch per foot, the slots 482 of the outlet connector 382 allow for at least 2.4 degrees of total rotation. Such rotatable adjustments allow the same outlet connector 382 to be oriented in the left orientation and the right orientation and still have the ability to slope downward at the desired angle. Larger slots 482 permitting larger rotational angles (e.g., at least 3 degrees, at least 4 degrees, at least 5 degrees, at least 6 degrees, at least 7 degrees, at least 8 degrees, at least 9 degrees, at least 10 degrees, at least 15 degrees of total rotation) result in a larger range of angles at which the outlet connector 382 can be sloped. In some embodiments, the slots 482 allow for at least 3.7 degrees of rotation in each direction such that the outlet connector 382 can be sloped at least ¾ inch per foot.

Figure 52:
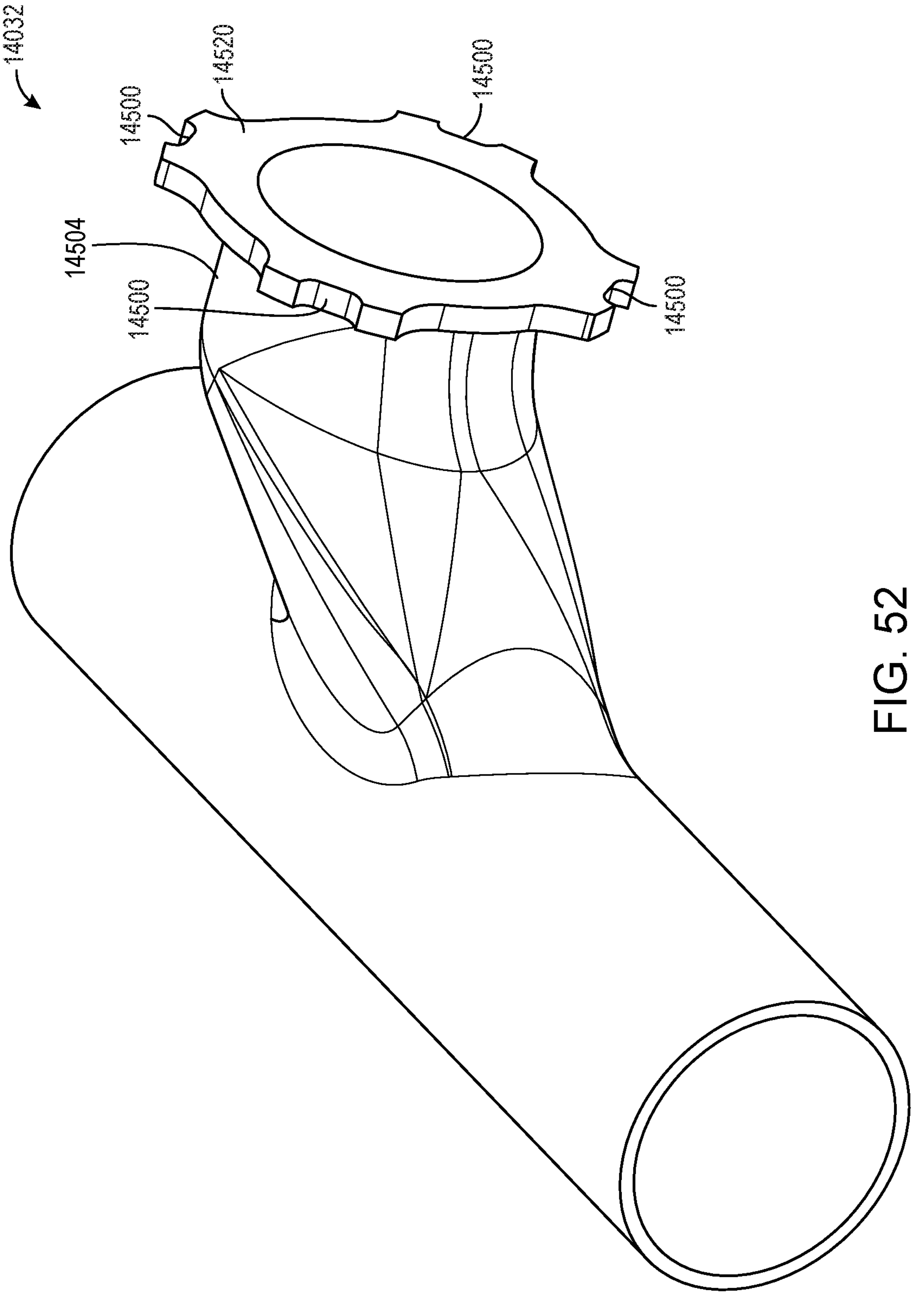
FIGS. 52 and 53 illustrate another embodiment of a fluid coupler.

The slots 482 can be open slots, each being open at the radially outer edge of the slot 482 (e.g., FIG. 29; see also slots 14500 in FIG. 52). The slots 482 can form a portion of the periphery of the mounting flange 462 and can alternatively be described as elongated recesses in the periphery of the mounting flange 462. Utilizing open slots 482 as opposed to the closed slots shown in FIG. 32 allows an installer to more easily align the outlet connector 382 relative to the faceplate 374. With the lower two fasteners 526 threaded partially (not to their full installed depth) into the faceplate 374, the outlet connector 382 is lowered onto the two fasteners 526 such that the fasteners 526 rest within the elongated slot 482, providing a lower stop that will both align the outlet connector 382 with the fluid passageway 406 and bear at least a portion of the weight of the outlet connector 382. With the outlet connector 382 in place, the upper slots 482 are also aligned with the upper mounting apertures 522.

The outlet connector 382 is rotatable between positions in which the fluid from the water closet is drained to the left, to the right, or vertically downward and any of these positions may be desirable based on the arrangement of the carrier assembly 342 and/or the material of the floor onto which the carrier assembly 342 is positioned. In other systems, separate couplers (i.e., a vertical coupler, a left coupler, a right coupler) are required based on the desired fluid flow direction as the vent of the coupler must be oriented upwards and positioned above the flow of fluid through the coupler and the mount is typically oriented to provide the necessary slope in the outlet itself for example, ⅛" or ¼" per foot downwardly in the direction of flow. If an installer attempts to install a prior art left-extending coupler such that it extends to the right, the vent extends downwards and the drainage pipe is pitched upwards.

Figure 34:
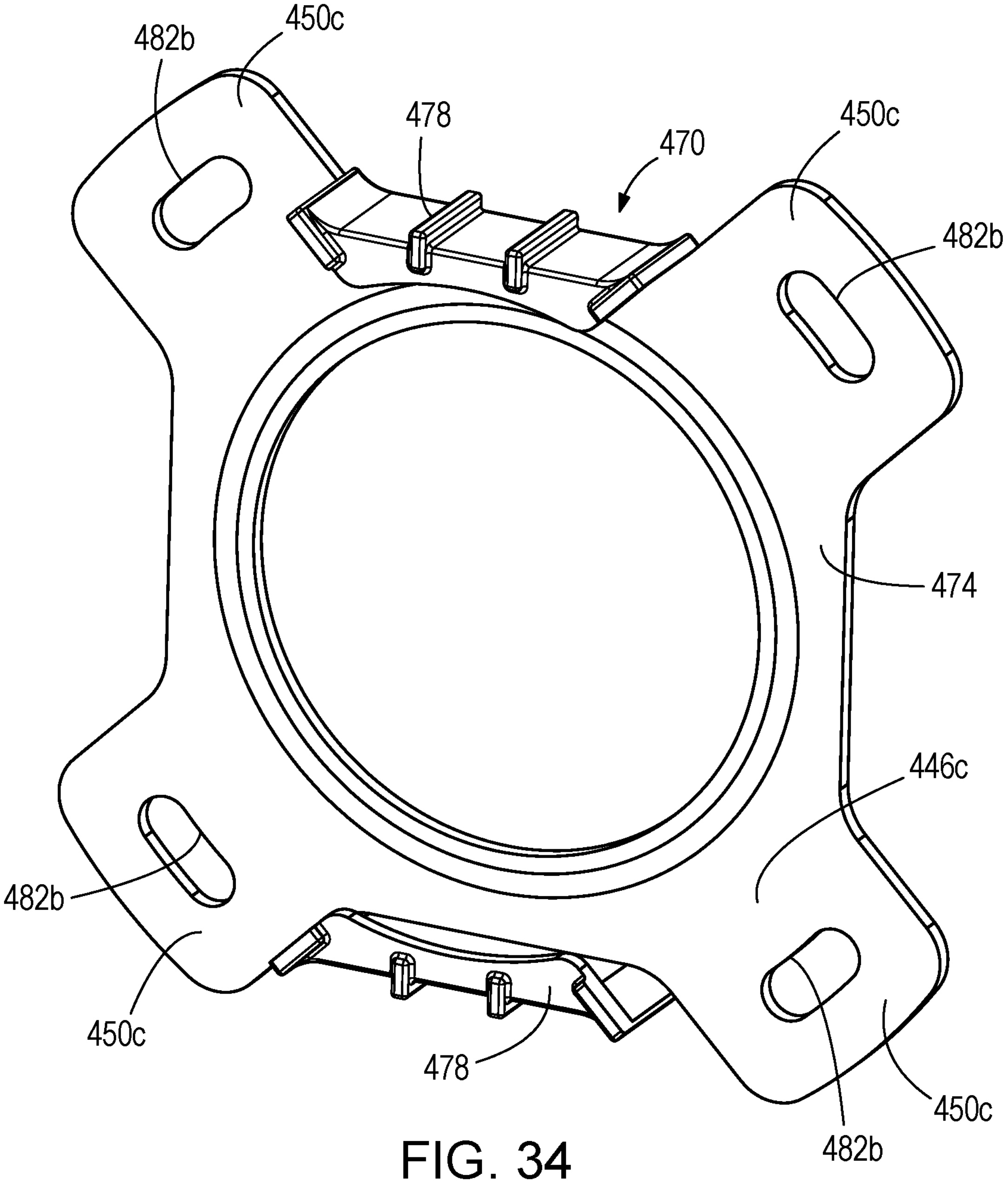
FIG. 34 illustrates another embodiment of a gasket.

As shown in FIG. 34, the outlet connector 382 is coupled to the faceplate 374 using a gasket 470. The gasket 470 is formed from a gasket material (e.g., rubber, silicone, fiber, cardboard, and the like) and includes a planar body 474 with a size and shape that generally corresponds to the shape of the mounting hub 442 and the mounting flange 462. More specifically, the body 474 includes an annular sealing surface 446*c* and a plurality of mounting elements 450*c* extending radially outwardly therefrom. The mounting elements may include slots 482*b* configured to align with the slots 482 of the flange 462. In some embodiments, as illustrated in FIG. 34, the slots 482*b* may be closed slots. In other embodiments, the slots 482*b* may be open and located at a perimeter of the mounting elements 450*c* similar to the slots 482 of the flange 462 shown in FIG. 29. In some embodiments, the sealing surface 466*c* may include grooves and/or ridges formed therein to help improve the sealing capability of the gasket 470.

With continued reference to FIG. 34, the gasket 470 also forms one or more channels or pockets 478 configured to at least partially receive a portion of the mounting flange 462 of the outlet connector 382 therein. By doing so, the gasket 470 is removably coupled to the first end 458 of the outlet connector 382 and properly aligned therewith without using a separate adhesive. In the illustrated embodiment, the gasket 470 includes a pair of pockets 478 spaced 180 degrees apart (e.g., to receive opposite portions of the mounting flange 462 therein) but in other embodiments more or fewer pockets 478 may be present. More specifically, the pockets 478 are sized and shaped to receive a portion of the flange 462 therein. In the illustrated embodiment, the pockets 478 are positioned so that they are positioned between adjacent mounting elements 450*c* of the gasket 470 and can receive a portion of the flange 462 between adjacent mounting elements 450*b*. In this way, the pockets 478 may be manipulated to bend and receive a portion of the flange 462 with minimal or no stretching of the main portion of the gasket 470. In other embodiments, the pockets 478 may be positioned to receive all or a portion of the mounting elements 450*b* similar as to gasket 278 described above. In still other embodiments, the pockets 478 may only engage the exterior of the flange 462.

During assembly, the pockets 478 allow the user to couple the gasket 470 to the first end of the outlet connector 382 where it will remain in place even with no fasteners present. With the gasket 470 in position, the outlet connector 382 may then be maneuvered relative to the faceplate 374 and installed without having to hold the gasket 470 in place. The pockets 478 may be bent and manipulated to receive opposing portions of the flange 462 and the gasket 470 is therefore elastically deformed into engagement with the flange 462. Once positioned on the flange 462, the pockets 478 clamp onto the flange 462 and would require further elastic deformation to remove the gasket 470 from the flange 462. In the illustrated embodiment, the gasket 470 may be removably secured to the first end 458 of the outlet connector 382 without reducing the internal cross-sectional area of the first end 458. Stated differently, the gasket 470 is configured so that no portion extends radially inwardly beyond the opening of the first end 458.

As shown in more detail in FIGS. 29-31, the carrier assembly 342 includes a faceplate 374, a fluid coupler 422, and an outlet tube or outlet connector 382 coupled to the faceplate 374. The faceplate 374 of the carrier assembly 342 includes a central portion 390 and a pair of side portions 398 flanking the central portion 390 on opposite sides thereof. When installed, the central portion 390 and the side portions 398 are configured so that the mounting surface 402 of the central portion 390 is aligned with the front wall surface 362 of the modular wall assembly 346 (e.g., aligned within ±1/32", ±1/16"±1/8", ±1/4", ±1/3") while each side portion 398 is coupled to the rear surface 370 of a corresponding upright 358 (e.g., a double upright 366; see FIG. 29). By doing so, the illustrated faceplate 374 provides additional strength to the finished water closet assembly by minimizing the cantilevered length between the mounting surface 402 of the faceplate 374 and the water closet while allowing all of the mounting points between the carrier assembly 342 and the uprights 358 of the modular wall 346 to be accessed via the rear surface 370. By doing so, the user can install and perform maintenance on the faceplate 374 or water closet without having to cut into or otherwise modify the visible wall materials (e.g., the drywall 354) attached to the front wall surface 362.

As shown in FIG. 31, the central portion 390 of the faceplate 374 defines the mounting surface 402 (FIG. 30), a fluid passageway 406 sized to receive the fluid coupler 422 therein, a pair of access apertures 454, and a first plurality of mounting apertures 410 configured to support a corresponding threaded mounting element 418 (FIG. 29). When assembled, the water closet is physically mounted to the faceplate 374 via the threaded mounting elements 418. The threaded mounting elements 418 may fasten directly to threaded mounting apertures 410 in the faceplate 374 or may otherwise extend through the apertures 410 and be secured by nuts or other fasteners (not shown) on the rear side of the faceplate 374. The first set of mounting apertures 410 are spaced apart on the faceplate 374 and are configured to serve as mounting locations to attach and support a hung or cantilevered water closet to the faceplate 374.

The fluid passageway 406 includes an aperture formed into the faceplate 374 that is sized to receive the fluid coupler 422 therein. More specifically, the passageway 406 includes a groove sized to receive a seal therein to form an adjustable water-tight connection with the fluid coupler 422. The fluid coupler 422, in turn, is axially adjustable relative to the central portion 390 (e.g., sliding axially within the passageway 406) to engage and form a water-tight seal with the outlet of the water closet. In some embodiments, the passageway 406 and fluid coupler 422 may each be threaded such that rotating the fluid coupler 422 allows for axial adjustment of the fluid coupler within the passageway 406. In other embodiments, the fluid passageway 406 itself may form a water-tight seal with the water closet.

The central portion 390 also includes a second set of mounting apertures 414 (FIG. 31) located on the faceplate 374 and positioned for fastening a floor-mounted water closet to the faceplate 374. As such, using both the first and second sets of apertures 410, 414 the faceplate 374 is able to support both a wall mounted water closet and a floor mounted water closet. More specifically, the second set of apertures 414 are formed into a boss extending from the back surface of the faceplate 374 such that they are offset (e.g., recessed) relative to the surface of the mounting hub 442, which is described in greater detail below. The recessed position of the bosses of the apertures 414 permits a nut to be fastened (e.g., via a socket) to a stud or bolt extending through the aperture 414 while still allowing a gasket to rest on the gasket face of the mounting hub 442 without interference therebetween.

The central portion 390 also includes a mounting hub 442 extending from the back side thereof and corresponding with the fluid passageway 406. More specifically, the mounting hub 442 of the central portion 390 is configured to provide a surface against which the outlet connector 382 may be attached and form a water-tight seal therewith. The mounting hub 442 includes a planar sealing surface **446*a* encircling the fluid passageway 406. More specifically, the sealing surface includes an annular portion 446*a* immediately encircling the fluid passageway 406 and a plurality of mounting portions 450*a* extending radially outwardly from the annular portion 446*a* and corresponding to given mounting aperture 522. In the illustrated embodiment, the sealing surface includes four mounting portions 450*a*** are each spaced 90 degrees apart from each other.

In some embodiments, the flange or outlet connector **382*p* shown in FIGS. 32 and 33 may be made of polyvinyl chloride (PVC) (e.g., formed entirely of PVC) and may therefore be solvent welded to downstream fluid couplers and/or outlet pipes. In other embodiments, the outlet connector 382*p* may be cast iron and attached to downstream outlet connector and/or outlet pipes via, for example, a no hub band. In either case, the outlet connector 382*p* can be attached to standard "off-the-shelf" downstream outlet connectors or outlet pipes, which may not be configured to attach to a carrier assembly. In this way, the outlet connector 382*p* can act as an adapter to allow any downstream outlet connector or outlet pipe to be used in combination with the carrier assembly 342. The depth of outlet connector 382*p*** may be configured to correspond to allow for all possible insertion depths of the opposing fluid coupler from the water closet, such that the downstream outlet connector or outlet pipe does not necessarily need to have a straight section to accommodate insertion of the opposing fluid coupler.

The outlet connector **382*p* includes a planar first end 458 forming the mounting flange that fixes and seals against the faceplate 374. The opening 486 (e.g., 3-inch diameter, 4-inch diameter) at the first end 458 is sized similar to the opening 406 in the faceplate, though it may narrow down to a smaller opening 490 (e.g., 2-inch diameter) at the second end 466 (FIG. 32). The central axis 510 of the smaller diameter portion 490 at the second end 466 is offset from the central axis 514 of the larger diameter portion at the first end 458 such that the outlet connector 382*p* is not rotationally symmetrical. The axis 510 of the smaller diameter opening 490 is offset to be located below the axis 514 of the larger diameter opening 486, though the entirety of the smaller diameter opening 490 is visible within the larger diameter opening 486 when viewed perpendicular to the axes 510, 514 of the openings. For example, if the larger diameter opening 486 has a diameter of four inches and the smaller diameter opening 490 has a diameter of two inches, the distance between the axes 510, 514 of the respective openings 486, 490 is no greater than one inch. In the illustrated embodiment, the second end 466 is offset relative to the opening 406** such that the two openings are aligned at the lowermost portion thereof.

A first cylindrical portion 494 sized similar to the opening 486 extends from the first end 458 towards the second end 466 and a second cylindrical portion 498 sized similar to the opening 490 extends from the second end 466 toward the first end 458. A transition portion 502 extends between the first and second cylindrical portions 494, 498 to connect them such that the three portions 494, 498, 502 form a channel or passage between the opposed openings 486, 490. Ribs 506 that extend in a generally radial direction provide support between the first cylindrical portion 494 and the mounting elements **450*b*. The thickness of most areas of the outlet connector 382*p*** is consistent such that substantial warping is avoided when formed (especially if formed of PVC) and the sealing surfaces are flat.

Figure 35:
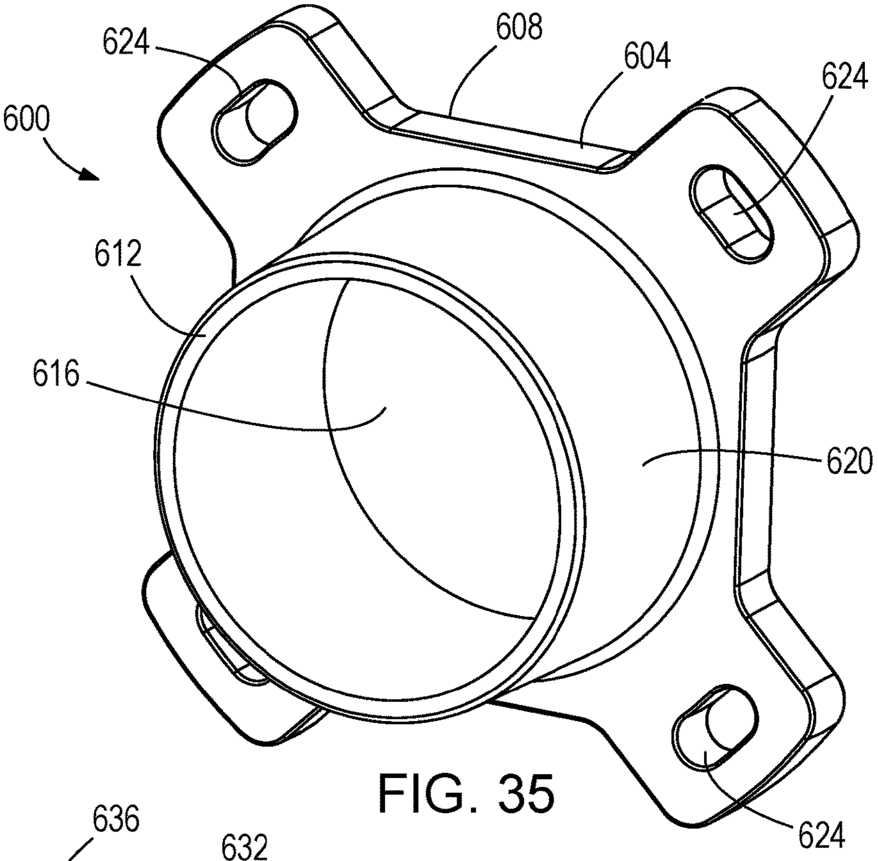
FIG. 35 illustrates another embodiment of an outlet connector.

FIG. 35 illustrates another embodiment of a flange or outlet connector 600. The outlet connector 600 may be formed as a cast iron and attached to a downstream outlet connector, fluid coupler, and/or outlet pipe. In other embodiments, the outlet connector 600 may be formed from polyvinyl chloride (PVC).

The outlet connector 600 includes a planar first end 604 forming a mounting flange 608 that fixes and seals against a faceplate (not shown), and a second end 612 opposite the first end 604. The outlet connector 600 includes an opening 616 and is sized similar to a faceplate opening in the faceplate. The outlet connector 600 includes a cylindrical portion 620 sized similar to the opening 616 of the outlet connector 600, and extends from the first end 604 toward the second end 612. A thickness of the outlet connector 600 (i.e., mounting flange 608 and/or the cylindrical portion 620) are each consistent to avoid substantial warping, and allows the outlet connector 600 to seal flat against the faceplate.

The outlet connector 600 includes slots 624 configured to receive fasteners that couple to corresponding threaded apertures of the faceplate. Specifically, the slots 624 of the outlet connector 600 are elongated such that the outlet connector 600 can be rotated a few degrees or movable to accommodate various dimensional tolerances of the face-plate or the outlet connector 600.

Figure 36:
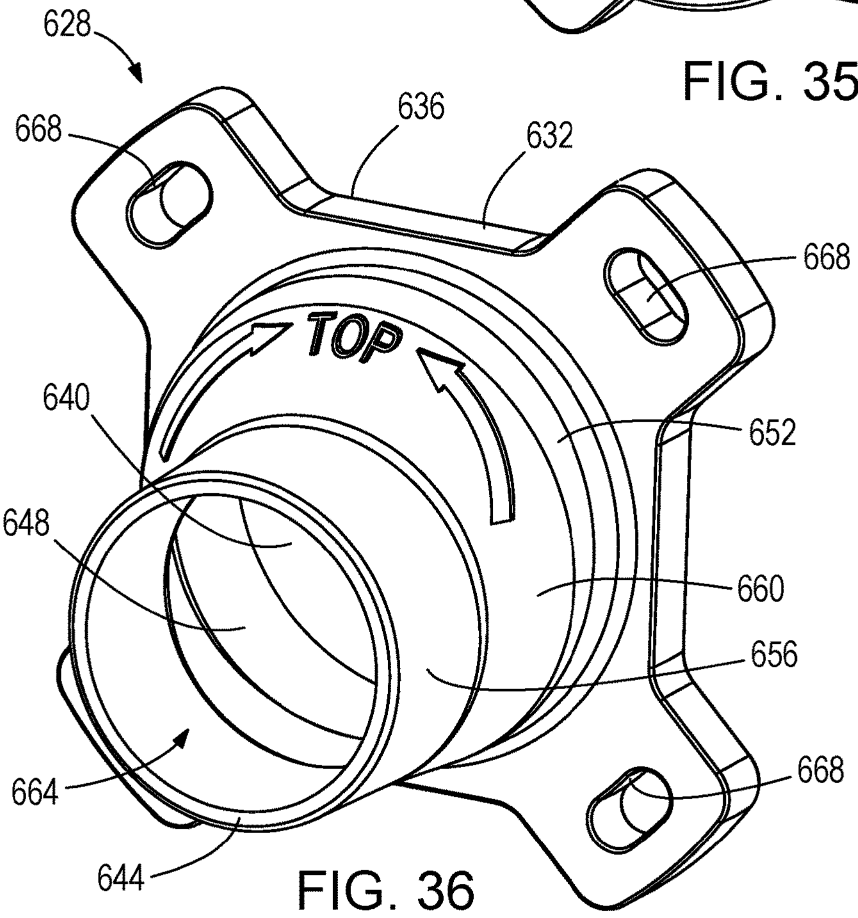
FIG. 36 illustrates another embodiment of an outlet connector.

FIG. 36 illustrates another embodiment of a flange or outlet connector 628. The outlet connector 628 is similar to the outlet connector 382*p* described above, with the following differences described below. The outlet connector 628 includes a planar first end 632 forming a mounting flange 636 that is fixed and sealed against a faceplate (not shown). The outlet connector 628 includes a first opening 640 defined at the first end 632. The first opening 640 is sized similar to an opening of the faceplate. The outlet connector 628 includes a second end 644 defining a second opening 648 having a different (e.g., smaller) diameter than the first opening 640.

The outlet connector 628 includes a first cylindrical portion 652 sized similar to the first opening 640 and extends from the first end 632 toward the second end 644. The outlet connector 628 includes a second cylindrical portion 656 sized similar to the second opening 648 and extends from the second end 644 toward the first end 632. A transition portion 660 extends between the first cylindrical portion 652 and the second cylindrical portion 656 to connect three portions 652, 656, 660 together to form a channel or passage 664 between faceplate opening, the first opening 640, and the second opening 648. The outlet connector 628 is devoid of ribs or strengthening elements. The outlet connector 652 includes a consistent thickness (i.e., mounting flange 636 and/or the cylindrical portions 652, 656) to avoid substantial warping and allows the outlet connector 652 to seal flat against the faceplate.

The outlet connector 628 includes slots 668 configured to receive fasteners that couple to corresponding threaded apertures of the faceplate. Specifically, the slots 668 of the outlet connector 628 are elongated such that the outlet connector 628 can be rotated a few degrees or movable to accommodate various dimensional tolerances of the face-plate and the outlet connector 628.

Figure 25:
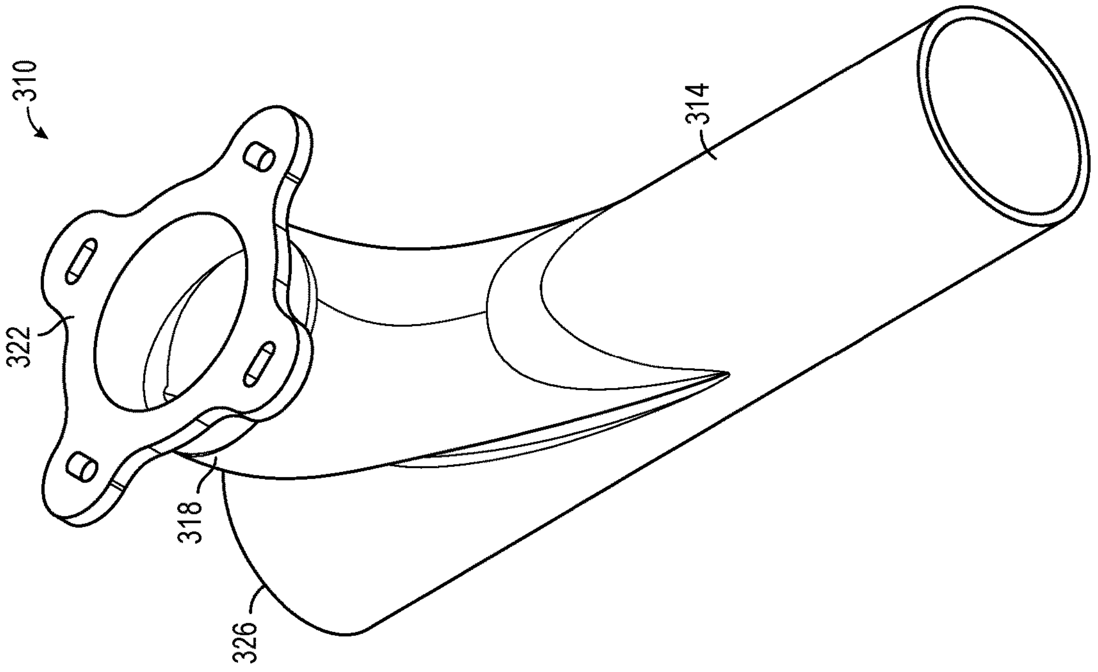
FIGS. 25-28 illustrate another embodiment of a fluid coupler.
Figure 26:
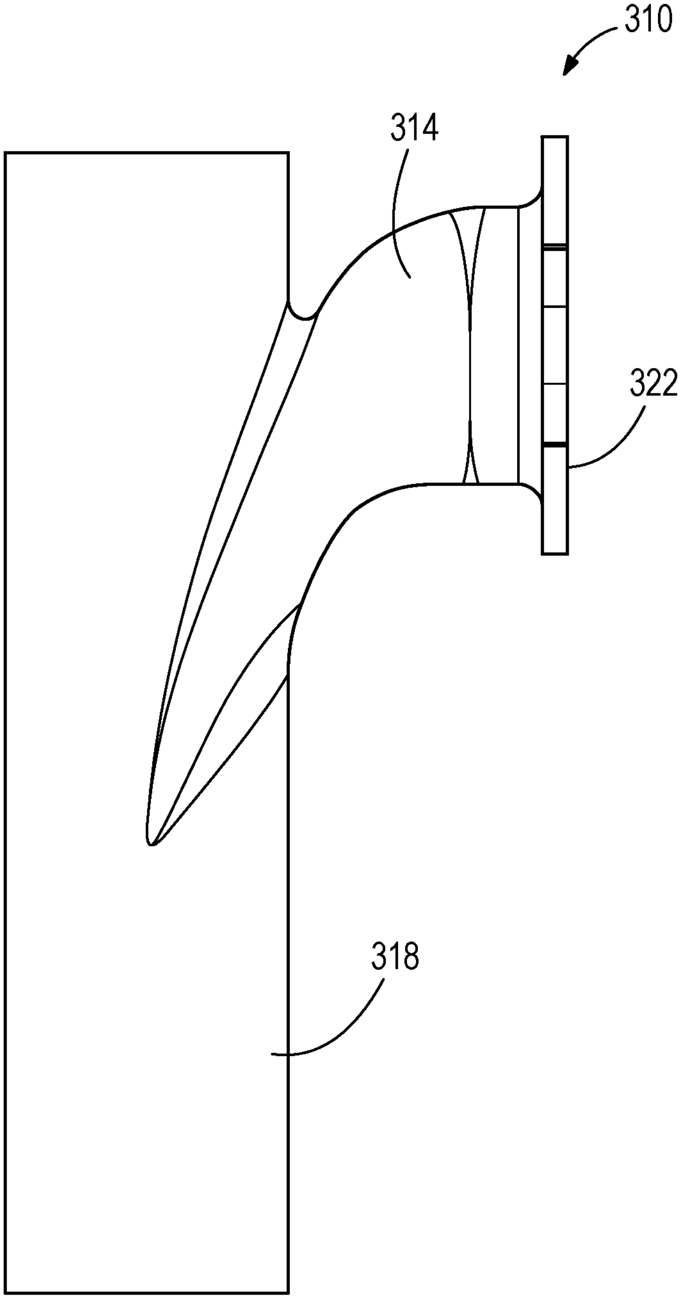

FIGS. 37-41 illustrate another embodiment of a fluid coupler 672. The fluid coupler 672 is similar to the fluid coupler 310 as shown in FIG. 25, with the following differences described below. The fluid coupler 672 includes a primary segment 676 having a first end 680 and a second end 684, and a secondary segment 688 extending from the primary segment 676. As illustrated, the primary segment 676 is an elongated segment including a substantially linear shape. The secondary segment 688 extends from the primary segment 676 to a flanged end 692 oriented approximately perpendicular to the primary segment 676. The secondary segment 688 is sized and shaped to encourage improved fluid flow from the secondary segment 688 into the primary segment 676. Specifically, the secondary segment 688 is sized and shaped to minimize backflow toward the first end 680 of the primary segment 676. The second segment 688 is offset from the first end 680 of the primary segment 676.

Figure 40:
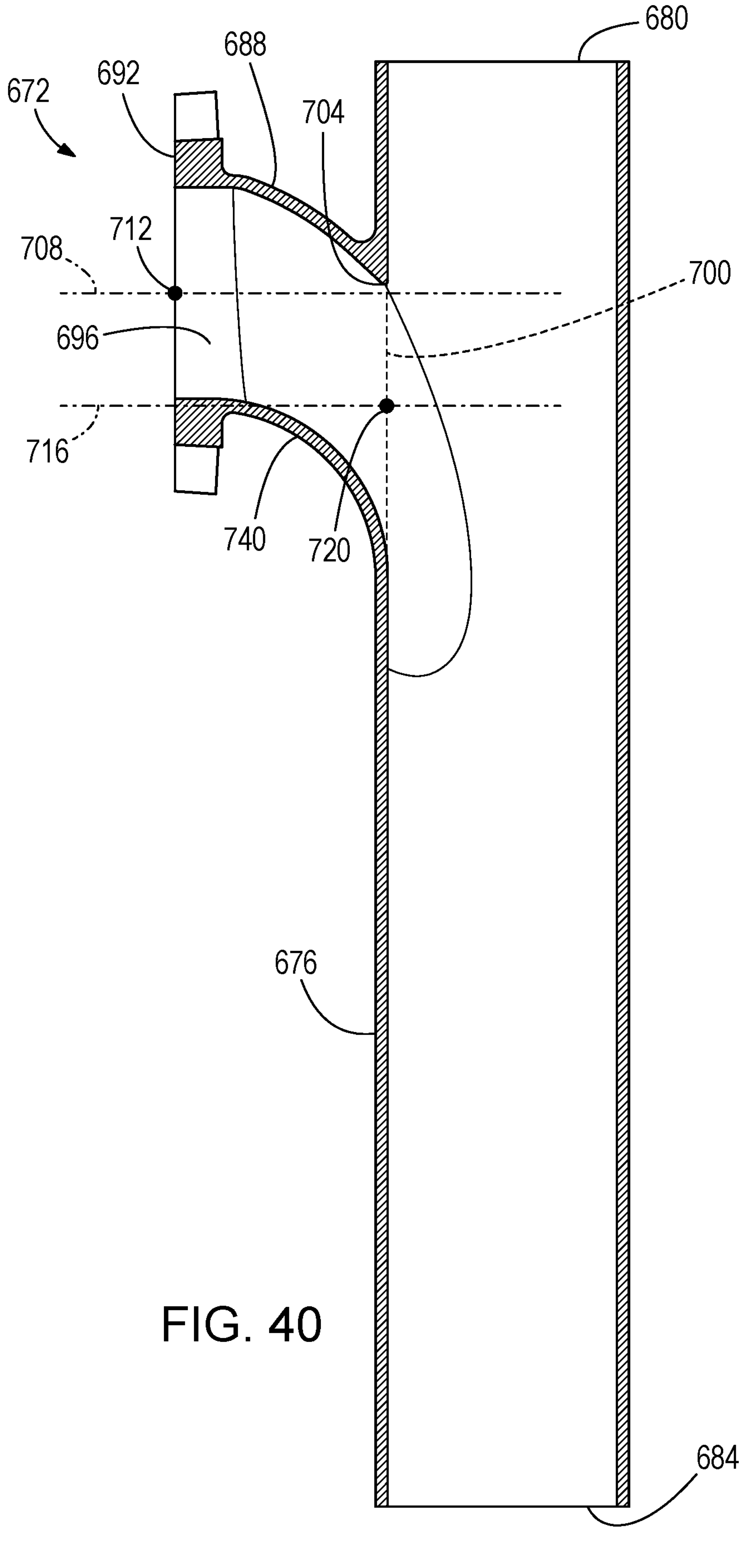
FIG. 40 illustrates a cross sectional view of the fluid coupler of FIG. 37.
Figure 41:
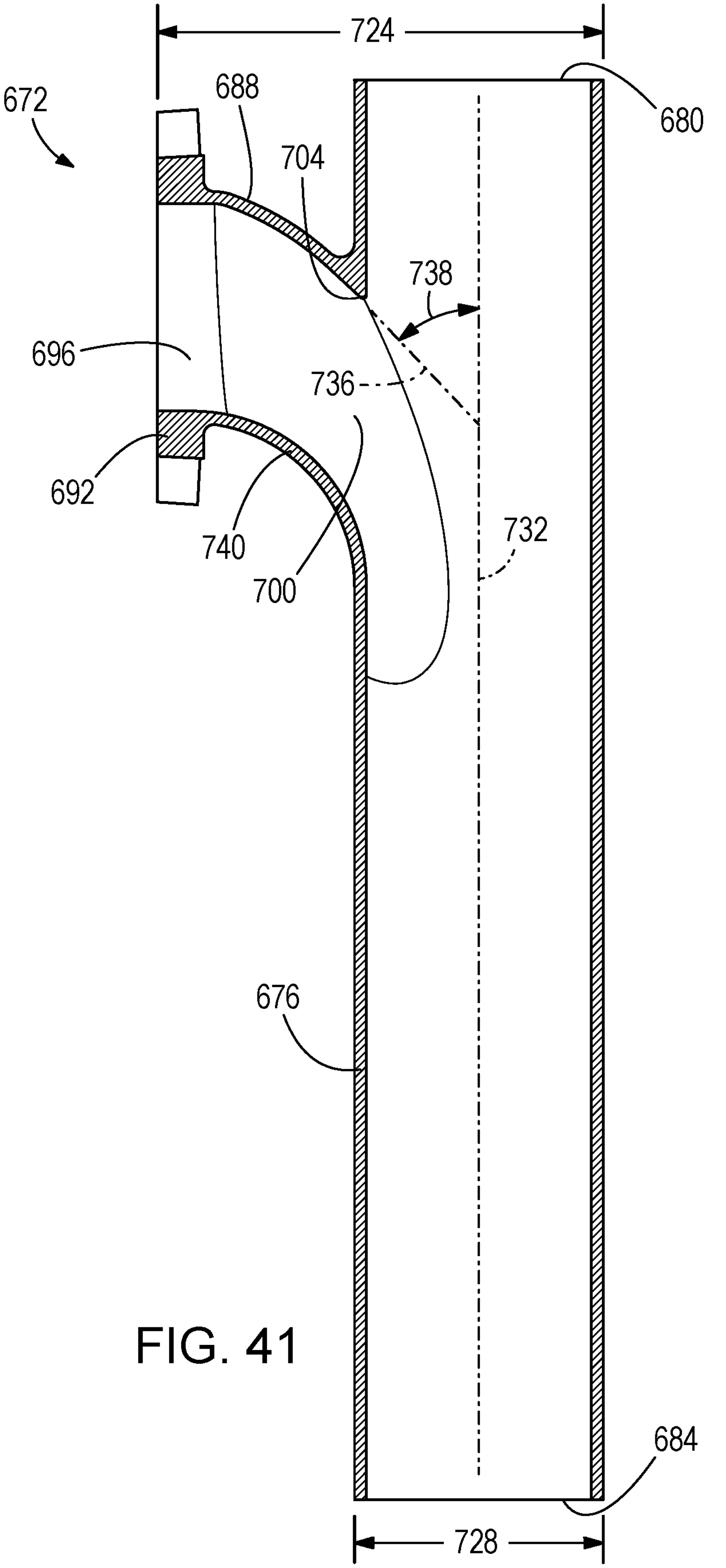
FIG. 41 illustrates a cross sectional view of the fluid coupler of FIG. 37.

As shown in FIGS. 40 and 41, the secondary segment 688 defines an inlet opening 696 defined by the flanged end 692, and an outlet opening 700 defined by the location at which the secondary segment 688 enters into the primary segment 676. In other words, the outlet opening 700 is defined at an intersection between the secondary segment 688 and the primary segment 676. In the illustrated embodiment, the outlet opening 700 is laterally offset relative to the inlet opening 696 such that an upstream point 704 of the outlet opening 700 is offset by approximately 50% of a diameter of the inlet opening 696. In other embodiments, the upstream point 704 is laterally offset between 30% and 60% of the diameter of the inlet opening 696, between 25% and 75% of the diameter of the inlet opening 696, between 50% and 100% of the diameter of the inlet opening 696, between 60% and 100% of the diameter of the inlet opening 696, and between 75% and 100% of the diameter of the inlet opening 696.

With continued reference to FIG. 40, the inlet opening 696 includes an inlet centerline 708 (e.g., inlet centerline 708 extends from left to right in FIG. 40) defined at an inlet center point 712 of the inlet opening 696. The outlet opening 700 includes an outlet centerline 716 (e.g., outlet centerline 716 extends from left to right in FIG. 40) defined at an outlet center point 720 of the outlet opening 700. The inlet centerline 708 or inlet center point 712 is offset from the outlet centerline 716 or the outlet center point 720. The inlet centerline 708 or inlet center point 712 is above the outlet centerline 716 or outlet center point 720.

Figure 39:
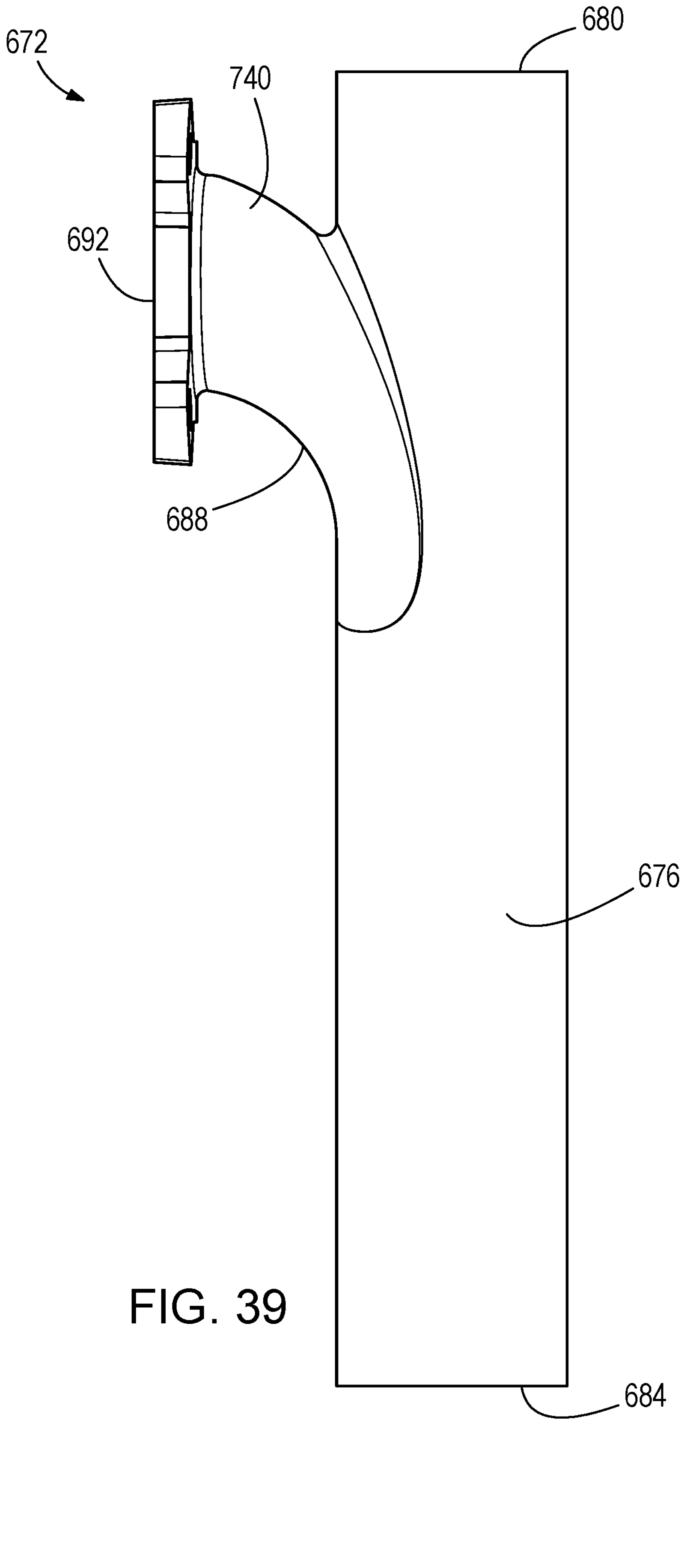
FIG. 39 illustrates a side view of the fluid coupler of FIG. 37.

With continued reference to FIGS. 39 and 40, the secondary segment 688 includes an outer surface 740 extending between the flanged end 692 and the primary segment 676 (i.e., an outer surface of the primary segment 676). The outer surface 740 of the secondary segment 688, when viewed in a vertical cross section as shown in FIGS. 39 and 40, includes a variable radius of curvature extending between the flanged end 692 and the first segment 676. In other words, the outer surface of the second segment 688, when viewed in a vertical cross section as shown in FIGS. 39 and 40, includes multiple radii of curvature extending between the flanged end 692 and the first segment 676.

As shown in FIG. 41, the fluid coupler 672 defines a width 724 measured as a transverse width from the flanged end 692 to an outermost point on an outer diameter of the first segment 676. The width 724 ranges from 6 inches to 9 inches. In other embodiments, the width 724 can range from 6 inches to 8 inches, or 7 inches to 8 inches, or 8 inches to 9 inches. For example, the width 724 can be 6, 7, 7.5, 7.85, 8.0, 8.1, 8.2, 8.3, 8.4, 8.5, 8.6, 8.7, 8.8, 8.9, or 9.0 inches. In one example, the width 724 is 7.85 inches.

With continued reference to FIG. 41, the fluid coupler 672 defines an outer diameter 728 of the primary segment 676. The outer diameter 728 of the primary segment 676 can range from 4 inches to 6 inches. In other embodiments, the outer diameter 728 of the primary segment 676 can range from 4 inches to 5 inches, 4.5 inches to 5.5 inches, or 5 inches to 6 inches. For example, the outer diameter 728 of the primary segment 6767 can be 4, 4.2, 4.38, 4.4, 4.6, 4.8, 5.0, 5.2, 5.4, 5.6, 5.8, or 6.0 inches. In one example, the outer diameter 728 of the primary segment 676 is 4.38 inches (e.g., 4 inch pipe).

The fluid coupler 672 includes a ratio defined as the width 724 over the outer diameter 728. In some embodiments, the ratio of the width 724 over the outer diameter 728 ranges from 1.4 to 2.0. In other embodiments, the ratio of the width 724 over the outer diameter 728 ranges from 1.4 to 1.7, or 1.7 to 2.0. Still, in other embodiments, the ratio of the width 724 over the outer diameter 728 ranges from 1.4 to 1.6, 1.5 to 1.7, 1.6 to 1.8, or 1.7 to 1.9, or 1.8 to 2.0. In one example, the ratio of the width 724 over the outer diameter 728 is 1.8.

With continued reference to FIG. 41, the fluid coupler defines a first axis 732 extending along a centerline of the primary segment 676, and a second axis 736 extending tangentially from an inner surface of the secondary segment 688. Specifically, the second axis 736 extends tangentially from the inner surface of the secondary segment 688 adjacent the upstream point 704. An angle 738 is defined between the first axis 732 and the second axis 736. The angle 738 is an oblique or acute angle. The angle 738 ranges from 30 degrees to 60 degrees. In other embodiments, the angle 738 ranges from 30 to 50 degrees, 35 to 55 degrees, or 40 to 60 degrees. For example, the angle 738 can be 30, 35, 40, 45, 50, 55, or 60 degrees. In one example, the angle 738 is 45 degrees.

Figure 37:
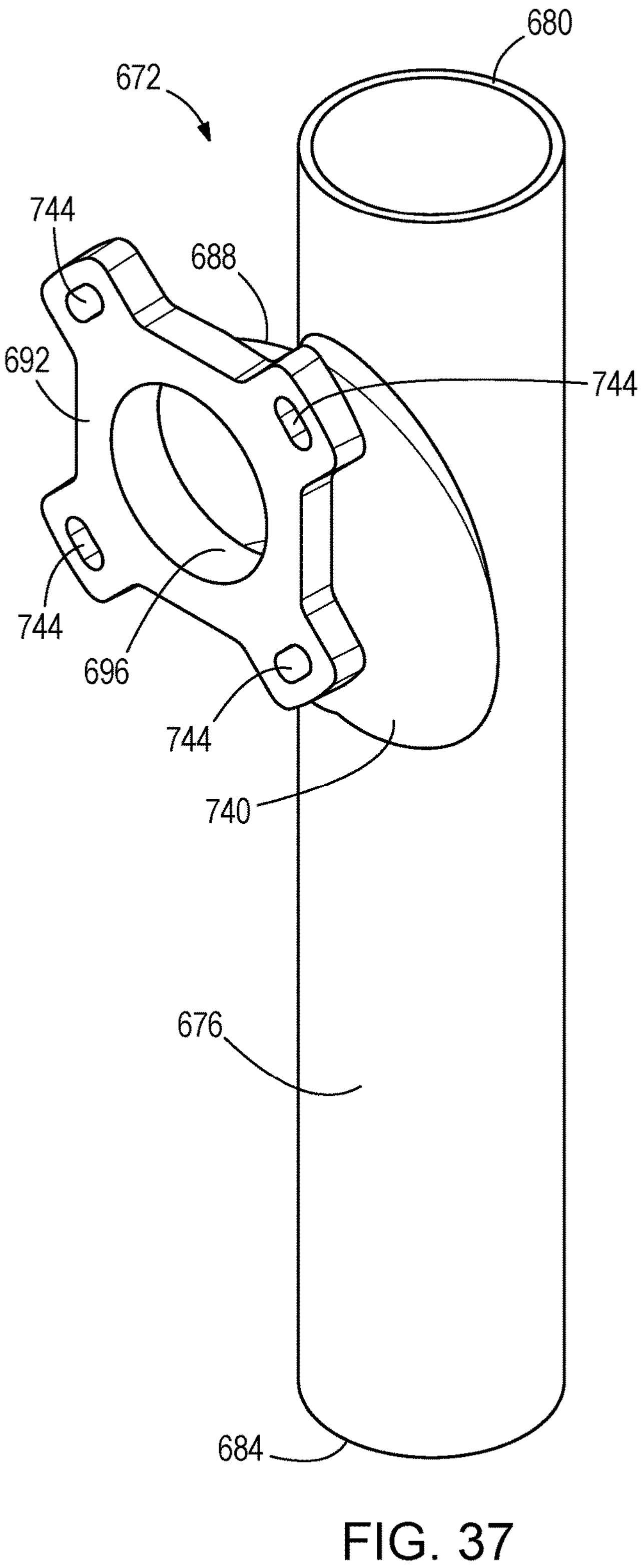
FIG. 37 illustrates a perspective view of another embodiment of a fluid coupler for use in a vertical orientation.
Figure 38:
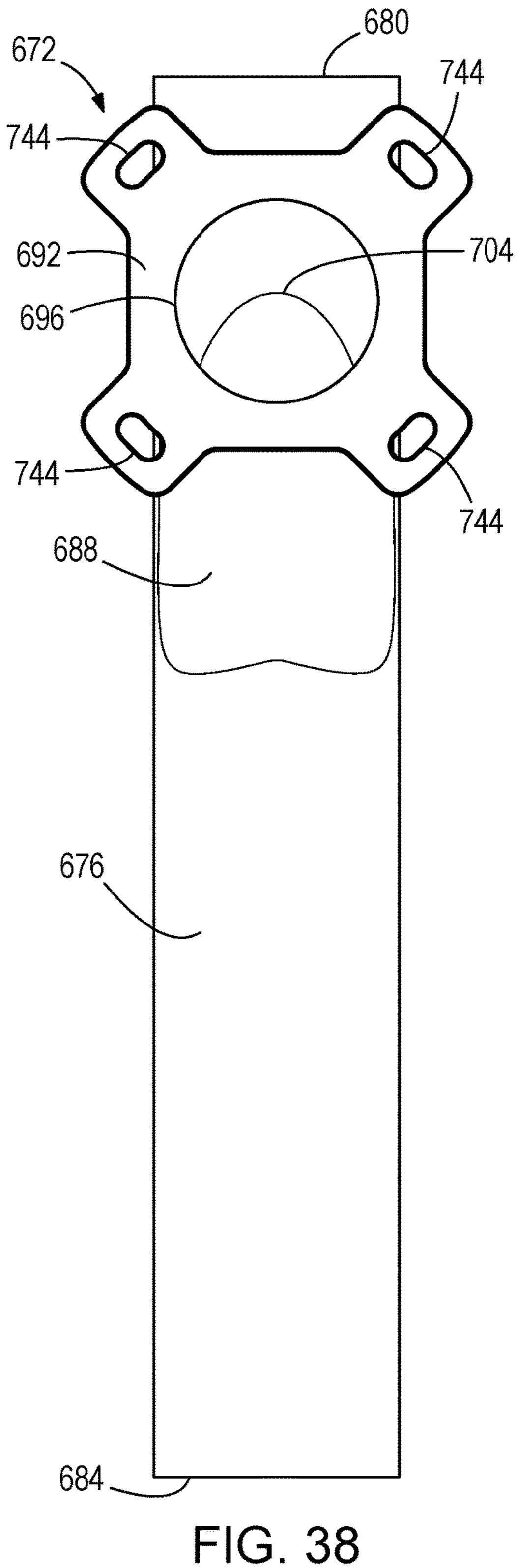
FIG. 38 illustrates a front view of the fluid coupler of FIG. 37.

In the illustrated embodiment, as shown in FIGS. 37 and 38, the flanged end 692 of the fluid coupler 672 defines slots 744 such that fasteners pass through the slots 744 and are received within corresponding threaded apertures of a faceplate to secure the fluid coupler 672 to the faceplate. More specifically, the slots 744 of the fluid coupler 672 are elongated such that the fluid coupler 672 can be rotated a few degrees or movable to accommodate various dimensional tolerances of the faceplate and the flange end 692 of the fluid coupler 672.

FIGS. 42-45 illustrate another embodiment of a fluid coupler 748 that is intended for use in a horizontal orientation. The fluid coupler 748 includes a pipe portion 752 including a first, flanged end 756 and a second end 760. The pipe portion 752 of the fluid coupler 748 is sized and shaped to encourage improved fluid flow from the flanged end 756 to the second end 760 while minimizing overall depth. The flanged end 756 of the fluid coupler 748 is coupled to a faceplate (not shown). The second end 760 of the fluid coupler 748 is coupled to a pipe or a building plumbing system. In the illustrated embodiment, the pipe portion 752 of the fluid coupler 748 has a radius of curvature on the interior surface of the exterior wall that increases as it extends from the inlet to the outlet. Stated differently, the radius of curvature of the interior surface of the exterior wall of the pipe portion 752 continuously increases as the exterior wall extends from the inlet to the outlet.

Figure 42:
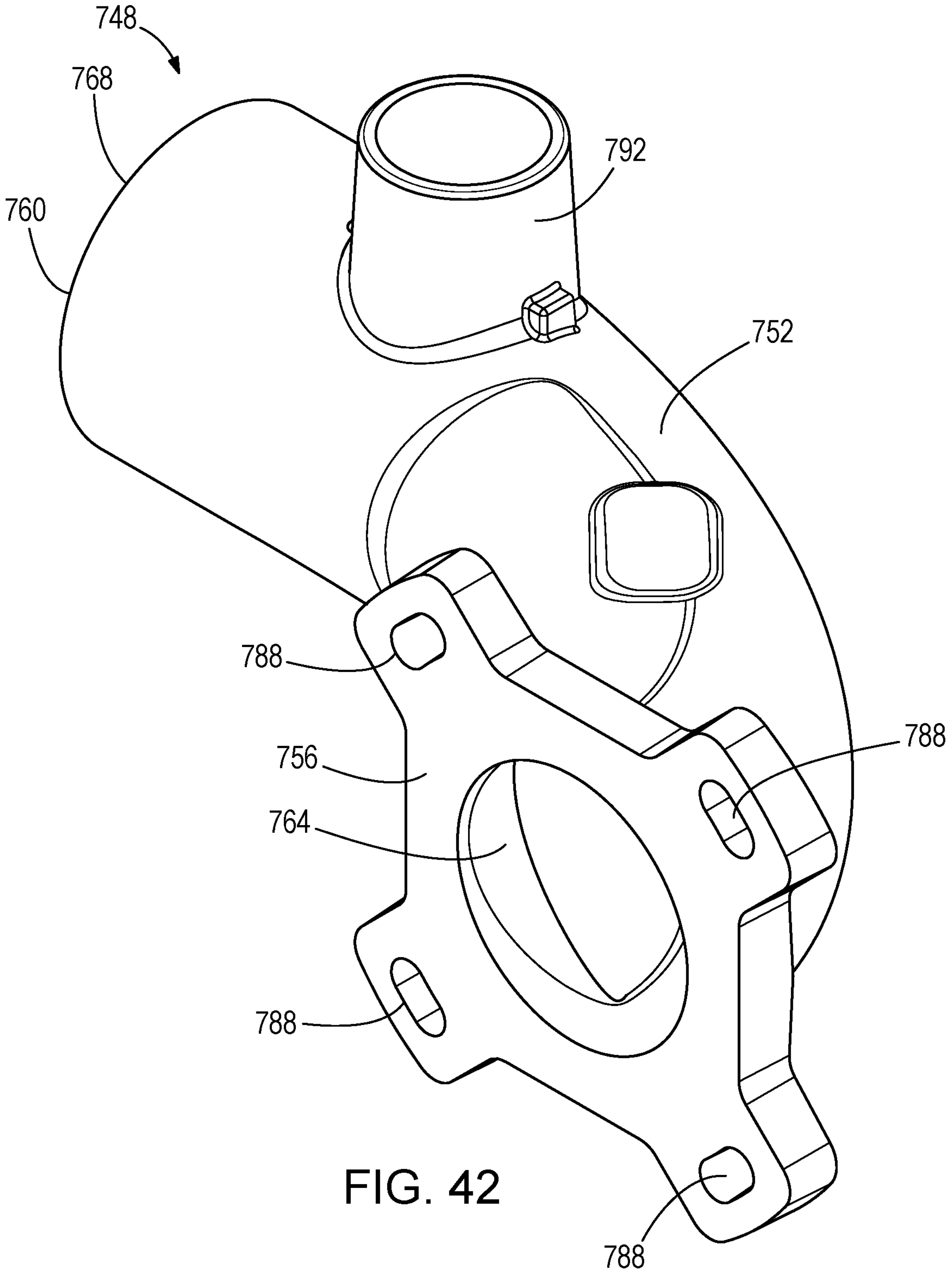
FIG. 42 illustrates another embodiment of a fluid coupler for use in a horizontal orientation.
Figure 45:
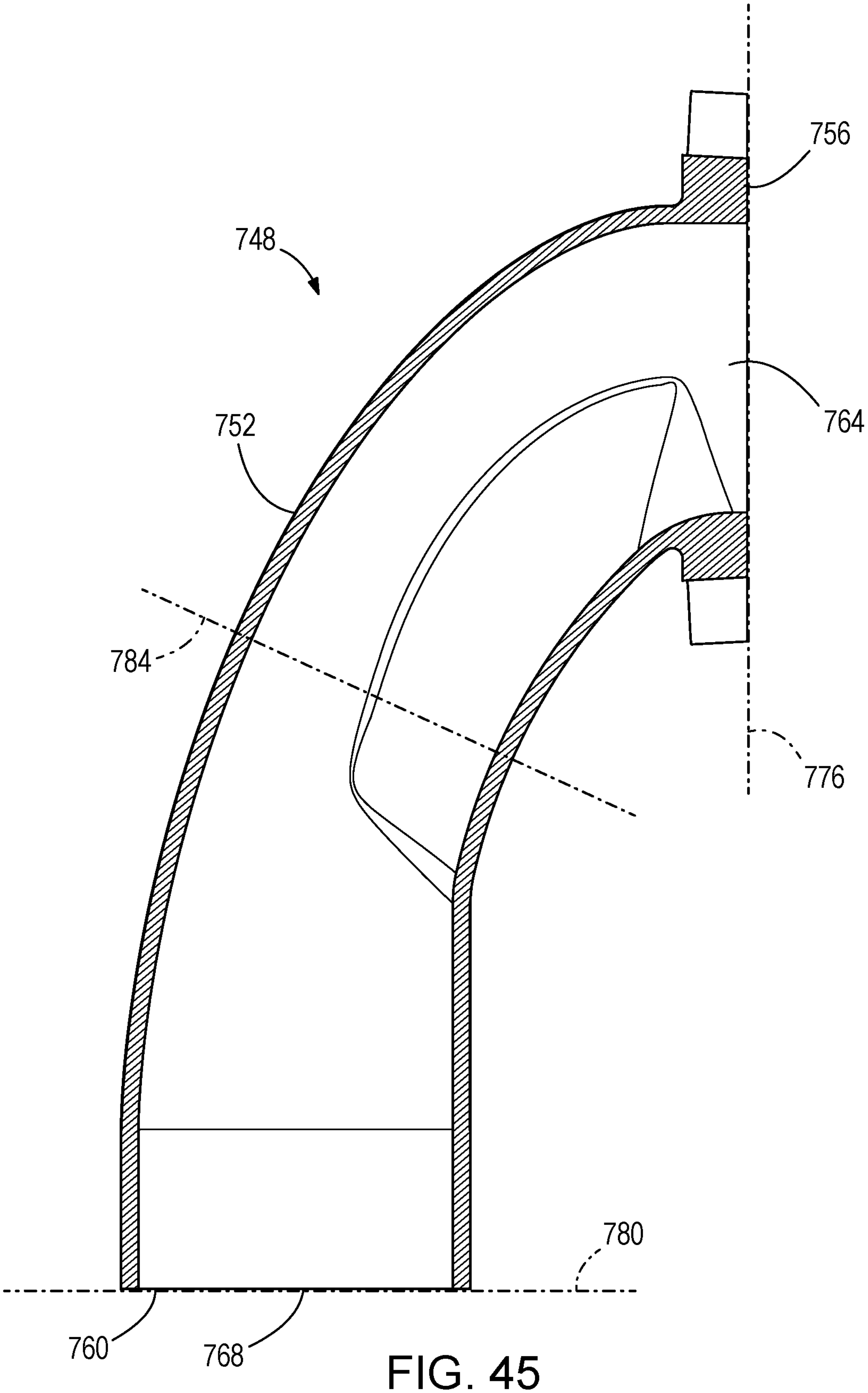
FIG. 45 illustrates a cross sectional view of the fluid coupler of FIG. 42
Figure 45A:
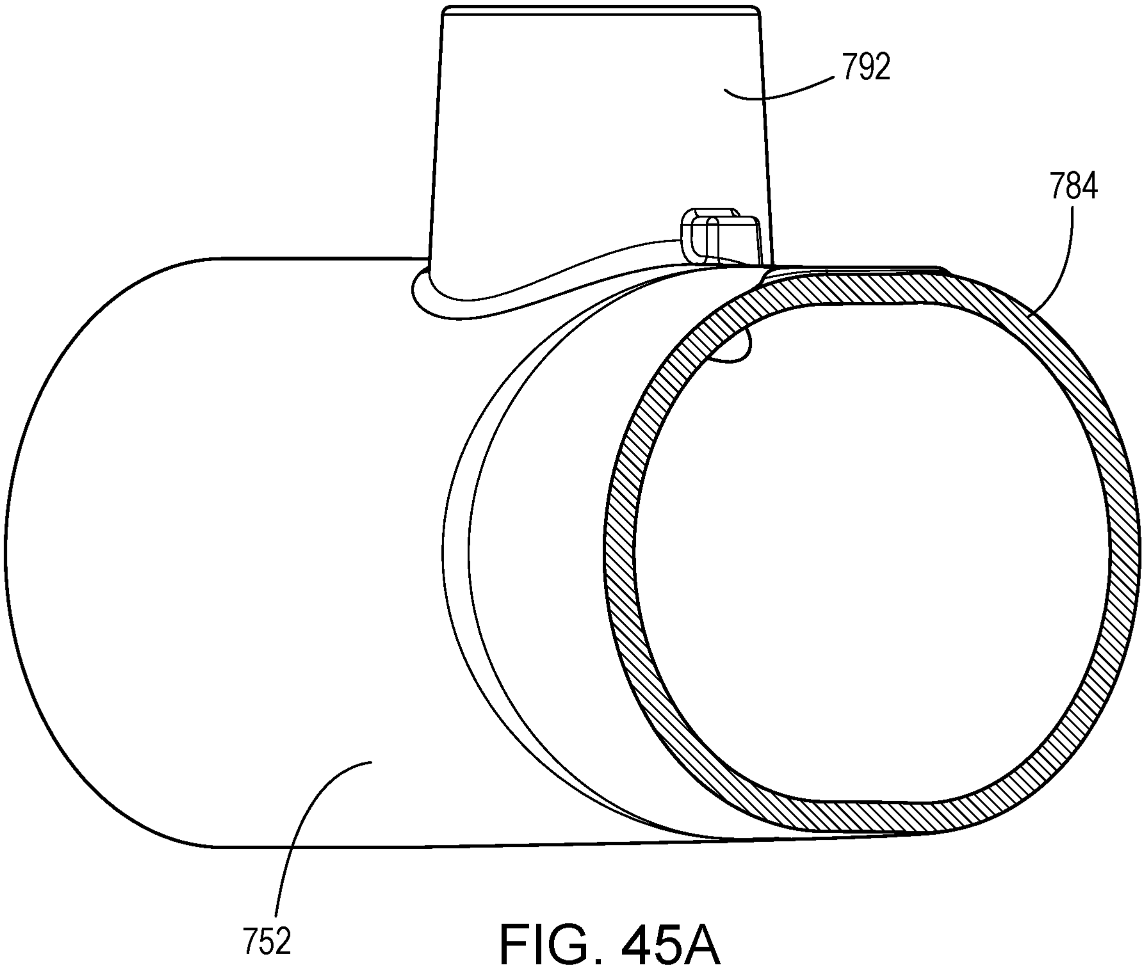
FIG. 45A illustrates a perspective sectional view of the fluid coupler of FIG. 45 taken along line 784.

As shown in FIGS. 42 and 45, the pipe portion 752 of the fluid coupler 748 includes an inlet opening 764 defined by the flanged end 756, and an outlet opening 768 defined at the second end 760. As shown in FIG. 45, the inlet opening 764 includes an inlet cross section 776 (e.g., cross section taken laterally across a diameter of the inlet opening 764) having an inlet cross sectional area, and the outlet opening 768 includes an outlet cross section 780 (e.g., cross section taken laterally across a diameter of the outlet opening 768) having an outlet cross sectional area. The pipe portion 752 further includes an intermediate cross section 784 (e.g., cross section taken laterally across a diameter of the pipe portion 752) located between the inlet cross section 776 and the outlet cross section 780. The intermediate cross section 784 can be located at a minimum inner diameter of the pipe portion 752 between the flanged end 756 and the second end 760. The intermediate cross section 784 includes an intermediate cross sectional area. The fluid coupler 748 includes a cylindrical or non-circular cross sectional shape taken at the intermediate cross section 784. The intermediate cross sectional area is less than the inlet cross sectional area and the outlet cross sectional area. In another example, the inlet cross sectional area is less than the outlet cross sectional area. The outlet cross sectional area is greater than the inlet cross sectional area and the intermediate cross sectional area.

As shown in FIG. 45, the intermediate cross section 784 includes the intermediate cross-sectional area. The intermediate cross section 784 further includes an inner diameter measured as a transverse diameter between the inner surface of the fluid coupler 748. The intermediate cross sectional area does drop below 95%, 90%, 85%, or 80% of the inlet cross sectional area. In other words, the intermediate cross sectional area at the intermediate cross section 784 is within 5%, 10%, 15%, or 20% of the inlet cross sectional area at the inlet cross section 776. In still other embodiments, the intermediate cross section 784 is approximately 95%, 90%, 85%, 80%, and 75% of the inlet cross sectional area (±1%, ±2%, ±3%, ±4%).

As shown in FIG. 45, intermediate cross sectional area does drop below 95%, 90%, 85%, or 80% of the outlet cross sectional area. In other words, the intermediate cross sectional area at the intermediate cross section 784 is within 5%, 10%, 15%, or 20% of the outlet cross sectional area at the out cross section 780. In still other embodiments, the intermediate cross section 784 is approximately 95%, 90%, 85%, 80%, and 75% of the outlet cross sectional area (±1%, ±2%, ±3%, ±4%).

Further, the inner diameter of the fluid coupler 748 at the intermediate cross section does not drop below 95%, 90%, 85%, or 80% of an inner diameter of the fluid coupler 748 at the inlet opening 764. In other words, the inner diameter of the fluid coupler 748 at the intermediate cross section is within 5%, 10%, 15%, or 20% of the inner diameter of the fluid coupler 748 at the inlet opening 764. In still other embodiments, the inner diameter of the fluid coupler 748 at the intermediate cross section is approximately 95%, 90%, 85%, 80%, and 75% of the inner diameter of the fluid coupler 748 at the inlet opening 764 (±1%, ±2%, ±3%, ±4%). The relationship of cross sectional area or inner diameter of the fluid coupler 748 at the intermediate cross section and the inlet cross section is important for providing improved fluid flow through the fluid coupler 748. In one example, the inner diameter of the fluid coupler 748 at the inlet opening 746 is approximately 3.628 inches, and the inner diameter of the fluid coupler 748 at the intermediate cross section is approximately 3.372 inches (i.e., the intermediate cross section 784 can be taken at a minimum inner diameter of the pipe portion 752 between the flanged end 756 and the second end 760).

Further, the inner diameter of the fluid coupler 748 at the intermediate cross section does not drop below 95%, 90%, 85%, or 80% of an inner diameter of the fluid coupler 748 at the outlet opening 768. In other words, the inner diameter of the fluid coupler 748 at the intermediate cross section is within 5%, 10%, 15%, or 20% of the inner diameter of the fluid coupler 748 at the outlet opening 768. In still other embodiments, the inner diameter of the fluid coupler 748 at the intermediate cross section is approximately 95%, 90%, 85%, 80%, and 75% of the inner diameter of the fluid coupler 748 at the outlet opening 768 (±1%, ±2%, ±3%, ±4%). The relationship of cross sectional area or inner diameter of the fluid coupler 748 at the intermediate cross section and the outlet cross section is important for providing improved fluid flow through the fluid coupler 748.

Figure 43:
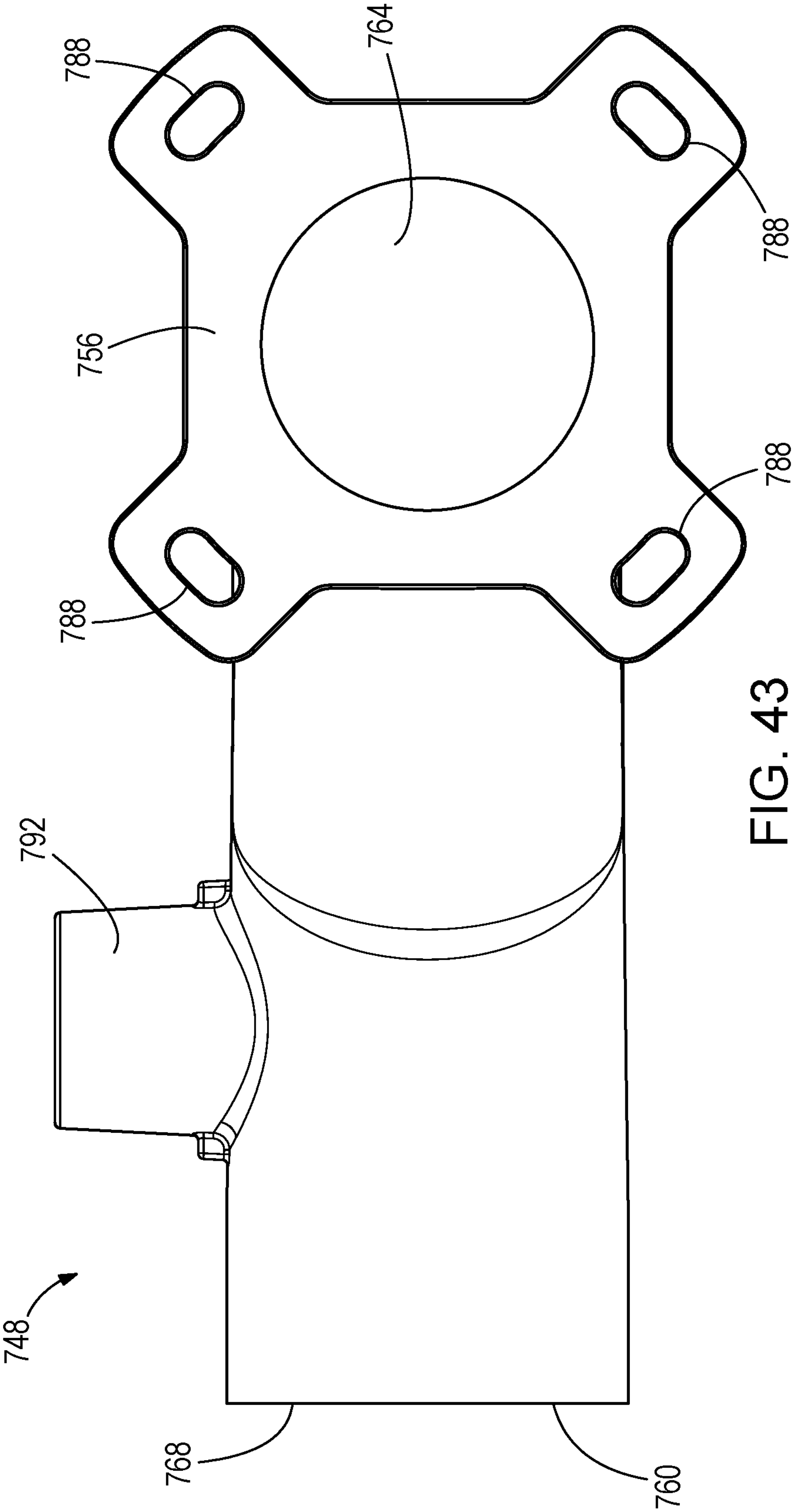
FIG. 43 illustrates a front view of the fluid coupler of FIG. 42.

In the illustrated embodiment, as shown in FIGS. 42 and 43, the flanged end 756 of the fluid coupler 748 defines slots 788 such that fasteners pass through the slots and are received within corresponding threaded apertures of a faceplate to secure the fluid coupler 748 to the faceplate. More specifically, the slots 788 of the fluid coupler 748 are elongated such that the fluid coupler 748 can be rotated a few degrees or movable to accommodate various dimensional tolerances of the faceplate and the flanged end 756 of the fluid coupler 748.

Figure 44:
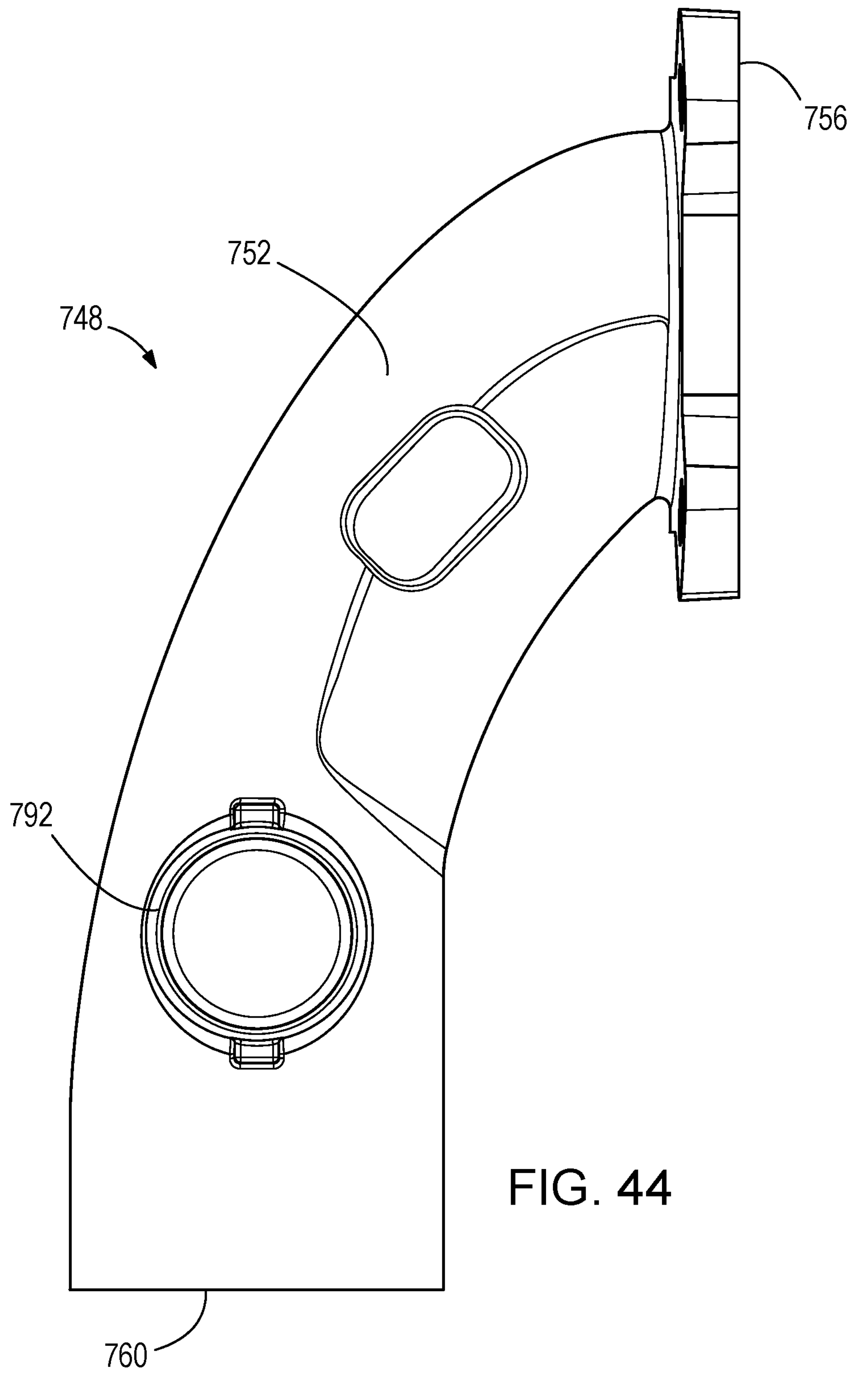
FIG. 44 illustrates a top view of the fluid coupler of FIG. 42.

As shown in FIGS. 42-44, the fluid coupler 748 further includes a vent 792 extending vertically upward from the pipe portion 752. The vent 792 provides a fluid or air path between other plumbing fixtures via a pipe separate from a pipe coupled to the second end 760 of the fluid coupler 748.

Figure 46:
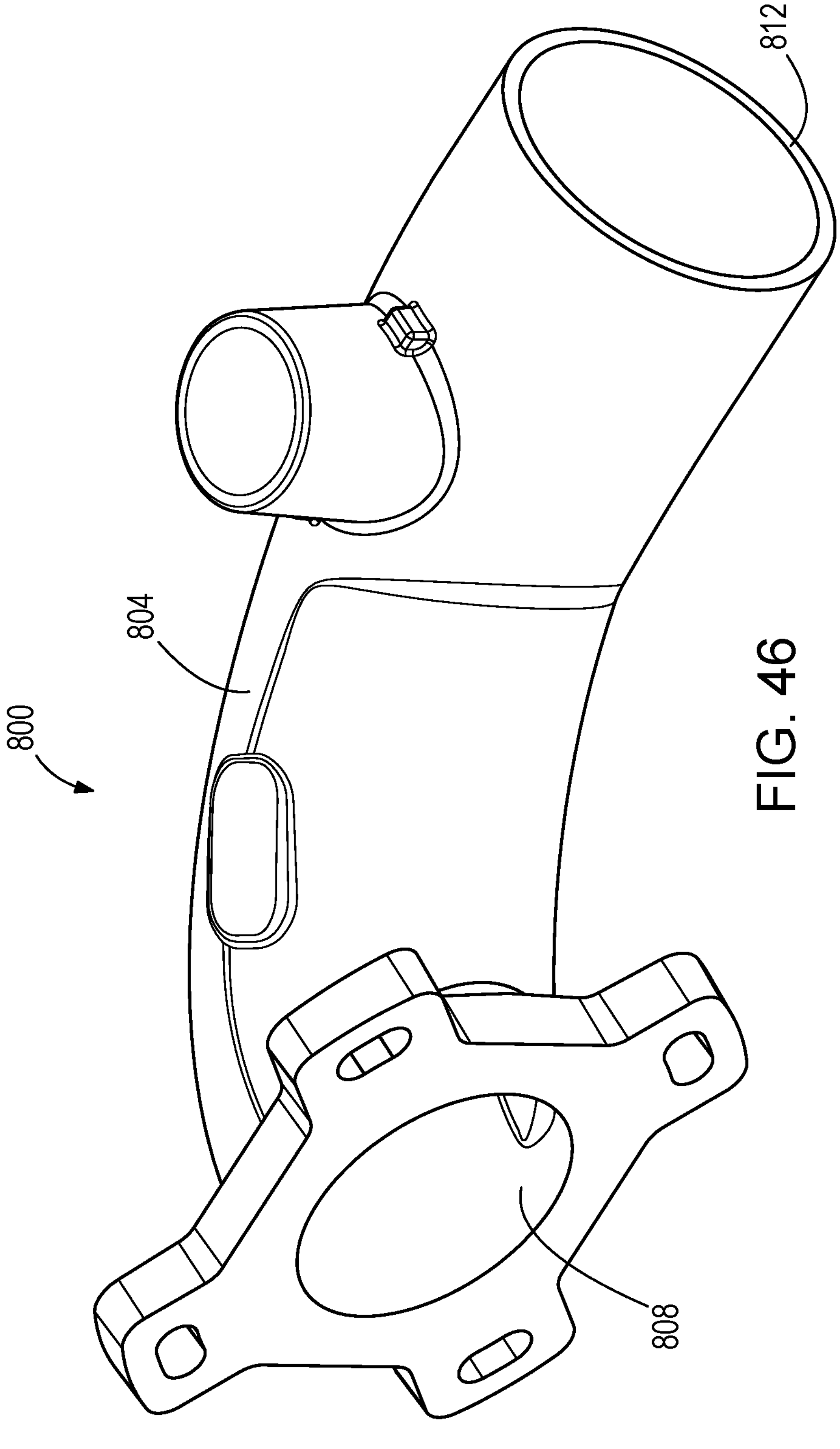
FIG. 46 illustrates another embodiment of a fluid coupler for use in a horizontal orientation.
Figure 47:
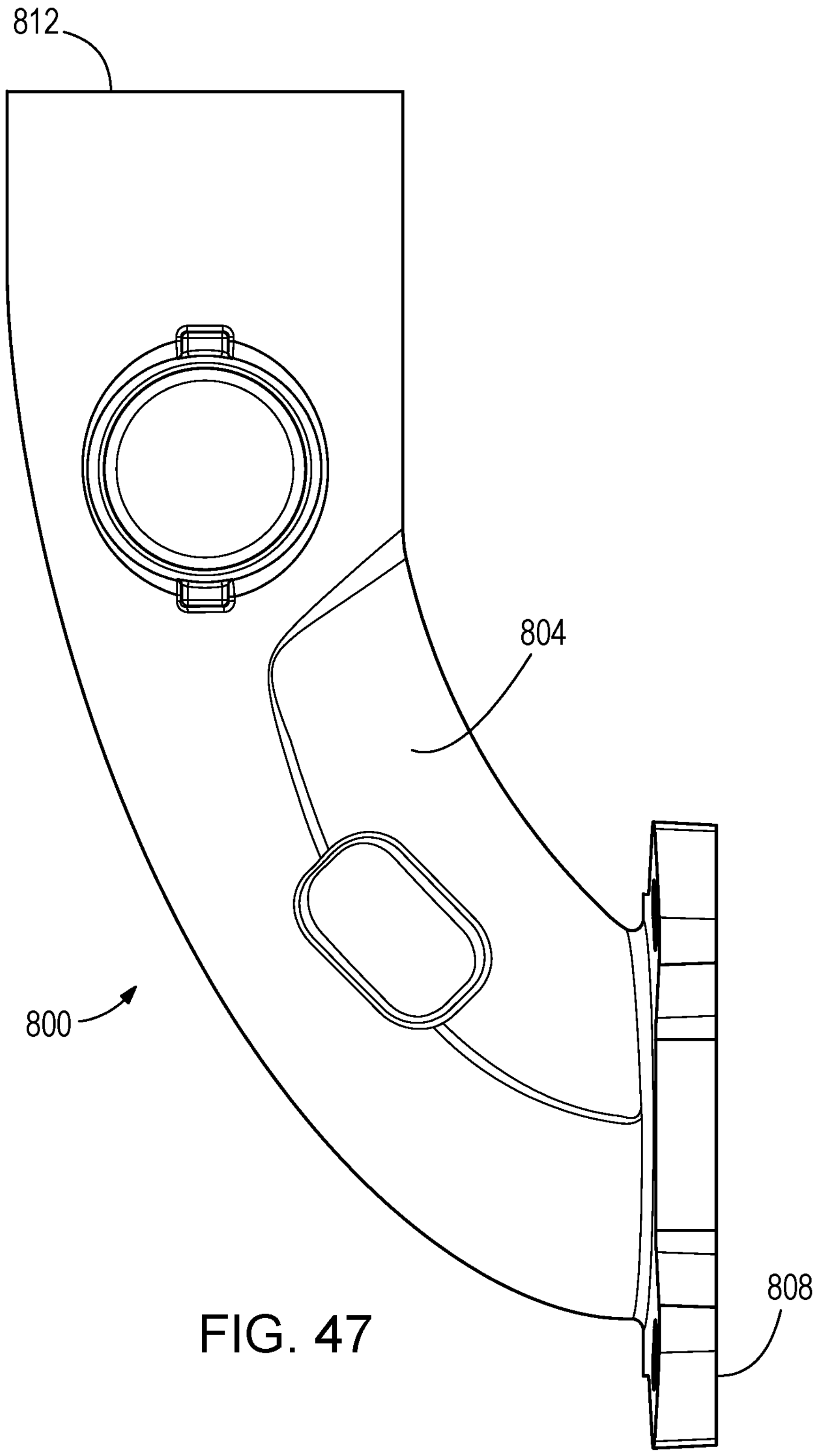
FIG. 47 illustrates a top view of the fluid coupler of FIG. 46.

FIGS. 46 and 47 illustrates another embodiment of a fluid coupler 800 that is intended for use in a horizontal orientation. The fluid coupler 800 is similar to the fluid coupler 748, with the following differences described below. The fluid coupler 800 includes a pipe portion 804 extending between a first, flanged end 808 and a second end 812. The pipe portion 804 of the fluid coupler 800 extends in an opposite direction as compared to the fluid coupler 748 illustrated in FIGS. 42-45. The pipe portion 804 of the fluid coupler 800 is sized and shaped to encourage improved fluid flow from the flanged end 808 to the second end 812. The flanged end 808 of the fluid coupler 800 is coupled to a faceplate (not shown). The second end 812 of the fluid coupler is coupled to a pipe or a building plumbing system.

Figure 48:
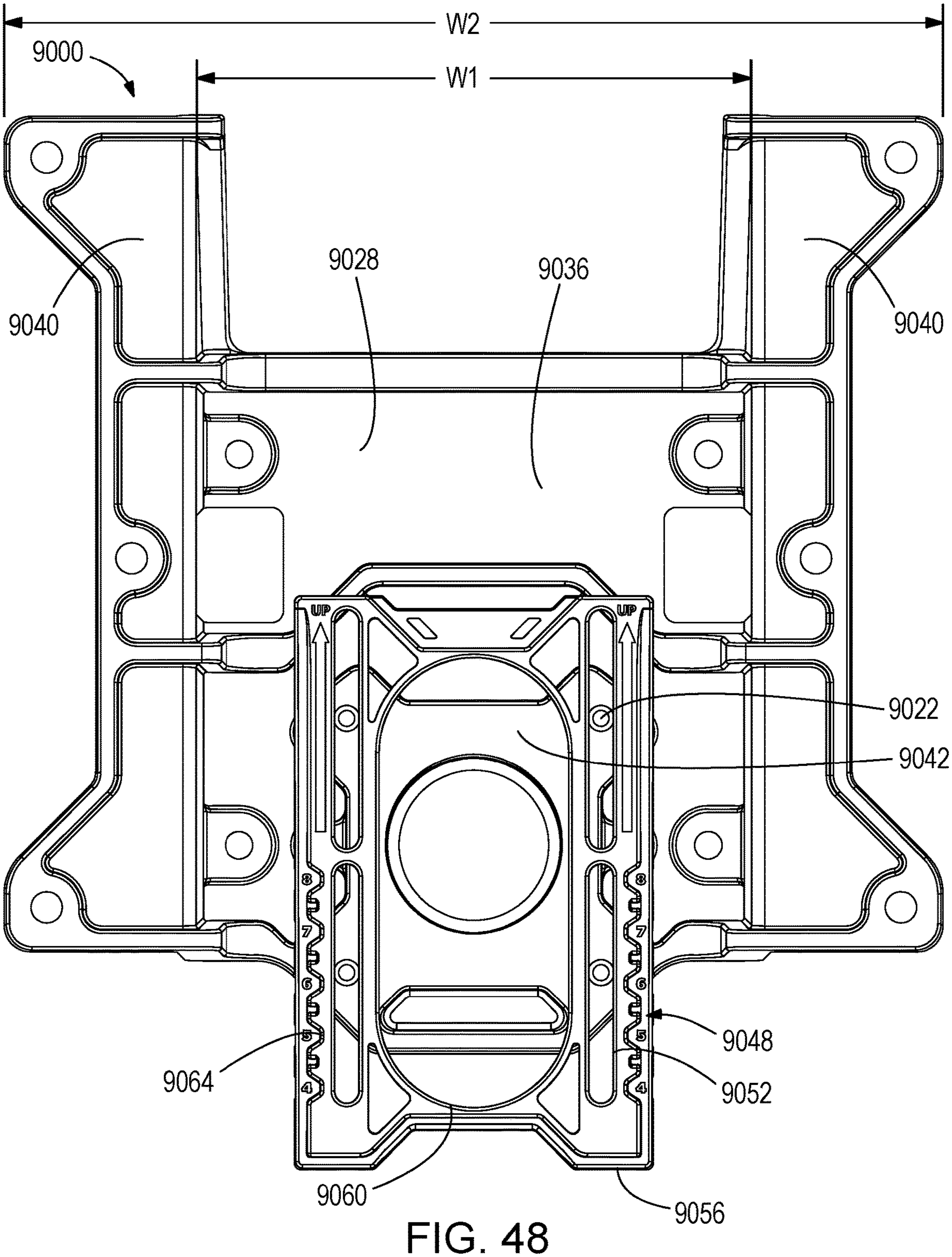
FIGS. 48-50 illustrate another embodiment of a carrier assembly.
Figure 49:
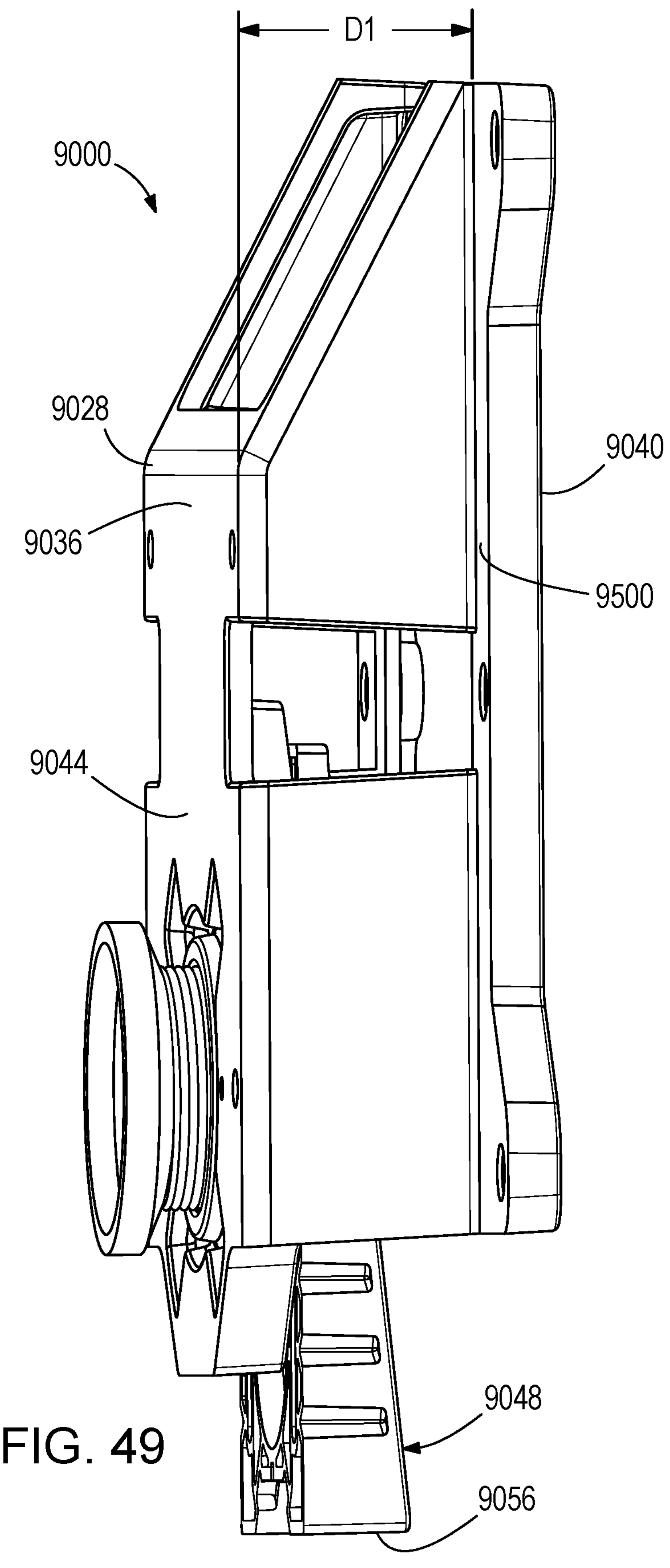
Figure 50:
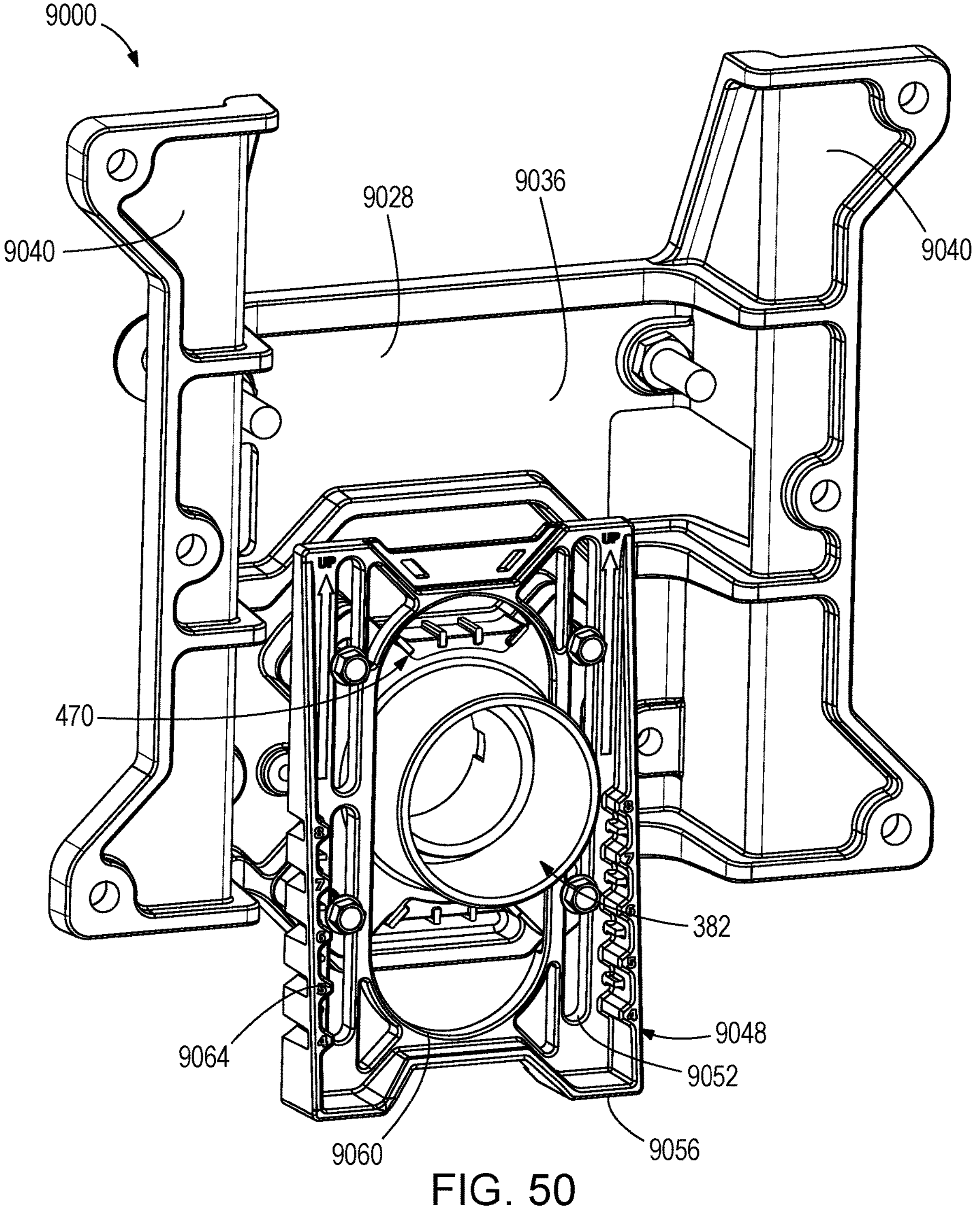

FIGS. 48-50 illustrate another embodiment of a carrier assembly 9000. The carrier assembly 9000 is substantially similar to the carrier assembly 342, so only the differences will be described in detail herein. The faceplate 9028 of the carrier assembly 9000 includes a central portion 9036 with a first mounting surface 9044 (FIG. 49) and a pair of side portions 9040 flanking the central portion 9036 on opposite sides thereof. The side portions 9040, in turn, each include a second mounting surface 9500 (FIG. 49) configured to directly contact the rear wall surface or studs on which the carrier assembly 9000 is mounted. When installed, the first mounting surface 9044 is offset from both second mounting surfaces 9500 such that when the second mounting surfaces 9500 are in contact with the rear wall surface, the first mounting surface 9044 is substantially aligned with the front wall surface where the water closet or fixture is to be mounted. More specifically, as best shown in FIG. 49, the first mounting surface 9044 and the second mounting surfaces 9500 define an offset distance D1 therebetween of between 3.25 inches and 6 inches. In other embodiments, the offset distance D1 is between 3.25 and 3.75 inches. In still other embodiments, the offset distance D1 is between 3.25 and 3.5 inches. In still other embodiments, the offset distance D1 is approximately 3.25 inches±0.125".

The faceplate 9028 also defines a stud width W1 generally defined as the horizontal width of the central portion 9036 of the faceplate 9028 (see FIG. 48), which fits between adjacent studs or uprights. In the illustrated embodiment, the stud width W1 is approximately 11.5 inches. In still other embodiments, the stud width W1 is between 11 inches and 12 inches. In still other embodiments, the stud width W1 is between 10.5 and 12.5 inches. In still other embodiments, the stud width W1 is approximately 11.5 inches±5%. Furthermore, the faceplate 9028 defines an overall width W2 of approximately 18 inches. In other embodiments, the overall width W2 is between 17 and 19 inches.

As illustrated in FIGS. 48-50, the carrier assembly 9000 may include an installation adjustment device or support 9048. The support 9048 may include vertical slots 9052 configured to align with the mounting apertures 9022 of the mounting hub 9042 for receiving a fluid coupler 382. Fasteners may be fixed through the slots 9052 and mounting apertures 9022 to fix the support 9048 to the faceplate 9028. The slots 9052 can allow for adjustment of the position of the support 9048 relative to the faceplate 9028 before tightening the fasteners. A bottom end or foot 9056 of the support 9048 may be configured to contact and rest on a floor or baseplate or other horizontal wall member of the wall structure and thereby provide support to hold the faceplate 9028 at a fixed height during installation of the faceplate 9028 to the wall structure. This enables a user to more easily install of the faceplate 9028 without having to otherwise hold or support the weight of the faceplate during installation to the wall. In some embodiments, the support 9048 can be removed once the faceplate 9028 is installed on the wall structure. In other embodiments, as illustrated in FIG. 50, the outlet connector 382 and gasket 470 may be sandwiched between the faceplate 9028 and support 9048 such that the support 9048 does not need to be removed. The support 9048 may include an enlarged opening 9060 that is configured to not interfere with the outlet connector 382 extending away from the faceplate 9028 over the entire range of mounting possibilities of the support 9048 to the faceplate 9028. The support may include notches, markings, or indicia 9064 that a user can align with a portion of the faceplate 9028, such as a bottom edge of the central portion 9036, that enables a user to set the support 9048 in a position that results in a predetermined height of the mounted carrier assembly 9000 relative to the floor.

Figure 51:
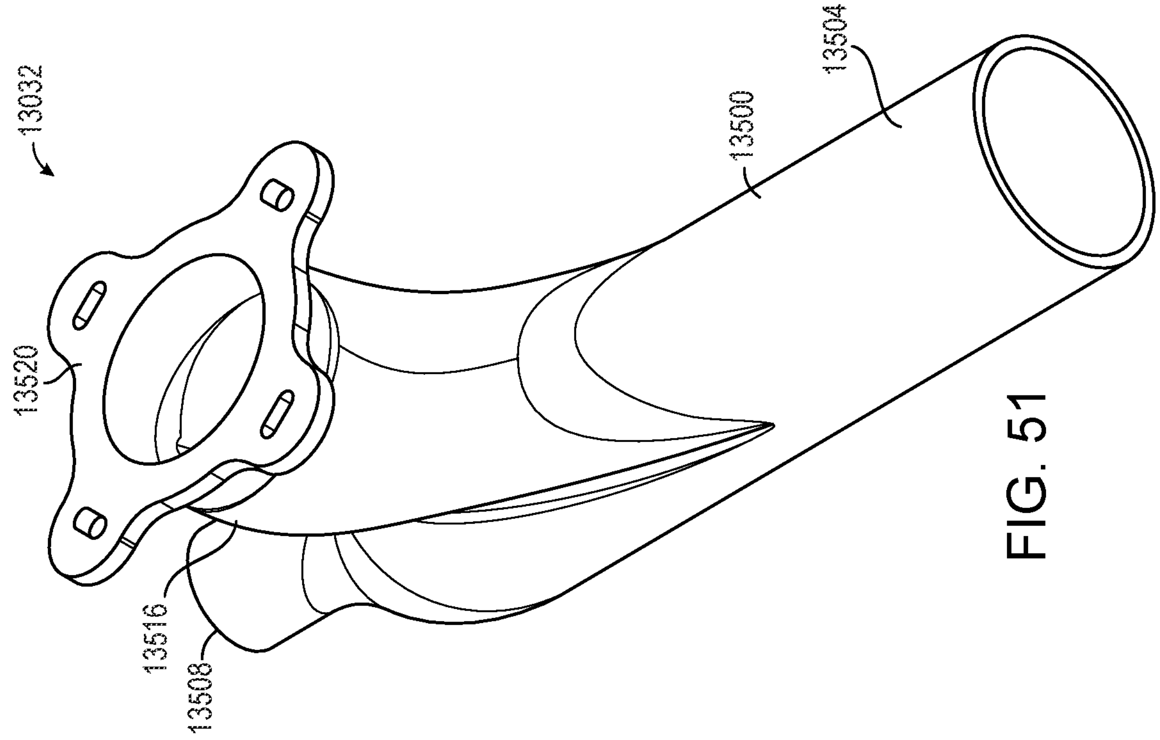
FIG. 51 illustrates another embodiment of a fluid coupler.

FIG. 51 illustrates another embodiment of a fluid coupler 13032. The fluid couple 13032 is substantially similar to the fluid coupler 310, so only the differences will be described in detail herein. The primary segment 13500 includes an elongated member having a first or downstream end 13504 having a first diameter, and a second or upstream end 13508 opposite the first end 13504 having a second diameter that is less than the first diameter. During use, the second end 13508 is configured for attachment to a vent pipe when installed in a vertical configuration. The primary segment 13500 transitions from the first diameter to the second diameter at a portion of the primary segment 13500 that is upstream of the secondary segment 13516 that terminates at a flanged end 13520. In this way, the transition or reduced diameter does not reduce or impede fluid flow from the secondary segment 13516 to the downstream first end 13504 of the primary segment 13500.

Figure 53:
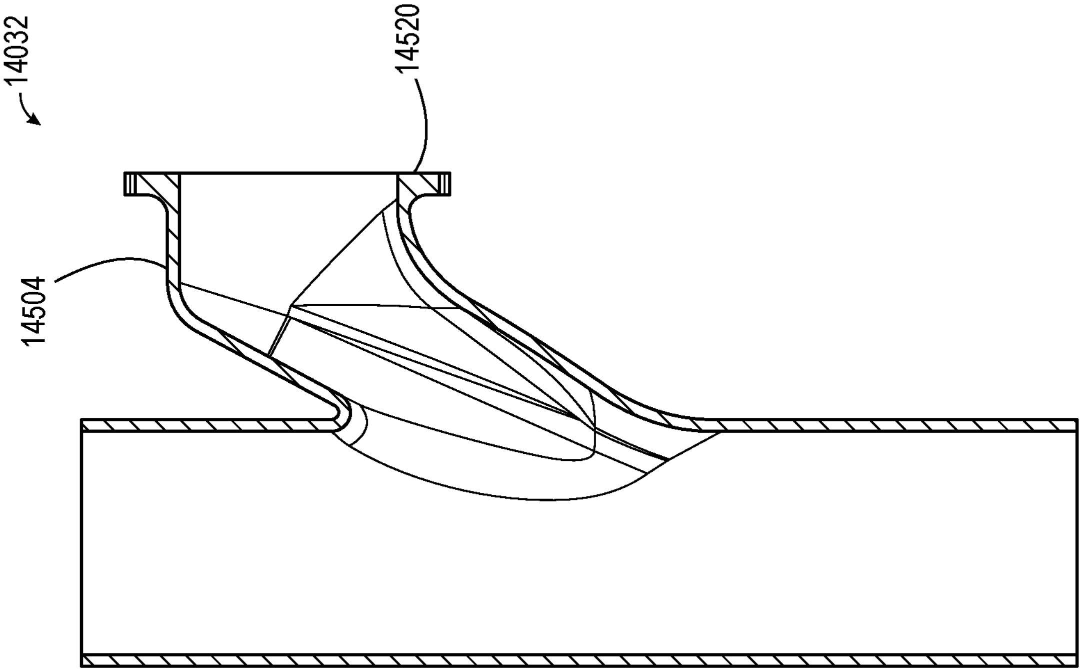
Figure 55:
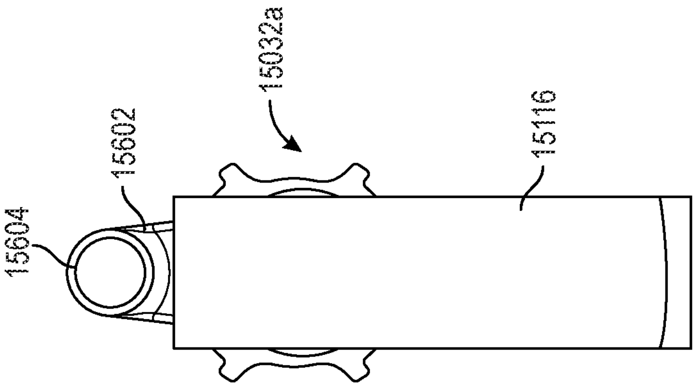
FIGS. 54-58 illustrate another embodiment of a fluid coupler.
Figure 54:
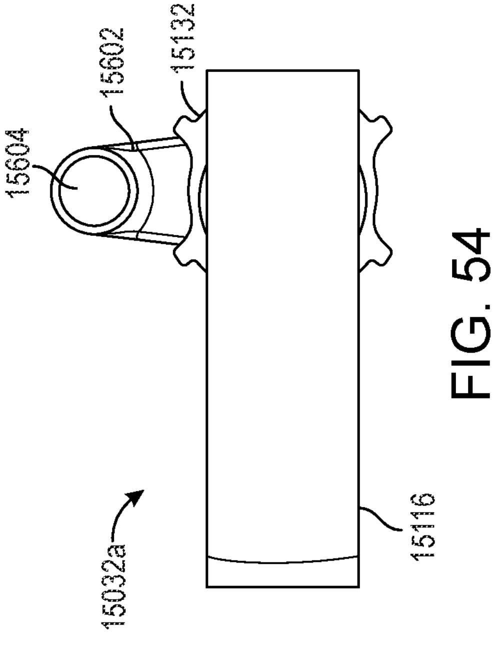

FIGS. 52 and 53 illustrate another embodiment of a fluid coupler 14032. The fluid coupler 14032 is substantially similar to the fluid coupler 310, so only the differences will be described in detail herein. The flanged end 14520 includes four mounting slots or apertures 14500 spaced 90 degrees apart. As shown in FIG. 53, each aperture 14500 is open (e.g., not completely enclosed) such that a fastener (not shown) can be inserted into and removed from the aperture 14500 without having to unthread the fastener from the corresponding aperture. When installing the fluid coupler 14032 to a faceplate, the user first threads two of the four fasteners (e.g., the bottom two fasteners) into the mounting hub. The user can then position the coupler 14032 such that the flanged end 14520 is in direct contact with the sealing surface and the bottom two fasteners are laterally introduced into their corresponding apertures 14500 via the opening. With the coupler 14032 in place, the user can then tighten the two pre-positioned fasteners and introduce and fasten the remaining two fasteners.

As best shown in FIG. 53, the fluid coupler 14032 also includes an offset such that the exterior wall of the first portion adjacent the flanged end 14520 has a straight portion 14504 that extends axially away from the flange 14520 a pre-determined distance before beginning to curve downwardly. By doing so, the offset provides additional clearance to allow the opposing fluid coupler (e.g., element 422 of FIG. 30) to be able to be inserted into the fluid coupler 14032 when being adjusted. The depth of the straight portion 14504 may be configured to correspond to possible insertion depths of the opposing fluid coupler.

Figure 59B:
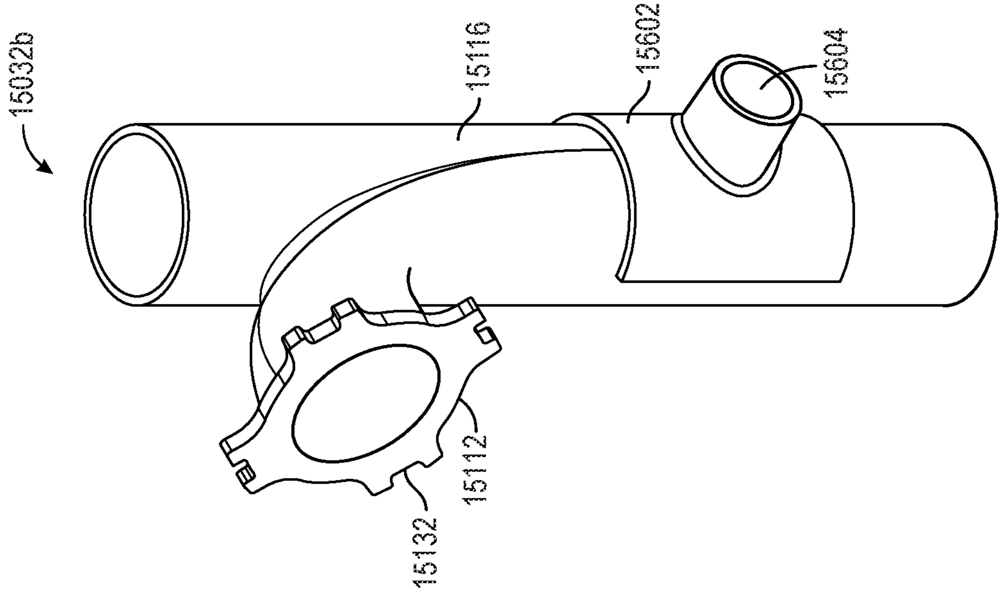
FIGS. 59A and 59B illustrate another embodiment of a fluid coupler.
Figure 59A:
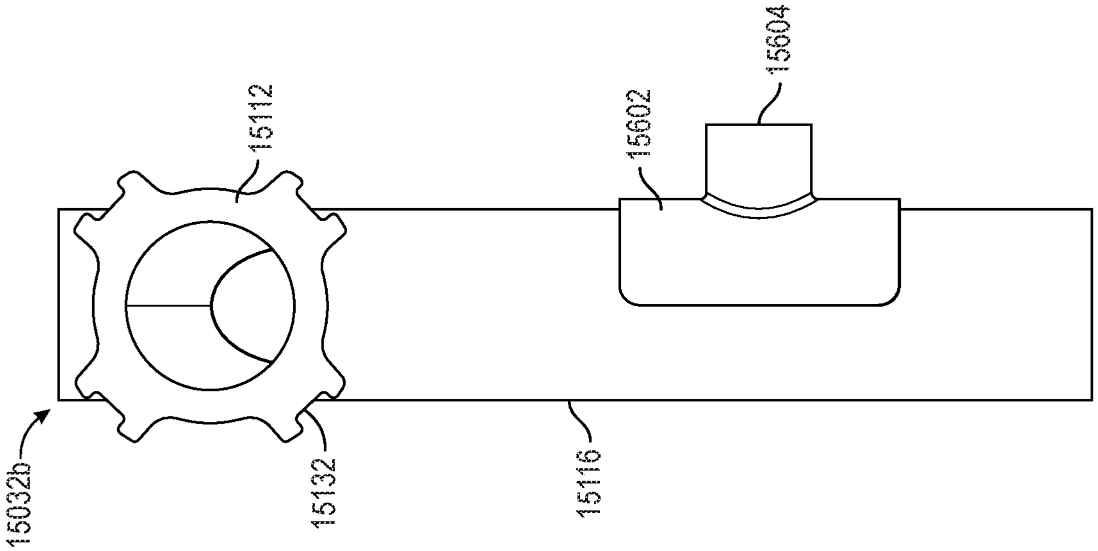
Figure 60B:
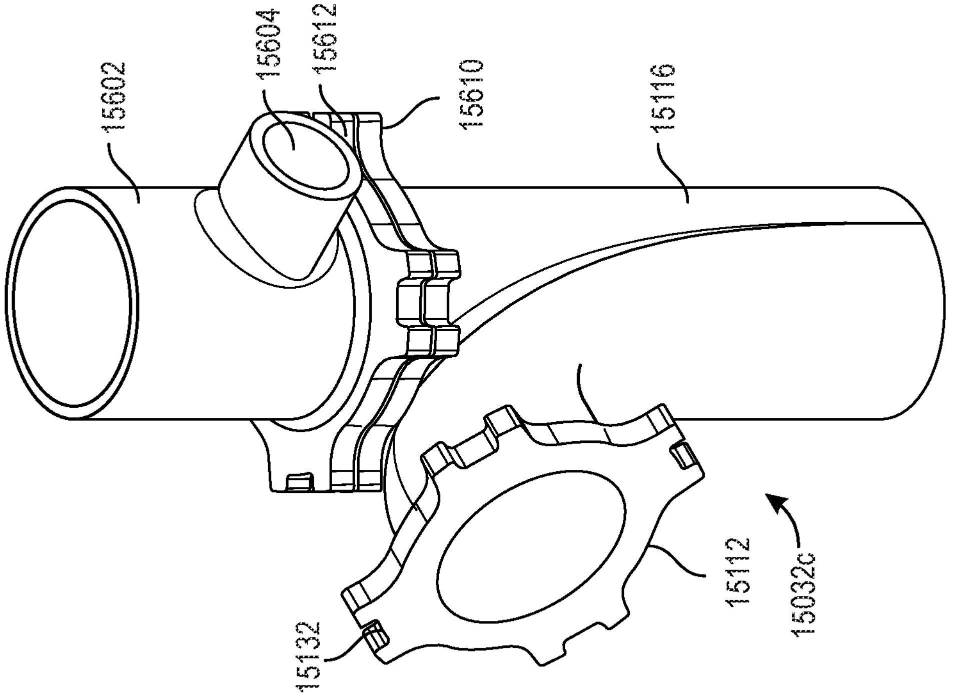
FIGS. 60A-60D illustrate another embodiment of a fluid coupler.
Figure 60A:
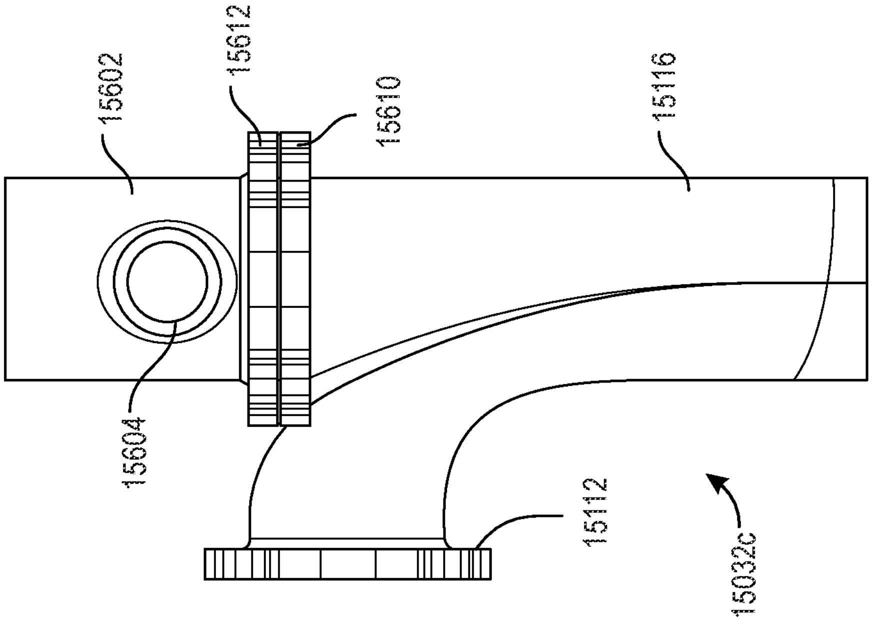
Figure 60D:
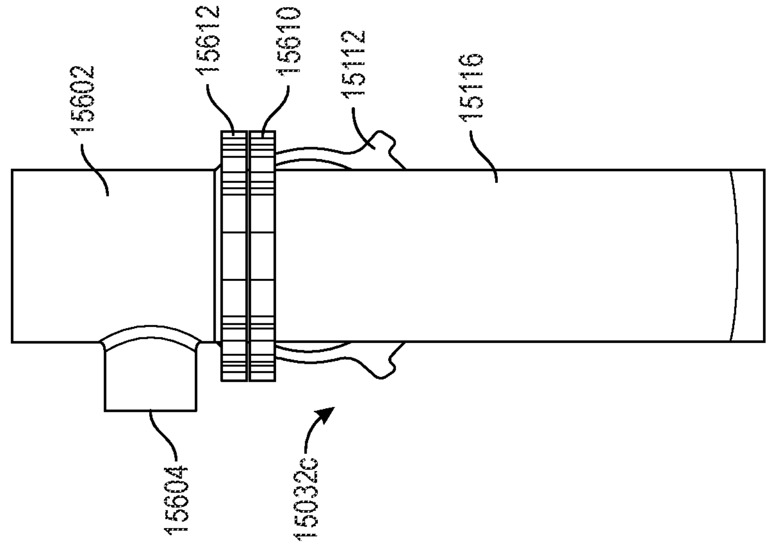
Figure 60C:
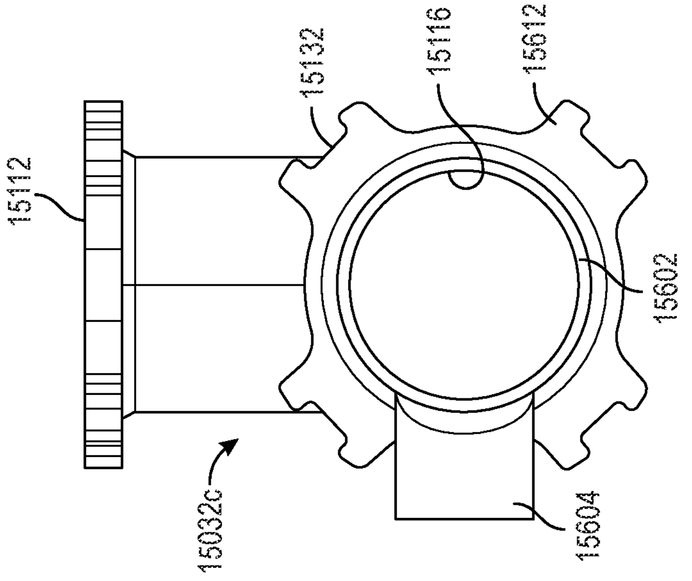

Various embodiments of outlet connectors 15032 are illustrated in FIGS. 54-68B and are differentiated from one another based on an alphabetical suffix of the reference numeral (e.g., the fluid coupler illustrated in FIGS. 54-58 is outlet connector 15032*a* and the outlet connector illustrated in FIGS. 59A-59B is outlet connector 15032*b*). Each outlet connector is similar to others described herein, except as described below.

Figure 56:
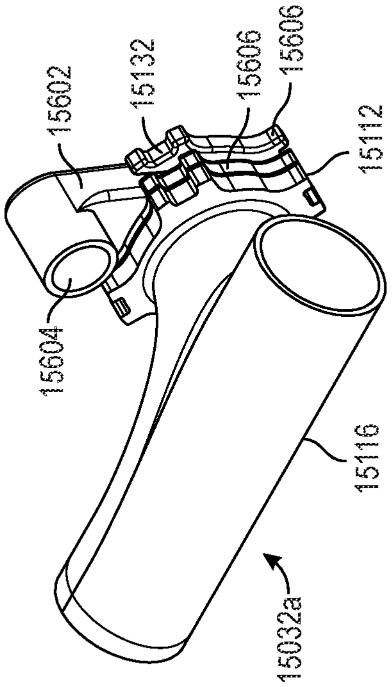
Figure 57:
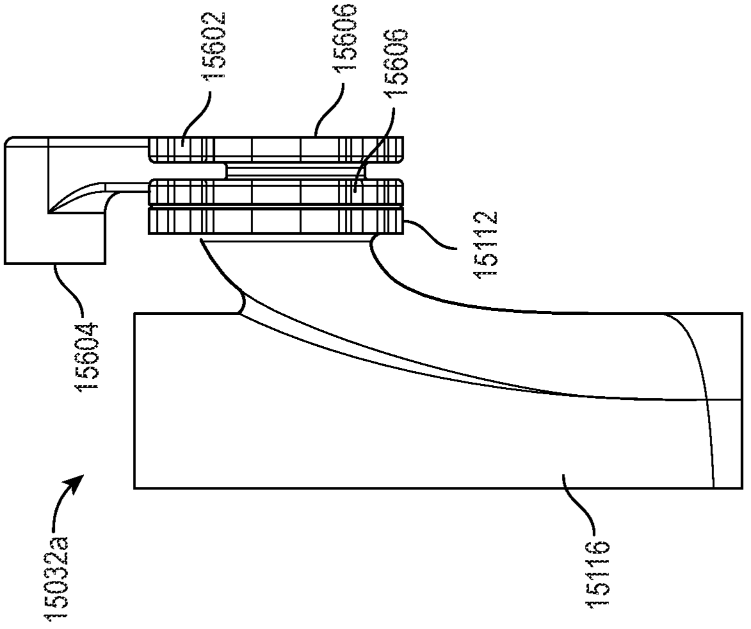
Figure 58:
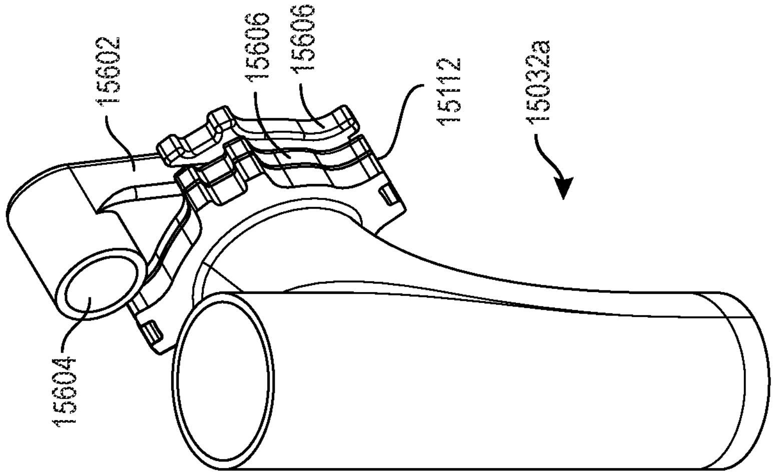

The outlet connector 15032*a* illustrated in FIGS. 54-58 is similar to the J-shaped fluid coupler 382 illustrated in FIGS. 29-30 but includes a separate vent body 15602 that, when installed, is sandwiched between the faceplate and the flange portion 15112 of the outlet connector 15032*a*. More specifically, the vent body 15602 includes a vent passage 15604 extending radially outwardly and away from a central body that, in turn, includes a first flange portion 15606 configured to engage and form a water-tight connection with the flange portion 15112 of the outlet connector 15032*a* and a second flange portion 15606 configured to form a water-tight connection with the faceplate. As shown in FIG. 56, the vent passage 15604 may form an L-shaped passage with an outlet that is parallel to the axis of the central body. Seals or gaskets may be located at these the two flange portions 14606.

As the vent body 15602 is a separate component from the outlet connector 15032*a* and the mating surfaces are rotationally identical, the vent body 15602 can be coupled to the fluid coupler in multiple different arrangements. When the outlet connector 15032*a* is rotated such that the outlet pipe 15116 is in a left orientation (FIGS. 54 and 56), the vent body 15602 can be coupled so that the vent passage 15604 vents vertically above the outlet connector 15032*a*. When the outlet connector 15032*a* is rotated such that the outlet pipe 15116 is in a right orientation, the vent body 15602 can be coupled so that the vent passage 15604 vents vertically above the outlet connector 15032*a*. When the outlet connector 15032*a* is rotated such that the outlet pipe 15116 is in a vertical orientation (FIGS. 55, 57, and 58), the vent body 15602 can be coupled so that the vent passage 15604 vents vertically above the outlet connector 15032*a*. As such, the outlet connector 15032*a* in combination with the vent body 15602 can be used in any desired orientation.

The outlet connector 15032*b* illustrated in FIGS. 59A-59B includes a separate vent body 15602 formed as a saddle joint that can be coupled to the outlet connector 15032*b* at any rotational position along the cylindrical body of the outlet connector 15032*b*. The vent body 15602 defines a vent passage 15604 that can provide access to the interior of the outlet connector via a drilling process after the vent body 15602 is coupled to the outlet connector 15032*b*. By orienting the vent passage 15604 at the desired location and orientation, the outlet connector 15032*b* can be utilized in either of the left or right orientations.

The outlet connector 15032*c* illustrated in FIGS. 60A-60D includes a separable vent body 15602 defining a vent passage 15604 and located upstream of the outlet pipe 15116 and coupled to the outlet pipe 15116 via a connection of two mating flanges 15610, 15612. Similar to the flanged connection of the outlet connector 15032*a*, the vent body 15602 is capable of connecting to the outlet connector 15032*c* at four distinct locations based on the attachment pattern of the flanges 15610, 15612. As such, the outlet connector 15032*c* is capable of coupling to the faceplate in left, right, or vertical orientations.

Figure 61A:
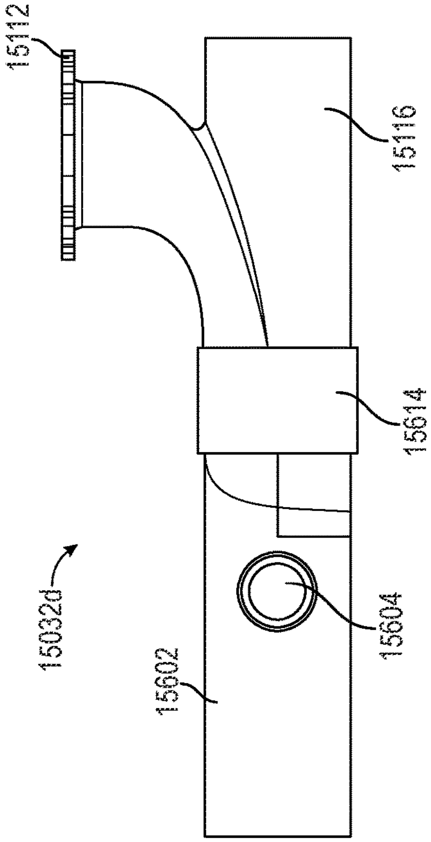
FIGS. 61A and 61B illustrate another embodiment of a fluid coupler.
Figure 61B:
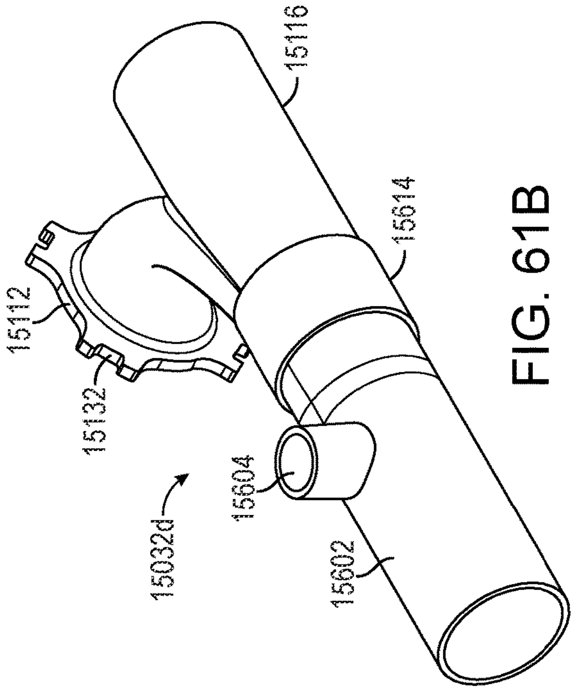

The outlet connector 15032*d* illustrated in FIGS. 61A-61B includes a separable vent body 15602 defining a vent passage 15604, located downstream of the outlet pipe 15116, and coupled to the outlet pipe 15116 via a no hub band 15614. The no hub band 15614 is configured to couple the vent body 15602 to the coupler 15032*d* when the vent body 15602 is in any rotated position (rotation about its central axis) relative to the outlet connector 15032 such that the vent passage 15604 is rotated into an upwards facing orientation when coupled to the outlet connector 15032*d*.

Figure 62B:
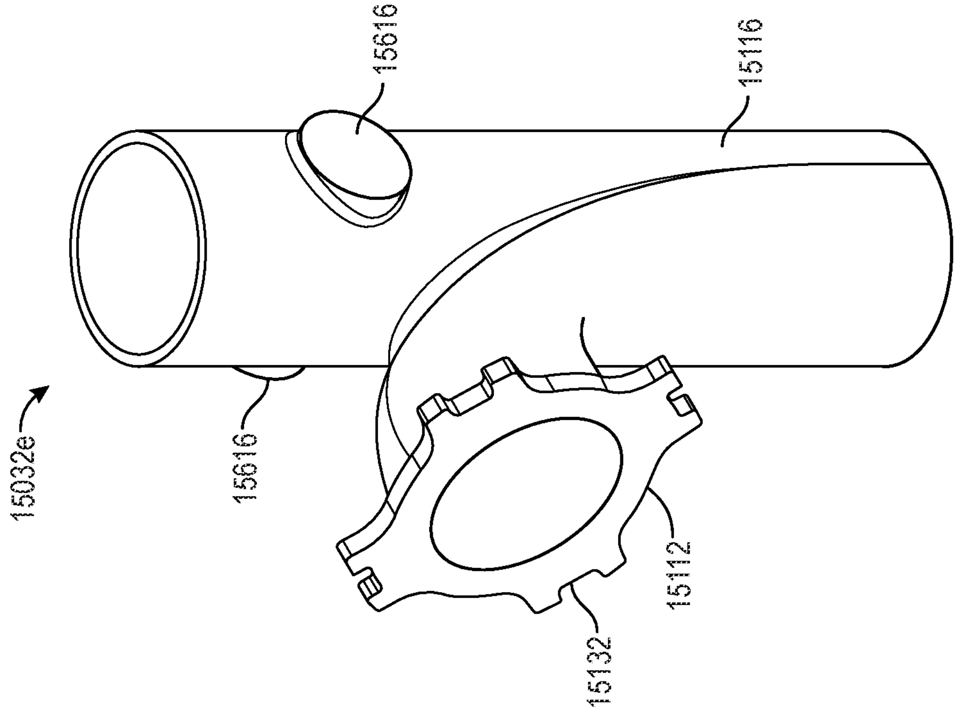
FIGS. 62A-62C illustrate another embodiment of a fluid coupler.
Figure 62A:
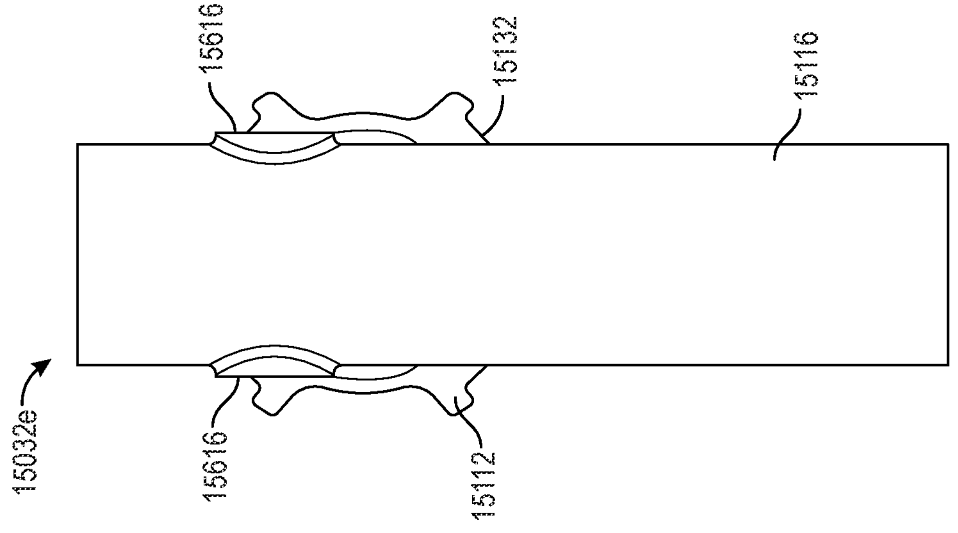
Figure 62C:
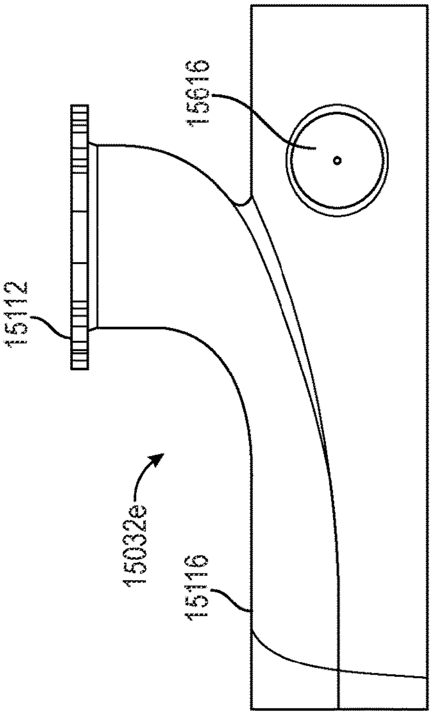

The outlet connector 15032*e* illustrated in FIGS. 62A-62C includes bosses 15616 that extend radially outward from the second end 15116 of the outlet connector 15032*e*. A vent passage (not shown) can be coupled to either of the bosses and the endcap of the boss 15616 can be drilled through to provide a vent passage therethrough. As the bosses 15616 are offset from one another by 180 degrees (located on opposite sides of the cylindrical pipe portion 15116), the installer can use the same outlet connector 15032*e* for either a leftward extending or rightward extending coupler by utilizing the appropriate boss 15616 as a vent.

Figure 63A:
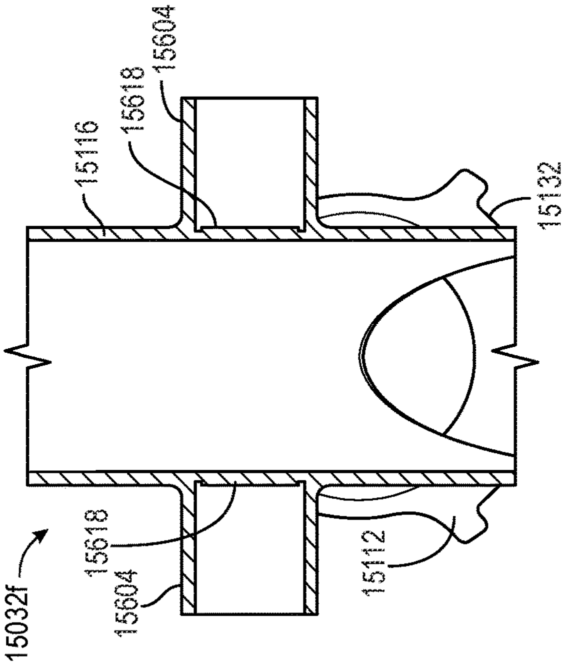
FIGS. 63A-63C illustrate another embodiment of a fluid coupler.
Figure 63B:
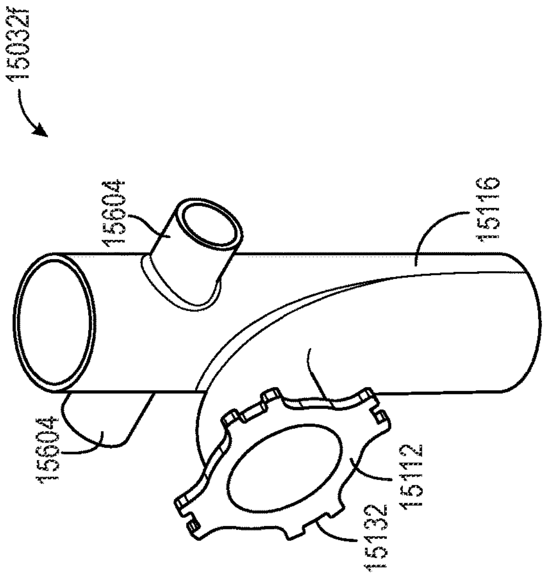
Figure 63C:
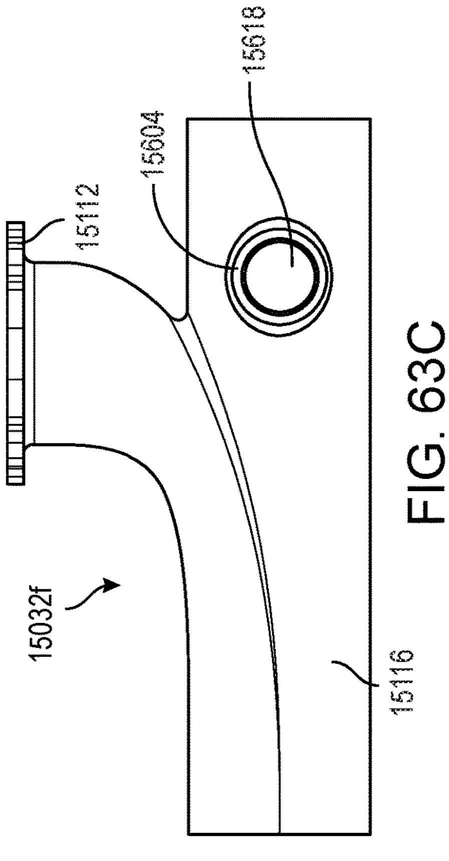
Figure 64B:
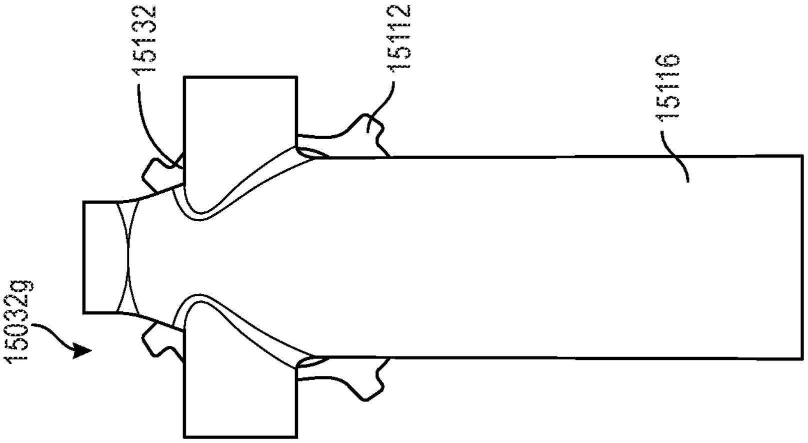
FIGS. 64A-64D illustrate another embodiment of a fluid coupler.
Figure 64A:
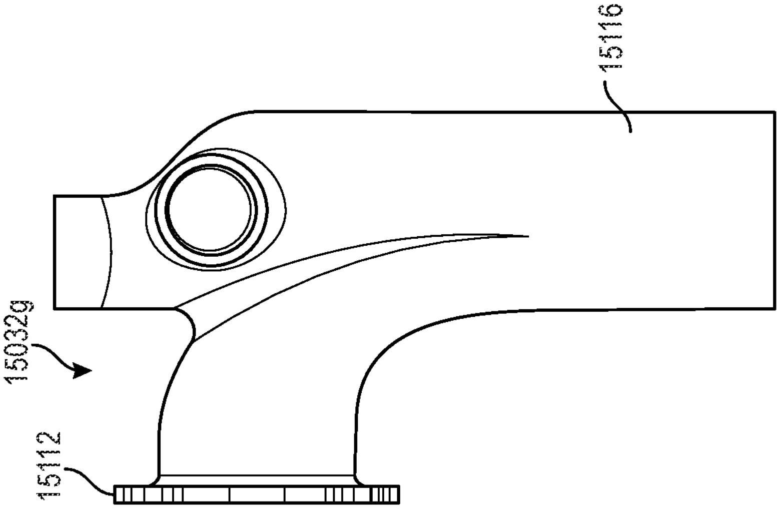
Figure 64D:
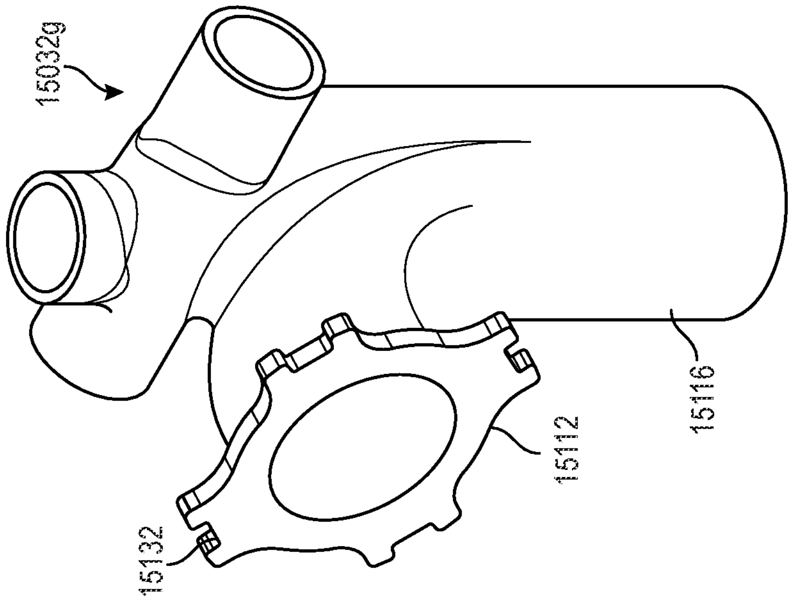
Figure 64C:
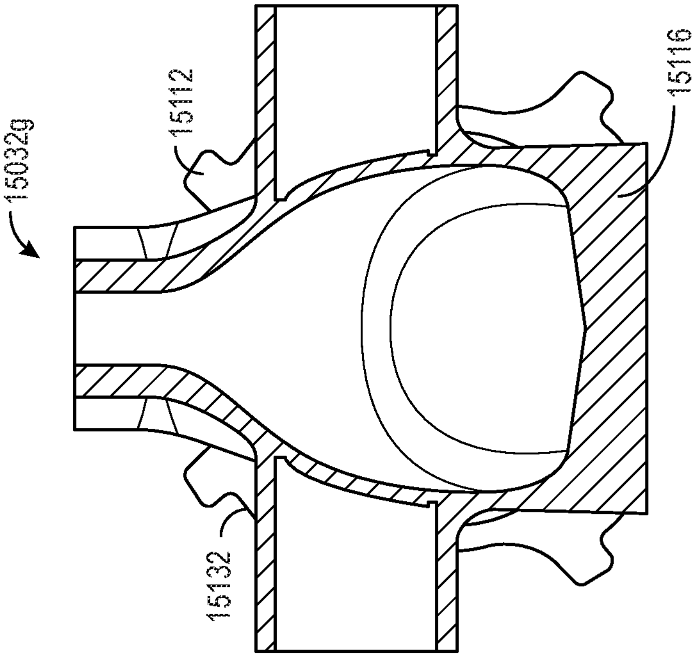
Figure 65B:
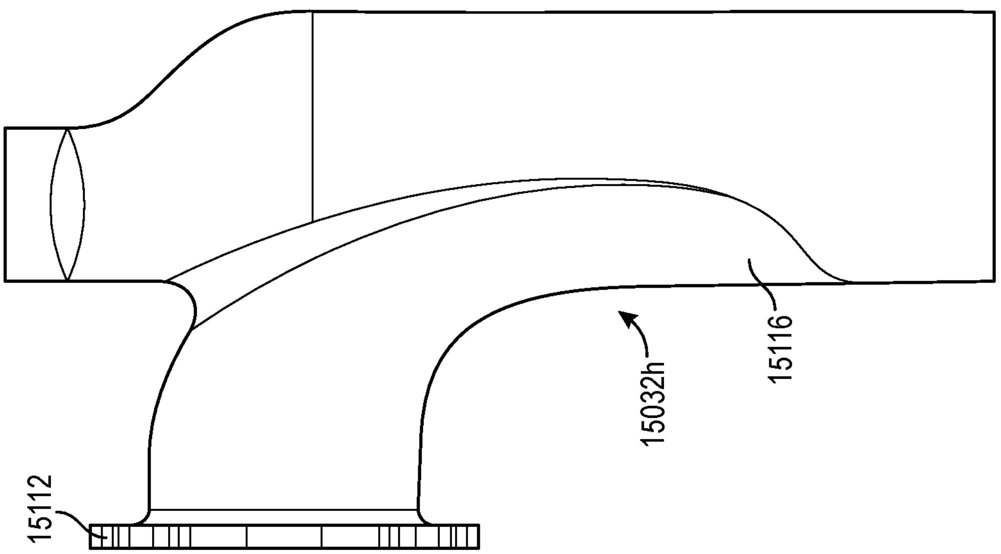
FIGS. 65A-65C illustrate another embodiment of a fluid coupler.
Figure 65A:
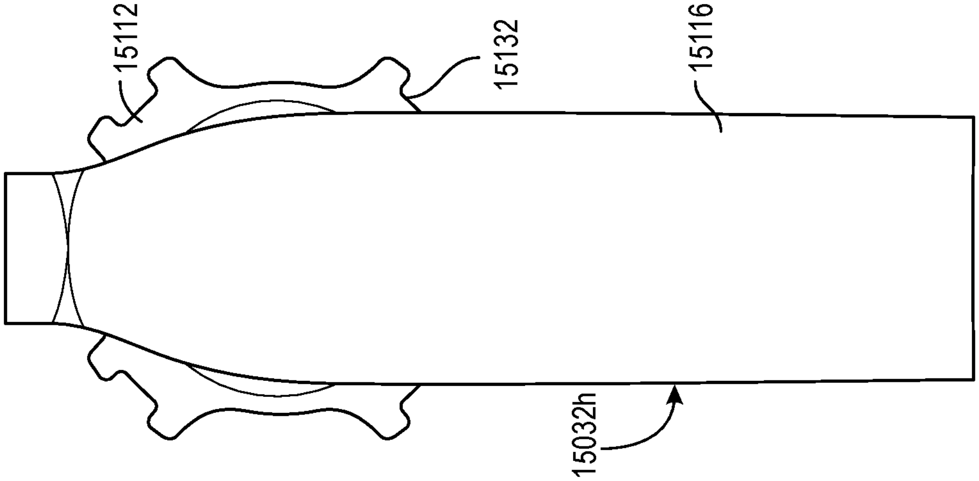
Figure 65C:
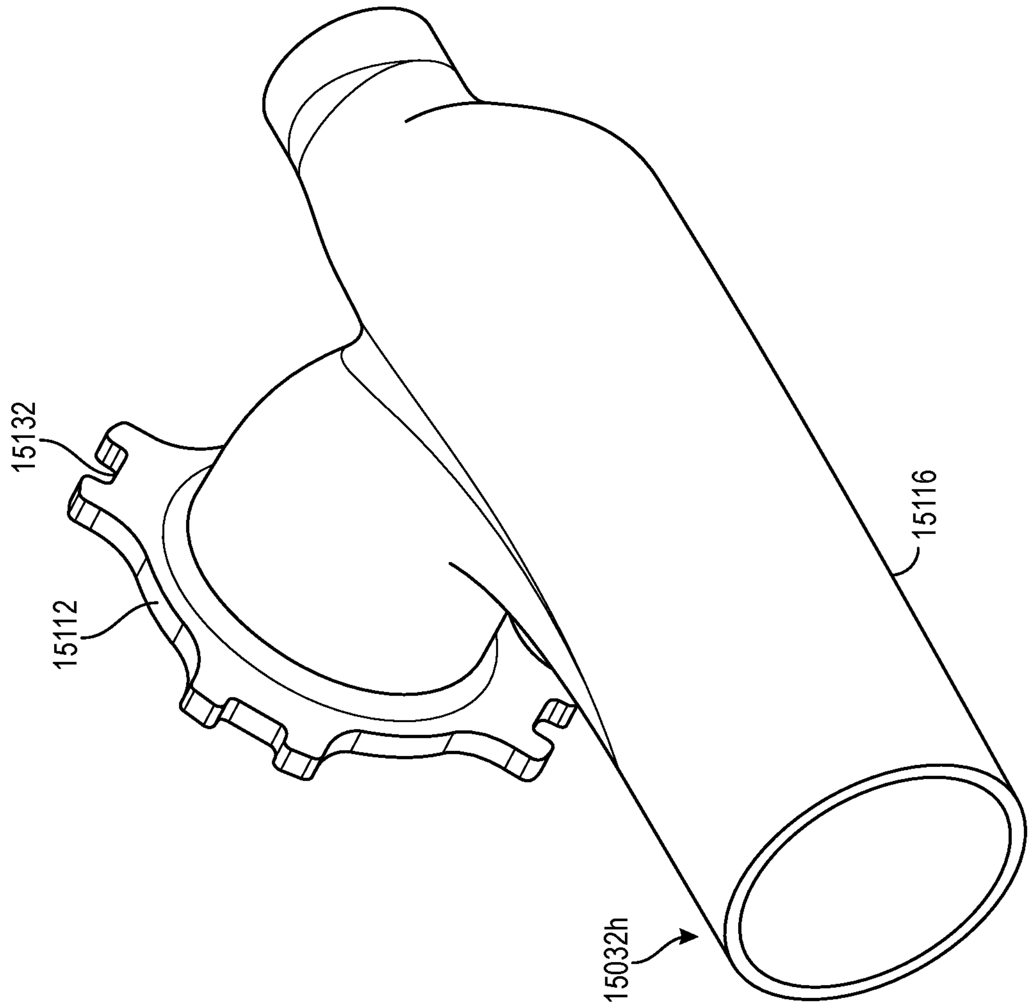

The outlet connector 15032*f* illustrated in FIGS. 63A-63C is similar to the outlet connector 15032*e* though instead of including boss features that can each mate with a vent passage, the vent passages 15604 are integrally formed with the second end 15116 at a location upstream of J-shaped junction. The vent passages 15604 are similarly on opposing sides such that one can be selectively opened to function as a vent. The vent passages 15604 are initially closed off by a plug 15618 that can be hammered out (or otherwise removed) to open the vent path 15604 to the remainder of the interior of the outlet connector 15032*f*. The plugs 15618 may include a thin-walled perimeter to define the breaking point for opening the vent path 15604.

Figure 67:
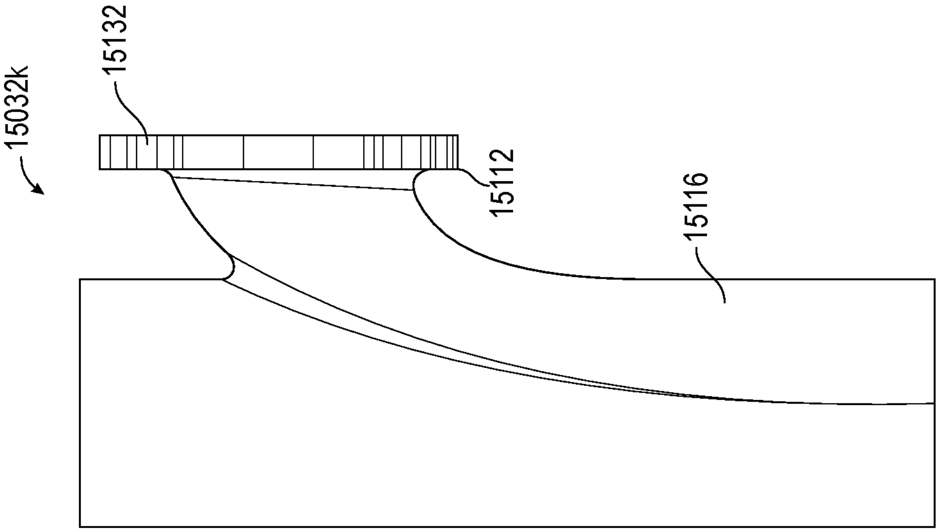
FIG. 67 illustrates another embodiment of a fluid coupler.

The outlet connector 15032*g* illustrated in FIGS. 64A-64D is similar to the outlet connector 15032*f* though an upstream portion of the outlet pipe 15116 has a reduced diameter (e.g., 2-inch diameter compared to a 4-inch diameter at the downstream portion) that is axially offset from the remainder of the outlet pipe 15116. The reduced diameter portion is located nearer to the flange 15112 such that the reduced diameter portion is located nearer to the wall assembly 15004 and may move into the wall cavity. The outlet connector 15032*h* illustrated in FIGS. 65A-65C has a reduced diameter portion similar to outlet connector 15032*g* shown in FIGS. 64A-64D. The outlet connector 15032*k* illustrated in FIG. 67 is similar to the outlet connector 15032*h*, though the diameter of the upstream and downstream portions is consistent (e.g., 4-inch diameter).

Figure 66A:
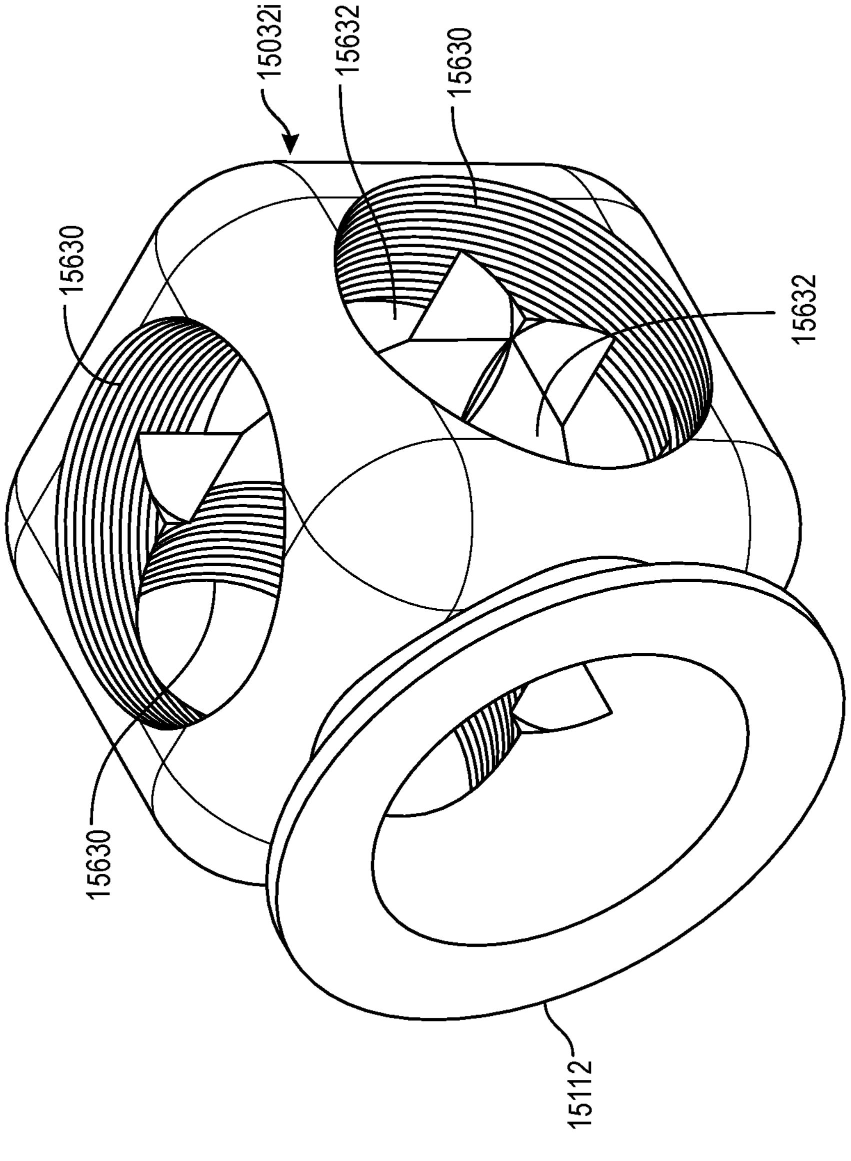
FIGS. 66A-66D illustrate another embodiment of a fluid coupler.
Figure 66D:
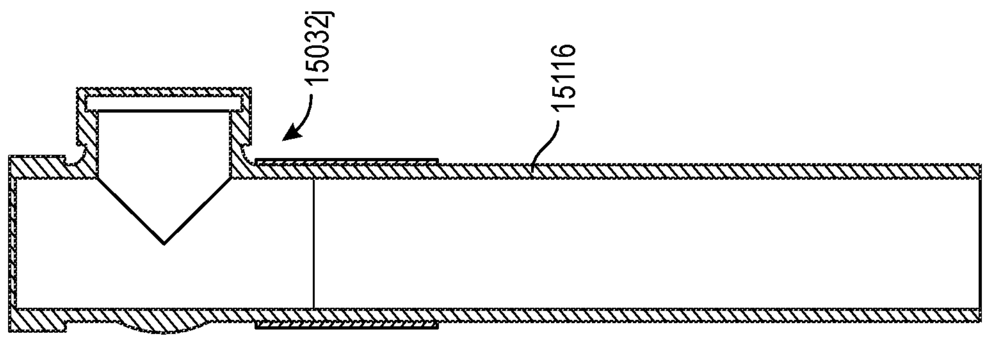
Figure 66C:
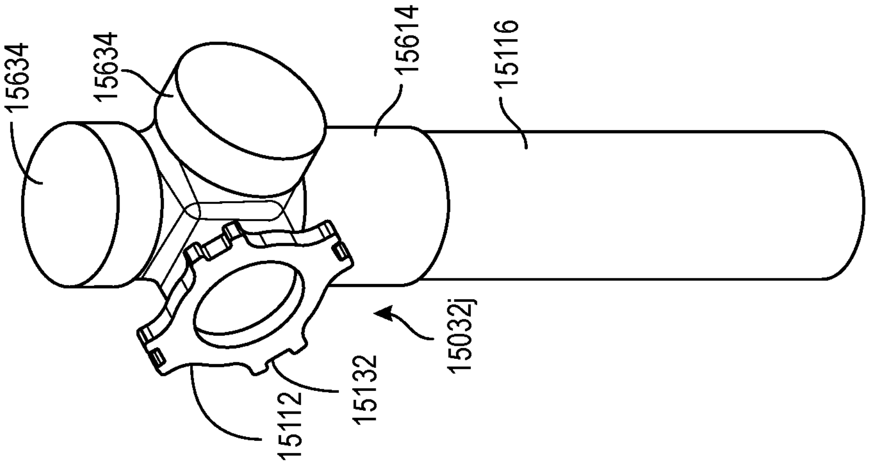
Figure 66B:
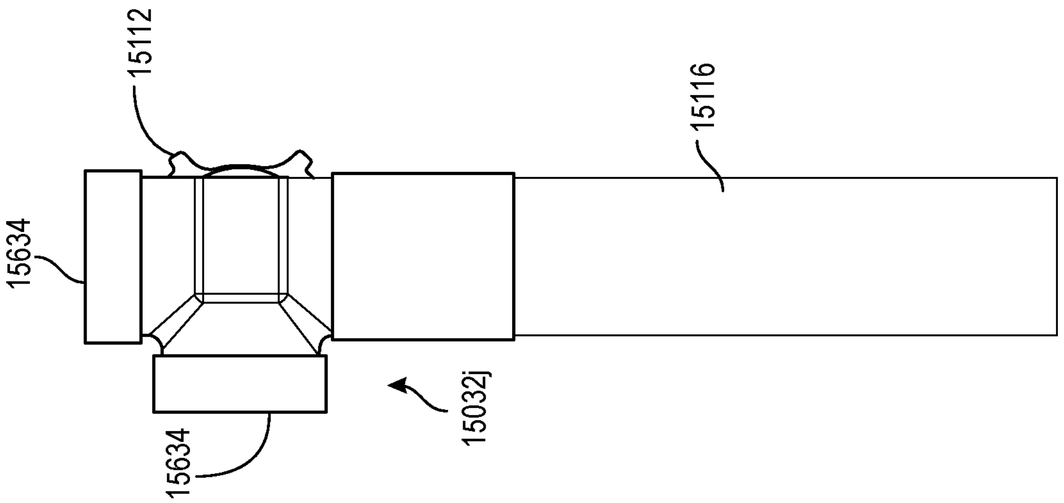

The outlet connector 15032*i*, 15032*j* illustrated in FIGS. 66A-66D is a modular cube having a flange 15112 for coupling to the faceplate and includes five other sides, some of which have openings 15630 (e.g., threaded openings), and others which have solid surfaces 15632. In the orientation shown in FIG. 66A, the front face of the cube is defined by the flange 15112, the rear face opposite the front face has a solid surface 15632. The opposing left and right sides define openings 15630 therein. The top surface defines an opening 15630 therein and the bottom surface opposite the top surface is defined by a solid surface 15632. The modularity of the outlet connector 15032*i*, 15032*j* allows an installer to couple upstream pipes, downstream pipes, vents, and/or plugs 15634 to the three openings 15630 in any configuration such that the outlet connector can direct the fluid flow in the appropriate direction. Additionally, while threaded openings 15630 are shown in FIG. 66A, non-threaded openings or cylindrical bosses may be used in combination with other attachment styles (e.g., no hub band 15614) to connect the modular cube to upstream pipes, downstream pipes, vents, and/or plugs 15634. Furthermore, while the illustrated embodiment has a cube or cuboid shape with three apertures, it is understood that in other embodiments more or fewer apertures may be present. Furthermore, other shapes (e.g., an octagon, hexagon, and the like) may also be present to orient the apertures at different angular and special orientations with respect to each other.

Figure 68B:
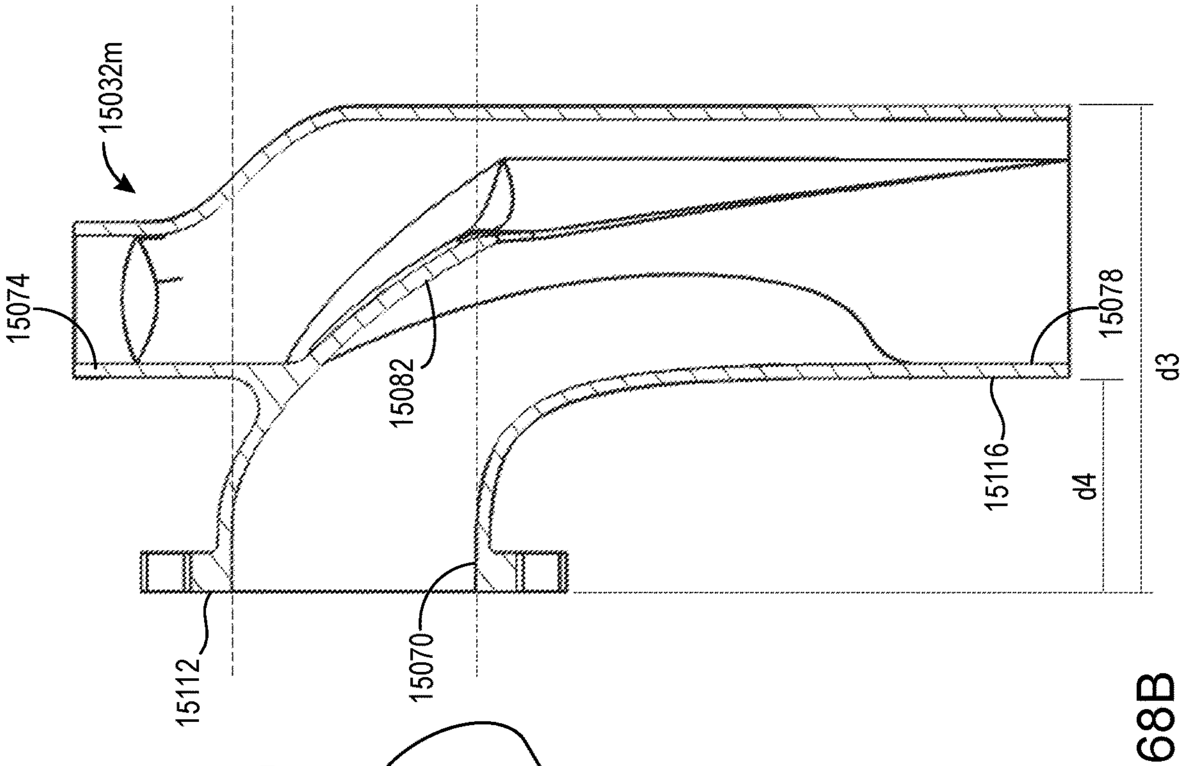
FIGS. 68A-68C illustrate another embodiment of a fluid coupler.
Figure 68A:
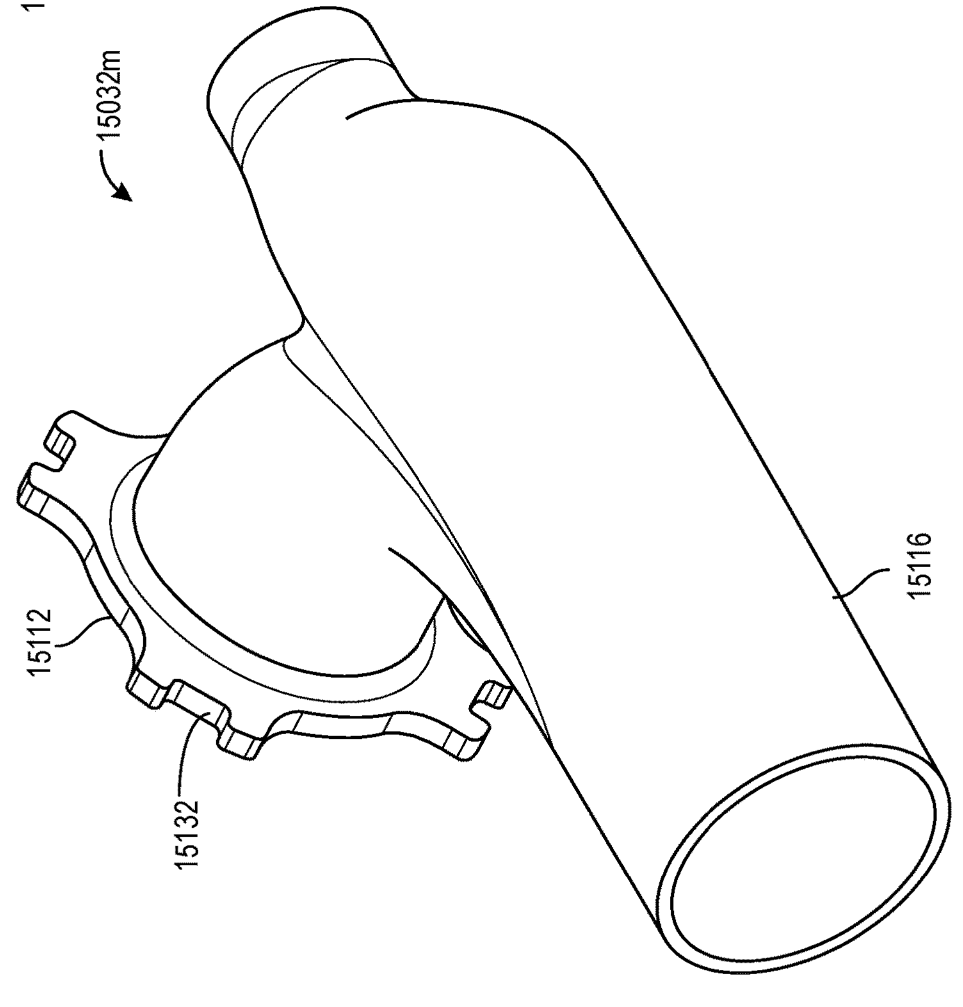
Figure 68C:
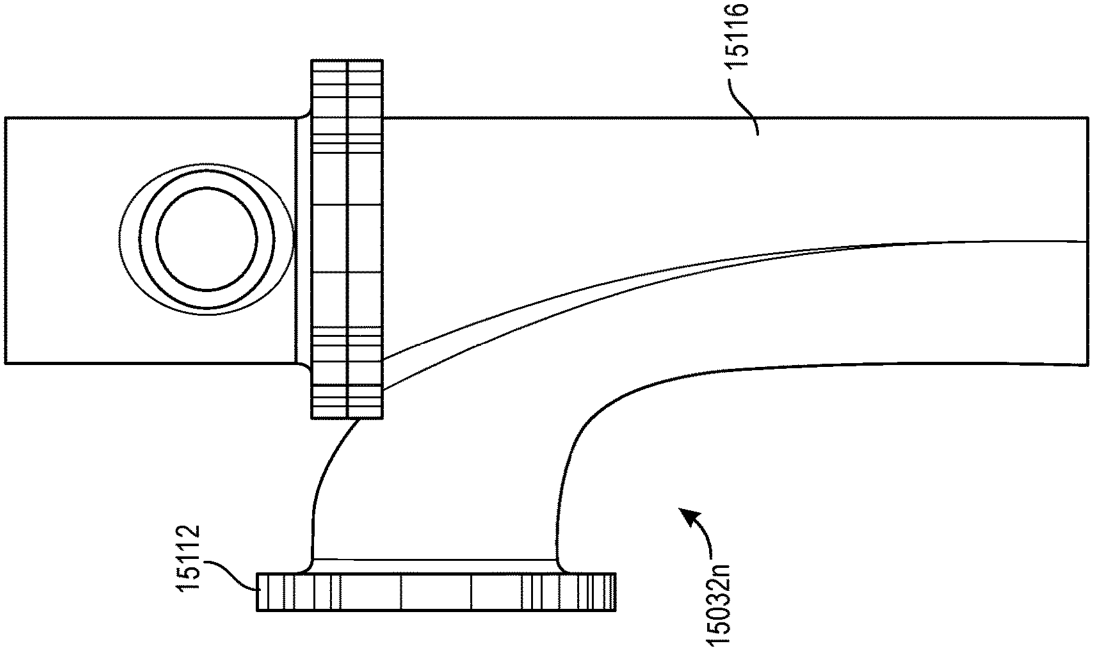

The outlet connectors 15032*m*, 15032*n* illustrated in FIGS. 68A-68C are examples of two outlet connector that can both be used with the same faceplate based on the similar geometry of the flange 15112 that engages the faceplate. As such, an installer can choose which of the outlet connector 15032*a-n* is most appropriate for the installation situation. In some embodiments, adjacent faceplates within a wall assembly 15004 can include different outlet connector 15032*a-n*. In some embodiments, such as those shown in FIGS. 54-68C, the slots 15132 are open and located at the perimeter of the flange 15112. In other embodiments, such as shown in FIG. 37, at least some (e.g., two, four) of the slots 744 are closed slots located within and not defined by the periphery of the flanged end.

As shown in the cross-section of FIG. 68B, the outlet connector 15032*m* includes an inlet 15070 at the flange 15112, a vent portion 15074 or vent opening located at one end of the outlet pipe 15116, and a downstream portion 15078 or downstream opening located at a second end of the outlet pipe 15116. The inlet 15070 is located between the vent portion 15074 and the downstream portion 15078 along a length of the outlet pipe 15116. The desired outlet flow direction through the outlet pipe 15116 is from the inlet 15070 and to the downstream portion 15078. To prevent flow in the opposite direction (i.e., from the inlet 15070 towards the vent portion 15074), the outlet connector 1532*m* includes an internal diverter 15082 that directs flow towards the downstream portion 15078.

The diverter 15082 follows the contour of the inlet portion into the interior of the outlet pipe 15116 to separate the outlet pipe 15116 into a first portion nearer the inlet 15070 and a second portion spaced apart from the inlet 15070 by the first portion. At a specific position along the length of the outlet pipe 15116, the first portion defines a passage between the inlet 15070 and the downstream portion 15078 that is separate from a passage between the vent portion 15074 and the downstream portion 15078 at the same specific position. As shown, the internal diameter of the inlet 15070 extends between two diametrically opposed extents (identified by parallel lines) in the lengthwise direction of the outlet pipe 15116 and the specific position is between the two diametrically opposed extents. In the embodiment shown, all positions between the two diametrically opposed extents meet the requirements of the specific position such that the outlet pipe 15116 is separated into separate first and second chambers at all positions along the length of the outlet pipe 15116 aligned with the inlet 15070 (e.g., between the diametric extents). As such, fluid entering the inlet 15070 perpendicular to the diameter of the inlet 15070 contacts the diverter 15082 and is redirected towards the downstream portion 15078 and away from the vent portion 15074. The diverter 15082 is illustrated within the outlet connector 15032*m*, though may otherwise be incorporated into any of the outlet connectors illustrated herein. As shown, the diverter 15082 is formed integrally with the remainder of the outlet connector 15032*m*, though in other embodiments may be a separable component. In still other embodiments, the inlet defines an inlet cross-sectional area defining an inlet area virtual volume projected axially therewith, and where the diverter 15082 is sized and shaped such that no part of the inlet area virtual volume is projected onto the wall of the outlet pipe. In still other embodiments, the diverter 15082 is sized and shaped such that no more than 10%, 15%, and 20% of the inlet area virtual volume is projected onto the wall of the outlet pipe.

With continued reference to FIG. 68B, the distance between the flange 15112 of the outlet connector 15032*m* and the nearest portion of the outlet pipe 15116 is signified by measurement d4. The distance between the flange 15112 of the outlet connector 15032*m* and the furthest portion of the outlet pipe 15116 is signified by measurement d3, with the difference between d3 and d4 corresponding to the diameter of the outlet pipe. In some embodiments, it is desirable to decrease the measurement d4 while still allowing sufficient flow through the inlet 15070 such that the outlet connector 15032*m* can be installed within thin walls or takes up less space within the wall. In some embodiments, the distance d4 is less than half (e.g., less than 50%, less than 45%, less than 35%, less than 30%, between 25%-50%) of the distance d3. Written another way, the distance d4 is less than the diameter of the outlet tube 15116. In the illustrated embodiment, the distances d3, d4 correspond to the diameter of the downstream portion 15078. However, in other embodiments, such as FIG. 67, the distances d3, d4 may additionally or alternatively correspond to a measurement corresponding to a portion upstream of the connection between the inlet 15070 and the outlet tube 15116. In still other embodiments, the distance d3 is approximately 125% the corresponding outlet tube 15116 diameter (±10%). In still other embodiments, the distance d3 is between 100% and 125% of the corresponding outlet tube 15116 diameter. In still other embodiments, the distance d3 is between 100% and 130% the distance d3 is between 100% and 125% of the corresponding outlet tube 15116 diameter. In still other embodiments, the distance d3 is between 100% and 135% of the corresponding outlet tube 15116 diameter.

From the foregoing, it will be seen that the disclosure is adapted to attain the ends and objects hereinabove set forth together with other advantages which are inherent to the structure and method. It will be understood that certain features and sub combinations are of utility and may be employed without reference to other features and sub combinations. Features described and illustrated with respect to certain embodiments may also be implemented in other embodiments. This is contemplated by and is within the scope of the claims. Since many possible embodiments of the disclosure may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present disclosure. As is evident from the foregoing description, certain aspects of the present disclosure are not limited by the particular details of the examples illustrated herein, and it is therefore contemplated that other modifications and applications, or equivalents thereof, will occur to those skilled in the art. The terms “having” and “including” and similar terms as used in the foregoing specification are used in the sense of “optional” or “may include” and not as “required.” Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. An outlet connector configured to provide fluid communication between a water closet supported on a carrier assembly including a faceplate and a downstream pipe, the outlet connector comprising:

a flange at a first end of the outlet connector, the flange configured to be coupled to a mounting hub of the faceplate to maintain a fluid-tight seal regardless of a selected rotational orientation of the flange relative to the mounting hub, the flange including an inlet opening, the inlet opening being larger than a fluid passageway in the faceplate, the flange including a plurality of slots configured to correspond to a plurality of apertures of the mounting hub, the plurality of slots being larger than the plurality of apertures such that the selected rotational orientation of the flange is adjustable relative to the mounting hub with a plurality of fasteners inserted through the plurality of slots and corresponding plurality of apertures; and a pipe portion extending from the flange to a second end, the second end including an outlet opening, the second end configured to be coupled to the downstream pipe, wherein, while the flange is coupled to the faceplate, the pipe portion having a first diameter that is larger than a second diameter of a fluid coupler of the carrier assembly, the pipe portion being configured to receive the fluid coupler within the pipe portion while the fluid coupler is installed to a maximum insertion depth on the faceplate.

2. The outlet connector of claim 1, wherein the pipe portion is a straight stub.

3. The outlet connector of claim 1, wherein the pipe portion includes a transition such that the outlet opening of the second end is smaller than the inlet opening of the first end.

4. The outlet connector of claim 3, wherein a first central axis of the inlet opening is offset from a second central axis of the outlet opening.

5. The outlet connector of claim 4, wherein the first central axis of the inlet opening is parallel to the second central axis of the outlet opening.

6. The outlet connector of claim 1, wherein the fluid coupler is configured to be axially adjustable relative to the flange of the outlet connector while the flange is secured to the faceplate.

7. The outlet connector of claim 1, wherein the flange is configured to couple to the mounting hub with the flange in a first rotational orientation in which the second end of the pipe portion is sloped downwards in a first direction and in a second rotational orientation in which the second end of the pipe portion is sloped downwards in a second direction, the second direction offset from the first direction by more than 90 degrees.

8. The outlet connector of claim 1, wherein the plurality of slots are located at and open to a perimeter of the flange.

9. An outlet connector configured to provide fluid communication between a water closet supported on a carrier assembly including a faceplate and a downstream pipe, the outlet connector comprising:

a flange at a first end of the outlet connector, the flange configured to be coupled to a mounting hub of the faceplate, the flange including an inlet opening having a first central axis, the inlet opening being larger than a fluid passageway in the faceplate; and a pipe portion extending from the flange to a second end, the second end including an outlet opening having a second central axis, the second end configured to be coupled to the downstream pipe, the second central axis of the outlet opening being parallel to and offset from the first central axis of the inlet opening, wherein, while the flange is coupled to the faceplate, the pipe portion having a first diameter that is larger than a second diameter of a fluid coupler of the carrier assembly, the pipe portion being configured to receive the fluid coupler within the pipe portion while the fluid coupler is installed to a maximum insertion depth on the faceplate.

10. The outlet connector of claim 9, wherein the pipe portion includes a transition such that the outlet opening of the second end is smaller than the inlet opening of the first end.

11. The outlet connector of claim 9, wherein the flange includes a plurality of slots configured to correspond to a plurality of apertures of the mounting hub, the plurality of slots being larger than the plurality of apertures such that a selected rotational orientation of the flange is adjustable relative to the mounting hub with a plurality of fasteners inserted through the plurality of slots and corresponding plurality of apertures.

12. The outlet connector of claim 11, wherein the flange is configured to couple to the mounting hub with the flange in a first rotational orientation in which the second central axis of the outlet opening is offset from the first central axis of the inlet opening in a first direction and in a second rotational orientation in which the second central axis of the outlet opening is offset from the first central axis of the inlet opening in a second direction, the second direction offset from the first direction by more than 90 degrees.

* * * * *